US008275651B2

(12) United States Patent
Nagaya

(10) Patent No.: US 8,275,651 B2
(45) Date of Patent: Sep. 25, 2012

(54) SYSTEM FOR MANAGING MEMBER SELF-CHECKING OF SET GOAL ACHIEVEMENT IN AN ORGANIZATION

(75) Inventor: Kenichi Nagaya, Tokyo (JP)

(73) Assignee: Netman Co., Ltd., Tokyo (JP)

( * ) Notice: Subject to any disclaimer, the term of this patent is extended or adjusted under 35 U.S.C. 154(b) by 662 days.

(21) Appl. No.: 12/095,852

(22) PCT Filed: Dec. 2, 2005

(86) PCT No.: PCT/JP2005/022216
§ 371 (c)(1),
(2), (4) Date: Jun. 30, 2009

(87) PCT Pub. No.: WO2007/063605
PCT Pub. Date: Jun. 7, 2007

(65) Prior Publication Data
US 2009/0319327 A1    Dec. 24, 2009

(51) Int. Cl.
*G06Q 10/00* (2012.01)
(52) U.S. Cl. ..................................................... 705/7.42
(58) Field of Classification Search ................. 705/7.42, 705/7.11
See application file for complete search history.

(56) References Cited

U.S. PATENT DOCUMENTS

| | | | | |
|---|---|---|---|---|
| 4,671,772 A | * | 6/1987 | Slade et al. | 434/219 |
| 4,863,384 A | * | 9/1989 | Slade | 434/107 |
| 5,743,742 A | * | 4/1998 | Morrel-Samuels | 434/236 |
| 5,813,863 A | * | 9/1998 | Sloane et al. | 434/236 |
| 5,823,781 A | * | 10/1998 | Hitchcock et al. | 434/118 |
| 5,909,669 A | * | 6/1999 | Havens | 705/7.42 |
| 5,926,794 A | * | 7/1999 | Fethe | 705/7.39 |
| 5,933,136 A | * | 8/1999 | Brown | 715/741 |
| 6,007,340 A | * | 12/1999 | Morrel-Samuels | 434/236 |
| 6,039,688 A | * | 3/2000 | Douglas et al. | 600/300 |
| 6,119,097 A | * | 9/2000 | Ibarra | 705/7.42 |

(Continued)

FOREIGN PATENT DOCUMENTS

JP    2001-515233 A    9/2001

(Continued)

OTHER PUBLICATIONS

Mottl, Judith, Appraisal Software Ends HR Paper Chase Information Week, Nov. 6, 2000.*

(Continued)

*Primary Examiner* — Scott L Jarrett
(74) *Attorney, Agent, or Firm* — Westerman, Hattori, Daniels & Adrian, LLP

(57) ABSTRACT

A behavior improvement system for ascertaining behavior reform by helping a person take notice of his/her behavior in regard to behavior modification from various sides. The behavior improvement system is executed using terminals connected to a LAN. The behavior improvement system is characterized by setting a goal for a behavior improvement, setting an action plan realizing the goal, a member periodically carrying out a self-check of the action plan to take notice of growth of a behavior within him/herself or comparing a diagnosis interview result replied by the member and a diagnostician using the same diagnosis interview sheet to take notice of a difference of evaluations between him/herself and another person, the member taking notice of his/her behavior improvement with each other member using a bulletin board function, and enabling the member to obtain an idea to be done by him/herself using advice from an advisor who is an expert.

7 Claims, 62 Drawing Sheets

U.S. PATENT DOCUMENTS

| | | | |
|---|---|---|---|
| 6,126,596 A * | 10/2000 | Freedman | 600/300 |
| 6,213,780 B1 * | 4/2001 | Ho et al. | 434/219 |
| 6,270,351 B1 * | 8/2001 | Roper | 434/118 |
| 6,368,110 B1 * | 4/2002 | Koenecke et al. | 434/219 |
| 6,370,355 B1 * | 4/2002 | Ceretta et al. | 434/350 |
| 6,604,084 B1 * | 8/2003 | Powers et al. | 705/7.41 |
| 6,607,483 B1 * | 8/2003 | Holland | 600/300 |
| 6,612,985 B2 * | 9/2003 | Eiffert et al. | 600/300 |
| 6,615,182 B1 * | 9/2003 | Powers et al. | 705/7.42 |
| 6,735,570 B1 * | 5/2004 | Lacy et al. | 705/7.14 |
| 6,767,213 B2 * | 7/2004 | Fleishman | 434/236 |
| 6,853,975 B1 * | 2/2005 | Dirksen et al. | 434/107 |
| 6,871,195 B2 * | 3/2005 | Ryan et al. | 706/46 |
| 6,877,034 B1 * | 4/2005 | Machin et al. | 709/223 |
| 6,944,624 B2 * | 9/2005 | Orton et al. | 1/1 |
| 7,035,809 B2 * | 4/2006 | Miller et al. | 705/7.23 |
| 7,181,413 B2 * | 2/2007 | Hadden et al. | 705/7.42 |
| 7,207,804 B2 * | 4/2007 | Hersh | 434/236 |
| 7,367,808 B1 * | 5/2008 | Frank et al. | 434/219 |
| 7,497,688 B1 * | 3/2009 | Judd et al. | 434/219 |
| 7,702,532 B2 * | 4/2010 | Vigil | 705/7.18 |
| 7,805,381 B2 * | 9/2010 | Habichler et al. | 705/320 |
| 7,937,281 B2 * | 5/2011 | Miller et al. | 705/7.11 |
| 8,019,640 B2 * | 9/2011 | Barel et al. | 705/7.32 |
| 8,112,298 B2 * | 2/2012 | Bourne et al. | 705/7.13 |
| 8,156,500 B2 * | 4/2012 | Helander | 718/104 |
| 2002/0019765 A1 * | 2/2002 | Mann et al. | 705/11 |
| 2002/0072953 A1 * | 6/2002 | Michlowitz et al. | 705/10 |
| 2002/0077884 A1 * | 6/2002 | Sketch | 705/12 |
| 2002/0184061 A1 * | 12/2002 | Digate et al. | 705/7 |
| 2002/0184085 A1 * | 12/2002 | Lindia et al. | 705/11 |
| 2003/0004778 A1 * | 1/2003 | Gareau et al. | 705/10 |
| 2003/0009373 A1 * | 1/2003 | Ensing et al. | 705/10 |
| 2003/0101091 A1 * | 5/2003 | Levin et al. | 705/11 |
| 2003/0204423 A1 * | 10/2003 | Koller et al. | 705/7 |
| 2003/0204440 A1 * | 10/2003 | Koller et al. | 705/11 |
| 2004/0054567 A1 * | 3/2004 | Bubner | 705/7 |
| 2004/0088177 A1 * | 5/2004 | Travis et al. | 705/1 |
| 2004/0153355 A1 * | 8/2004 | Deering et al. | 705/9 |
| 2004/0215503 A1 * | 10/2004 | Allpress et al. | 705/11 |
| 2004/0243443 A1 | 12/2004 | Asano et al. | |
| 2005/0021391 A1 * | 1/2005 | Lu et al. | 705/11 |
| 2005/0228692 A1 * | 10/2005 | Hodgdon | 705/2 |
| 2007/0105080 A1 * | 5/2007 | Hersh | 434/236 |
| 2007/0179349 A1 * | 8/2007 | Hoyme et al. | 600/300 |
| 2009/0327051 A1 * | 12/2009 | Nerby | 705/11 |

FOREIGN PATENT DOCUMENTS

| | | |
|---|---|---|
| JP | 2001-297184 A | 10/2001 |
| JP | 2002-83054 A | 3/2002 |
| JP | 2002-140451 A | 5/2002 |
| JP | 2005-11329 A | 1/2005 |
| JP | 2005-100004 A | 4/2005 |
| JP | 2005-276168 A | 10/2005 |
| JP | 4001300 B2 | 10/2007 |

OTHER PUBLICATIONS

Bracken, David W. et al., High-tech 360 Training & Development, vol. 52, No. 8, Aug. 1998.*

Meyer, Gary, 360 on the Net: A computer toolkit for multirater performance feedback HR Magazine, vol. 43, No. 11, Oct. 1998.*

Grant, Rebecca A. et al., Computerized Performance Monitors as Multidimensional Systems: Derivation and Application ACM Transaction of Informatino Systems, vol. 14, No. 2, Apr. 1996.*

Filipczak, Bob, Skills-assessment software delivers one-two punch Training, Jul. 1995.*

Skillscape, Overview of SkillScape Competence Manager Skillscape, 1998.*

Johnson, Tatyanna et al., A Comprehensive Interactive Competency Program Part I: Development and Framework Medsurg Nursing, vol. 9, No. 5, Oct. 2000.*

Cooper, Kenneth Carlton, Effective Competency Modeling & Reporting AMACOM; 1st edition, May 15, 2000.*

Coen, Dan, Creating a dynamic performance development program Direct Marketing, vol. 64, No. 3, Jul. 2003.*

International Search Repor of PCT/JP2005/022216, date of mailing Dec. 2, 2005.

Office Action dated May 16, 2007, issued in corresponding Japanese Patent application No. 2006-520535.

Office Action dated Jan. 31, 2007, issued in corresponding Japanese Patent application No. 2006-520535.

Mami Mita, "Reviewing a new method for employee evaluation System that that includes motivation with transparent objectives and outcomes", Nikkei Information Strategy, Aug. 24, 2001, pp. 60-65, vol. 10, No. 8, Nikkei Business Publications, Inc.

Ryouta Tamaki, "Increasingly demanded IT Skill Assessment", Nikkei Computer, Aug. 28, 2000, pp. 38-40, No. 503, Nikkei Business Publications, Inc.

Notification of Transmittal of Translation of the International Preliminary Report on Patentability (Form PCT/IB/338) of International Application No. PCT/JP2005/022216 mailed Jun. 12, 2008 with Forms PCT/IB/373, and English translation forms PCT/ISA/237.

* cited by examiner

Achieved target is displayed like this.

Fig. 32

Fig. 33(b)
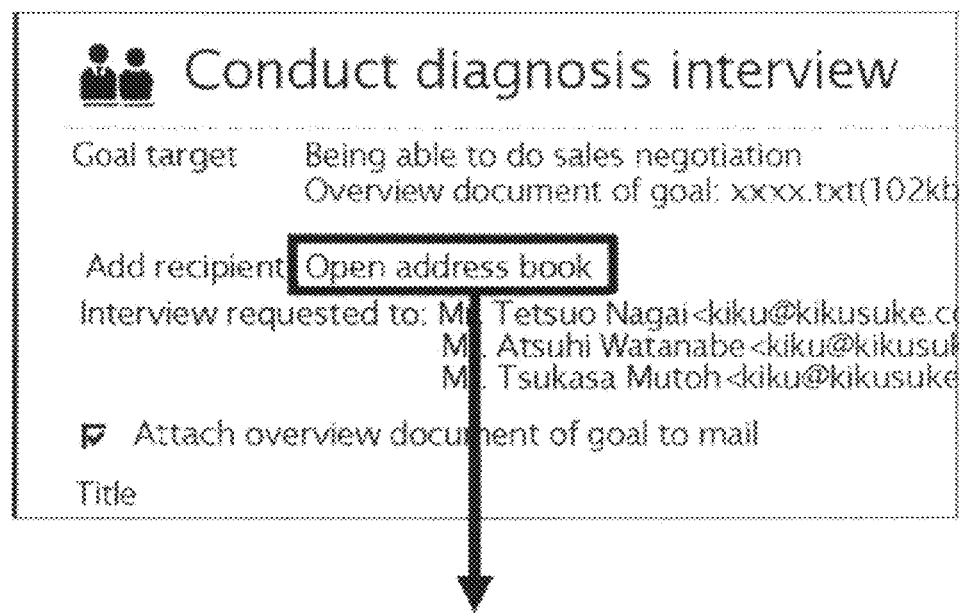
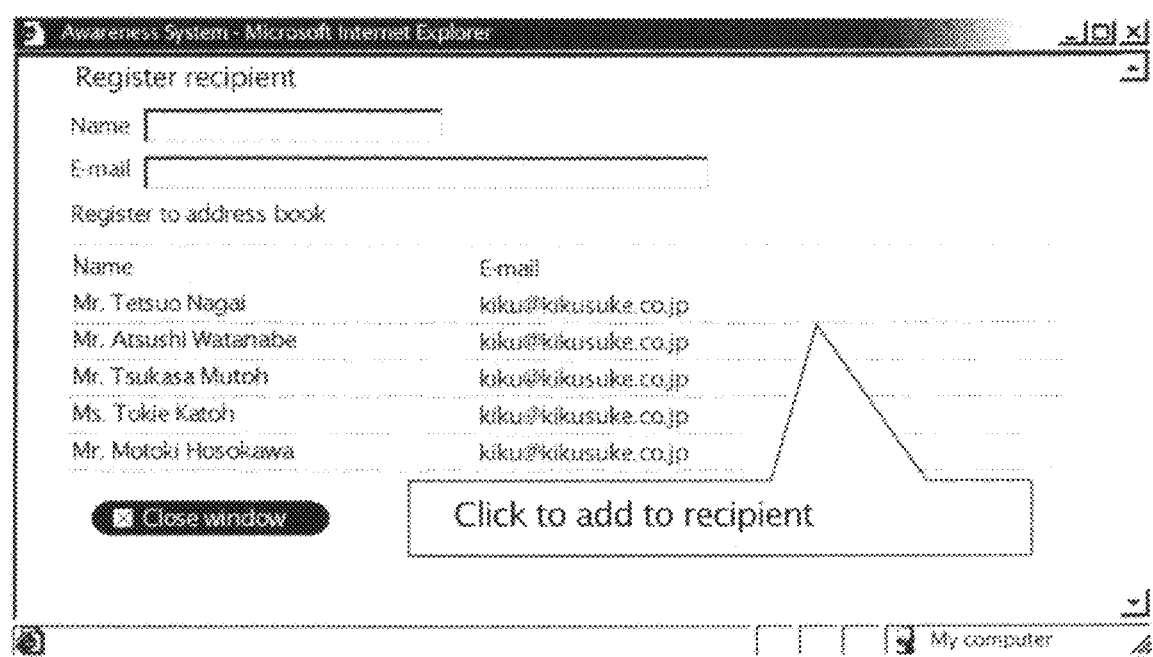

Fig. 36

Being able to do sales negotiation

I'd like to have your frankly advice about my target "being able to do sales negotiation".
Please check the most suitable choice in the following question.

How do you think about my communications for the customer, the superior, and the colleague? Was it positive?

- Excellent (5 points)
- Very good (4 points)
- Good (3 points)
- Average (2 points)
- Poor (1 point)

How do you think about my impression? Was it in a good smile and a bright attitude?

- Excellent (5 points)
- Very good (4 points)
- Good (3 points)
- Average (2 points)
- Poor (1 point)

How do you think about my reception to the customer? Was it bright and lively?

- Excellent (5 points)
- Very good (4 points)
- Good (3 points)
- Average (2 points)
- Poor (1 point)

How do you think about my work on an in-house / outside the company activity? Was it positive?

- Excellent (5 points)
- Very good (4 points)
- Good (3 points)
- Average (2 points)
- Poor (1 point)

How do you think about my joint work with the people around me?

- Excellent (5 points)
- Very good (4 points)
- Good (3 points)
- Average (2 points)
- Poor (1 point)

Please input comments

Diagnose as up above

Being able to do sales negotiation

How do you think about my communications for the customer, the superior, and the colleague? Was it positive?

- ○ Excellent (5 points)
- ○ Very good (4 points)
- ○ Good (3 points)
- ○ Average (2 points)
- ○ Poor (1 point)

How do you think about my impression? Was it in a good smile and a bright attitude?

- ○ Excellent (5 points)
- ○ Very good (4 points)
- ○ Good (3 points)
- ○ Average (2 points)
- ○ Poor (1 point)

How do you think about my reception to the customer? Was it blight and lively?

- ○ Excellent (5 points)
- ○ Very good (4 points)
- ○ Good (3 points)
- ○ Average (2 points)
- ○ Poor (1 point)

How do you think about my work on an in-house / outside the company activity? Was it positive?

- ○ Excellent (5 points)
- ○ Very good (4 points)
- ○ Good (3 points)
- ○ Average (2 points)
- ○ Poor (1 point)

How do you think about my joint-work with the people around me?

- ○ Excellent (5 points)
- ○ Very good (4 points)
- ○ Good (3 points)
- ○ Average (2 points)
- ○ Poor (1 point)

Please input comment:

Diagnosis as up above

SYSTEM FOR MANAGING MEMBER SELF-CHECKING OF SET GOAL ACHIEVEMENT IN AN ORGANIZATION

TECHNICAL FIELD

The present invention relates to a behavior improvement system for ascertaining behavior reform by helping a person in question take notice (awareness) of his/her behavior in regard to the behavior modification.

BACKGROUND ART

Conventionally, for example, a structure of a skill diagnosis system of Japanese Patent Laid-Open No. 2002-140451 is known. The skill diagnosis system classifies and systematizes human resources from a managerial point of view, supports corporate strategy by comprehensively diagnosing what skills the company possesses and to what level the company possesses the skills, simultaneously showing a situation of the employee's possessions compared with human resources and skills sought by the company and a goal for ability improvement, accepts a reply to a question for diagnosing the employee's skills from the employee and another person having relationship with this employee in order to lead the employee to voluntary ability improvement. The skill diagnosis system has a data collection means for storing the reply to the question and a human resources classification analysis means for calculating a goodness of fit of a division to which the employee belongs for each of averages of the human resources classifications base on the previously defined division to which the employee belongs, upon calculating, as a self diagnosis and a diagnosis by another person, a goodness of fit, for each of the human resources classifications, that compares an evaluation value converted, based on human resources classifications and human resources classification diagnosis criteria previously defined, from the reply to the question from the employee and the another person corresponding to each of the human resource classifications, with a maximum possible score of the reply to the question. The skill diagnosis system makes a diagnose by comparing the goodness of fit for each of the human resources classifications of the employees with the goodness of fit of each of the averages of the human resources classifications of the belonged-to division based on the human resources classification appropriate for the corporate business analysis.

Patent Document 1: Japanese Patent Laid-Open No. 2002-140451

DISCLOSURE OF INVENTION

Problem to be Solved by the Invention

There is a case where 360-Degree feedback (evaluation by other people) is used to reform behavior, but it does not yield results in many cases.

Accordingly, it is important to promote each person to grow not for evaluation but by having him or her take notice (awareness) and improve behavior by him/herself to the utmost.

The present invention provides a behavior improvement system incorporating a mechanism to improve behavior by helping a person in question take notice (awareness).

Furthermore, the present invention provides the behavior improvement system enabling an administrative division to recognize a situation of taking notice (awareness) and behavior improvement as a quantitative data.

Means for Solving Problem

To solve the above-described problems, in accordance with aspects of the present invention,
a behavior improvement system includes:
  a person-in-charge terminal installed on a side of a person in charge administering a behavior improvement of a member carrying out a behavior improvement within an organization;
  a member terminal installed on a side of the member;
  a diagnostician terminal installed on a side of a diagnostician diagnosing the behavior improvement of the member; and
  an organization computer connected via a network to the person-in-charge terminal, the member terminal, and the diagnostician terminal,
  wherein the organization computer includes:
    a self-checking execution means for sending to the corresponding member terminal a mail requesting for a self-check of an action plan for self-checking the behavior improvement by the member and for recording an input of the self-check inputted from the member terminal;
    a diagnosis execution means for notifying the diagnostician terminal and the member terminal via a mail of a reply to a diagnosis interview sheet diagnosing whether the behavior improvement is carried out;
    a diagnosis interview result generation means for recording the reply inputted to the diagnosis interview sheet by each of the member terminal and the diagnostician terminal, for generating a diagnosis interview result separately comparing a reply of the member and a reply of the diagnostician, and for transmitting to the replied member terminal a mail having the diagnosis interview result as an attachment or having a link to a screen of the diagnosis interview result;
    an advice request means for transmitting from the member terminal to the person-in-charge terminal or an advisor terminal a mail, having the diagnosis interview result as the link or the attachment, requesting for an advice; and
    a goal determination means for determining, from the interview result, whether a goal is achieved, for terminating a processing where the goal is determined to be achieved, and for transmitting from the person-in-charge terminal or the advisor terminal to the member terminal a mail giving an advice to execute the action plan again where the goal is determined to be unachieved.

In accordance with another aspect of the present invention, the organization computer includes:
  a member registration means for registering the member for each of the goals upon an input from the person-in-charge terminal;
  an action plan setting means for recording to the organization computer the action plan for self-checking the behavior improvement by the member upon an input from the person-in-charge terminal or the member terminal;
  a self-checking date setting means for recording a self-checking date or a plurality of self-checking dates requesting the member to input the self-check with respect to the action plan, upon an input from the person-in-charge terminal of the member terminal; and
  the self-checking execution means for sending to the corresponding member terminal a mail requesting for an input of the self-check of the action plan on the self-checking date set by the self-checking date setting means and for recording the input of the self-check inputted from the member terminal.

In accordance with another aspect of the present invention, the organization computer includes:

a diagnosis interview sheet setting means for recording a diagnosis reference value and a diagnosis interview sheet diagnosing whether the behavior improvement of the goal is carried out, upon an input from the person-in-charge terminal;

a diagnosis starting date setting means for recording a diagnosis starting date requesting the member and the diagnostician for an input to the diagnosis interview sheet, upon an input from the person-in-charge terminal;

a diagnostician registration means for recording the diagnostician to the organization computer upon an input from the person-in-charge terminal or the member terminal;

a diagnosis execution means for notifying the diagnostician terminal and the member terminal via a mail of a reply to the diagnosis interview sheet set by the diagnosis interview sheet setting means on the diagnosis date set by the diagnosis starting date setting means; and a diagnosis interview result generation means for recording the reply inputted to the diagnosis interview sheet by each of the member terminal and the diagnostician terminal, for generating a diagnosis interview result separately comparing the reply of the member and the reply of the diagnostician, and for transmitting to the replied member terminal a mail having the diagnosis interview result as an attachment or having a link to a screen of the diagnosis interview result.

In accordance with yet another aspect of the present invention, the organization computer includes an advisor registration means for recording an advisor consisting of an expert including or not including the person in charge upon an input from the person-in-charge terminal, and the advice request means transmits from the member terminal to the advisor terminal installed on a side of the advisor a mail, having a link to a screen of a self-check history and a diagnosis interview result of the action plan, requesting an advice.

In accordance with another aspect of the present invention, the action plan setting means includes:

an action plan reference example registration means for recording a reference example of the action plan inputted from the person-in-charge terminal; and an action plan determination means for determining the action plan of the corresponding member based on the reference example, upon an input from the member terminal.

In accordance with another aspect of the present invention, the self-checking date setting means includes:

a self-checking date initial value setting means for recording an initial value of the self-checking date inputted from the person-in-charge terminal; and a self-checking date determination means for determining a checking date executing based on the initial value, upon an input from the member terminal.

In accordance with yet another aspect of the present invention, the diagnosis starting date setting means includes:

a diagnosis starting deadline setting means for recording a deadline of the diagnosis starting date upon an input from the person-in-charge terminal; and a diagnosis starting date determination means for determining the diagnosis starting date before the deadline upon an input from the member terminal.

In accordance with another aspect of the present invention, the organization computer has a member bulletin board function that can be used among the member terminals registered for a same goal.

In accordance with another aspect of the present invention, the member registration means registers the members in a manner to divide the members into teams consisting of one member or a plurality of members in units of goals upon an input from the person-in-charge terminal, and the member bulletin board function is arranged that can be used among the member terminals in the units of the teams.

In the invention according to claim 10, the organization computer has a self-checking history generation means that has a free description field in a diary form allowing the member to freely write therein in the action plan set by the action plan setting means, that displays a self-checking result of the action plan recorded by the self-checking execution means in an order of a time series, and that displays the free description field in the order of the time series.

Effect of the Invention

The present invention has effects on a member as a person carrying out a self-behavior reform, on a person in charge as a person taking charge of behavior reform support and education, on a diagnostician as another person replying to a diagnosis interview from the member, and on an organization and an entire company.

1 There are following effects on the member.

(1) The action plan determined by the member him/herself is continuously delivered to him/herself as a checklist in units of predetermined periods, and the member him/herself can check the behavior. Thus, an easily forgotten behavior check can be surely carried out.

(2) A self-check result is recorded as a history, and the member can confirm his/her behavior improvement and a feeling felt at that time as a growth record of him/herself.

(3) Whether a goal is achieved as a result of carrying out the action plan is not determined by the member at his/her discretion, but is distributed as a diagnosis interview sheet to another person (a diagnostician) so that the another person replies. The member compares the reply with his/her diagnosis and can take notice of a gap, thus not resulting in complacency.

(4) The member can confirm an achievement degree by comparing a reference value of an achievement of a goal and a diagnosis interview result.

(5) The member can request an advisor for an advice based on a behavior history of the member him/herself (a self-checking history of the action plan) and the diagnosis interview result, which is different from a mere consultation, and accordingly, the member can receive a more reliable advice.

(6) Because there is a window of discussion enabling a contact with another member aiming the same goal, the member does not become isolated, and can make progress together with fellows.

2 There are following effects on the person in charge.

(1) The goal can be reliably set.

(2) A visualization of a process of the behavior of the member is achieved.

(3) The achievement degree of the goal can be determined based on the diagnosis interview result of a person around the member.

(4) By making an assistant person in charge participate as an advisor, multiple persons can support, give advice to, and provide follow-up to the member.

(5) The advice can be given upon viewing the behavior process and the diagnosis interview result, and thus, a more appropriate advice can be given.

3. There are following effects on the diagnostician.

(1) The diagnostician can reply to the diagnosis interview sheet while confirming a history as to what kind of action the member has carried out for what kind of goal target. Accordingly, it is different from receiving a mere interview, and the diagnostician has better understanding of the meaning of the diagnosis interview, so that the diagnostician can reply a more accurate opinion.

4. There are following effects on the organization and the entire company.

(1) The behavior improvement of "behaving upon thinking while running" can be executed.

(2) Conversion into data by information technology enables measuring, accumulation, and reuse of an action of a person having behaved to produce a high business effect, and enables a process to be capitalized (conversion into explicit knowledge).

(3) Member employees can have relationships with surrounding people in various forms, and thus, positive employees who are not isolated will increase.

BRIEF DESCRIPTION OF DRAWINGS

FIG. 2 (b) is a block diagram showing functions of the second embodiment;

FIG. 4 (b) is a screen of the number of members linked to FIG. 3;

FIG. 5 (b) is a setting screen of a cooperation board;

FIG. 5 (c) is a generation screen of the cooperation board for all members;

FIG. 5 (d) is a generation screen of a team-specific cooperation board;

FIG. 5 (e) is the generation screen of the team-specific cooperation board and a team-specific cooperation board list screen;

FIG. 5 (f) is an enlarged diagram of the team-specific cooperation board list screen;

FIG. 5 (g) is a message list view screen of a team of the team-specific cooperation board;

FIG. 5 (h) is a list screen showing a message content and replies relating to the message;

FIG. 5 (i) is a list view screen of all bodies;

FIG. 9 is a list screen of mails searched with a keyword;

FIG. 13 (b) is a generation screen dividing the members into teams;

FIG. 13 (c) is a screen registering the members to the teams;

FIG. 13 (d) is a list screen of the members divided into each of the teams;

FIG. 14 is a screen showing change in displaying of the member who has achieved a goal in a member list;

FIG. 16 is a screen for specifying recipient addresses in FIG. 15;

FIG. 22 is a history screen of each of the members;

FIG. 23 (b) is a view screen of the action plans of each of the members;

FIG. 27 (b) is the top page for the member having a bulletin board function;

FIG. 32 is a screen for changing a timer setting;

FIG. 33 (b) is a screen specifying the diagnostician;

FIG. 36 is a screen showing the diagnosis interview sheet;

FIG. 37 is a diagnosis interview result screen of the diagnostician;

FIG. 38 is a diagnosis interview result screen showing diagnosis interview results and achievement degrees of all of the diagnosticians;

FIG. 40 is a diagnosis interview sheet screen viewed by the diagnostician;

EXPLANATIONS OF LETTERS OR NUMERALS

Figure 1:
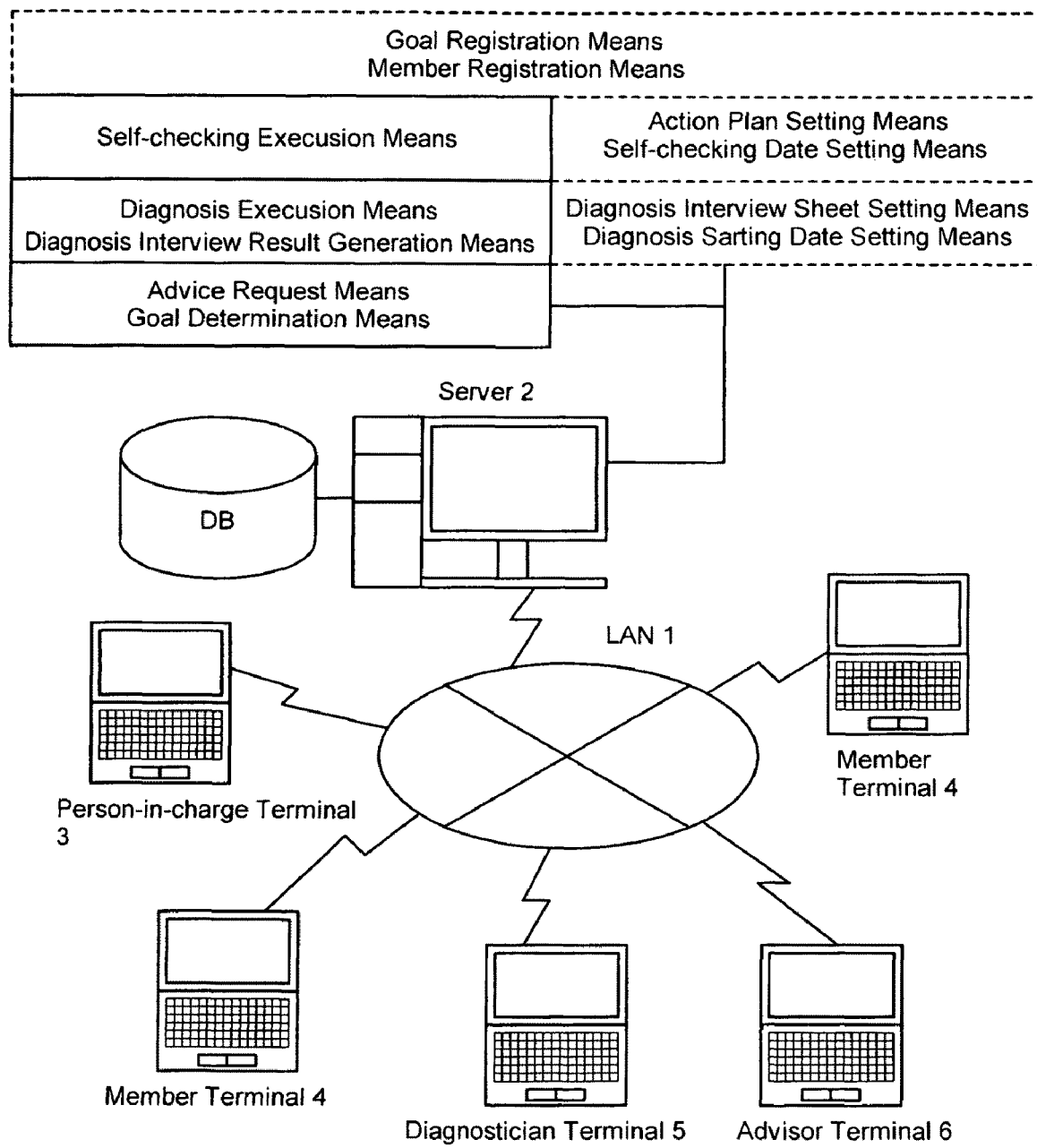
FIG. 1 is a block diagram showing the first embodiment.

1 A computer network
2 A server as an organization computer
3 A terminal of a person in charge
4 A terminal of a member
5 A terminal of a diagnostician
6 A terminal of an advisor

BEST MODE(S) FOR CARRYING OUT THE INVENTION

A preferred embodiment of a behavior improvement system of the present invention will be hereinafter described with reference to the figures in a case where the present invention is applied to within a same organization such as a corporation.

The behavior improvement system consists of a program running on a server computer (hereinafter referred to as "server") 2 as a group computer having a database (DB) and connected to a corporate LAN 1 and the like as shown in FIG. 1.

Those who can access this system consists of an administrator in charge, a person in charge, an assistant person in charge, a member, a diagnostician, and an adviser, and performs processings by connecting to the server using each one's computer terminal (hereinafter referred to as "terminal") 3 to 6. For the sake of convenience, in the embodiments, the terminals are described as subjects of processings, but all of these processings are executed using the terminals.

A constituent of an organization attends a prescribed seminar to be trained, such as a customer satisfaction (CS), quality management system (QMS), and the like held within a corporation or the organization that the constituent belongs to, and the constituent is registered as the member based thereon and executes an action plan toward a previously set goal.

In order to execute the system, the person in charge is determined by the administrator in charge, and the assistant person in charge can be determined by the person in charge as necessary.

First Embodiment

With a system according to the first embodiment as shown in FIG. 1, a target (definition) of a goal, a diagnosis interview sheet diagnosing whether a behavior improvement toward the goal has been achieved, a diagnosis starting date, and a member executing the behavior improvement toward the achievement of the goal are entered with a terminal 3 by a person in charge to correspond to a predetermined training, and are registered to a server 2 by a goal registration means, a diagnosis interview sheet setting means, a diagnosis starting date setting means, and a member registration means, respectively.

Furthermore, an action plan toward the goal and a self-checking date of the action plan are entered with terminals 3, 4 of the person in charge or the member, and are registered to the server 2 by an action plan setting means and a self-checking date setting means, respectively.

The self-checking date can be set to enable repeated executions for multiple times in a predetermined period.

When the self-checking date comes, the server 2 causes a self-checking execution means to transmit a mail requesting the member terminal 4 to enter a self-check, and the member executes, with the terminal 4, the self-check on a self-checking screen of the action plan arranged on the server 2. The input of the self-check is registered to the server 2.

When the diagnosis date comes, the server 2 causes a diagnosis execution means to transmit a mail requesting a reply to a diagnosis interview sheet to each of the member terminal 4 and a terminal 5 of a diagnostician entered by the terminal 3 of the person in charge or the member terminal 4.

Then, the server 2 causes a diagnosis interview result generation means to separate and compare between a reply of the member and a reply of the diagnostician, to generate a diagnosis interview result showing a difference, and to transmit to the member terminal 4 a mail including an attachment of the diagnosis interview result or having a link to a screen of the diagnosis interview result.

Where a bulletin board function of the server 2 sets up a bulletin board with other members having the same goal and the person in charge, the member can always try to mutually communicate via the terminals 4, 4, . . . of other members.

Herein, the members who can use the bulletin board may be all of the members having the same goal or some of the members divided into teams.

The member who has received the diagnosis interview result causes an advice request means to transmit a mail including the attachment or the link of the diagnosis interview result for requesting an advice to a terminal 6 of an advisor (or the terminal 3 of the person in charge) from the terminal 4.

The person in charge can also register the assistant person in charge as the advisor.

The advisor causes a goal determination means to determine as to whether the goal is achieved based on the diagnosis interview result. In a case where the goal is achieved, the goal determination means notifies the server 2 and the member terminal 4 that the goal is achieved and terminates the processing. In a case where the goal is not achieved, the goal determination means transmits to the member terminal 4 a mail for advising an execution of the new action plan, and the member sets the original or the new action plan, and the processing is configured to be repeated until the goal is achieved.

All or some of the goal registration means, the member registration means, the diagnosis interview sheet setting means, and the diagnosis starting date setting means, set by the terminal 3 of the person in charge in the present embodiment, may be previously set without being set with the terminal of the person in charge.

Similarly, all or some of the action plan setting means and the self-checking date setting means, set by the terminal 3 of the person in charge and the member terminal 4 in the present embodiment, may be previously set.

Second Embodiment

Next, a system according to the second embodiment using a screen as an example shown on the server computer will be hereinafter described.

[Administrator in Charge]

The administrator in charge is an administrator of the server, has an authority to select the person in charge giving this system, and registers the person in charge.

[Screen for Administrator in Charge]

A screen for the administrator in charge is a screen used by the administrator in charge, and the administrator in charge logs in upon entering each of a dedicated ID and a dedicated password to an initial screen (not shown) that prompts for the input of the login ID and the password.

Figure 3:
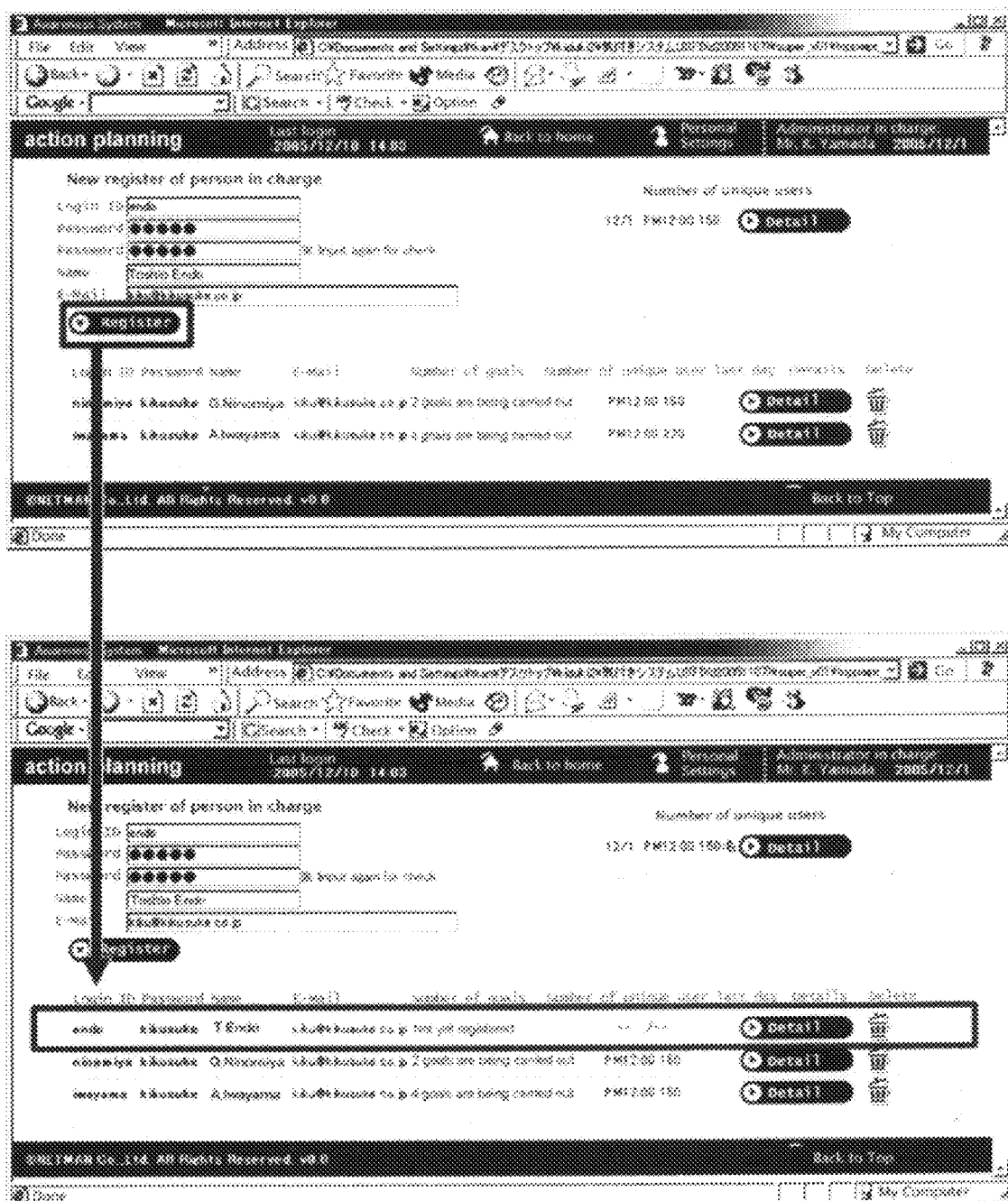
FIG. 3 is a diagram showing a top page for an administrator in charge.

Then, a screen of a top page for the administrator in charge as shown in FIG. 3 is displayed.

In the example shown by the figure, when necessary information, such as "login ID", "password", "name", "e-mail", and the like, of the person in charge to be newly registered is entered and "register" button is clicked, the newly registered person in charge is added to a table of the persons in charge in the lower part of the screen.

The table of the persons in charge shows detailed attributes of each person in charge.

In the example shown by the figure, items of each person in charge such as "login ID/Password/Name/E-mail/The Number of Goals/The Number of Members in a Previous Day/Details (see details)" are shown.

In the figure, a "unique user" means the "member".

In the newly registered person in charge, "the number of goals" is shown as "the goal is not yet registered", and "the number of members in a previously day" is none and accordingly is shown as "--". In a case of the already registered person in charge, the number of goals carried out by each of the members that the person in charge takes charge of is shown as, for example, "two goals are being carried out", and a confirmation time and the number of members are shown as, for example, "12:00 PM 150 members".

Figure 4A:
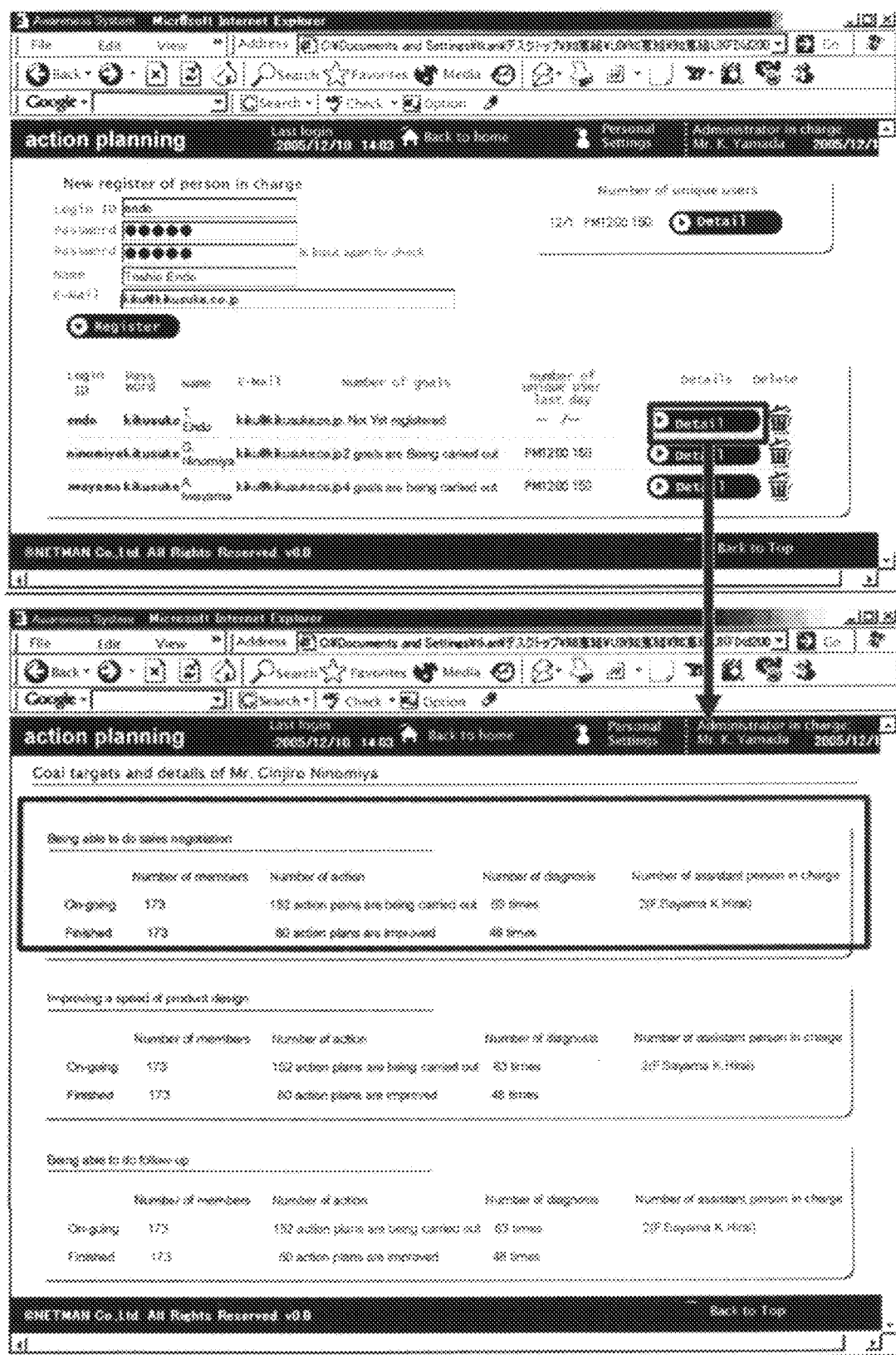
FIG. 4 (a) is a detailed screen of a goal linked to FIG. 3 for the person in charge.

When the "see details" button shown in an item of "details" of each of the persons in charge in the screen is clicked, the details of each of the goals taken care of by the person in charge of the members can be seen as shown in FIG. 4(a).

That is, the action plans toward the goal are divided into on-going ones and finished ones, and each of the number of members, the number of actions, the number of diagnoses, and the number of assistant person in charge is shown for each ones (see, FIG. 4(a)).

Figure 4B:
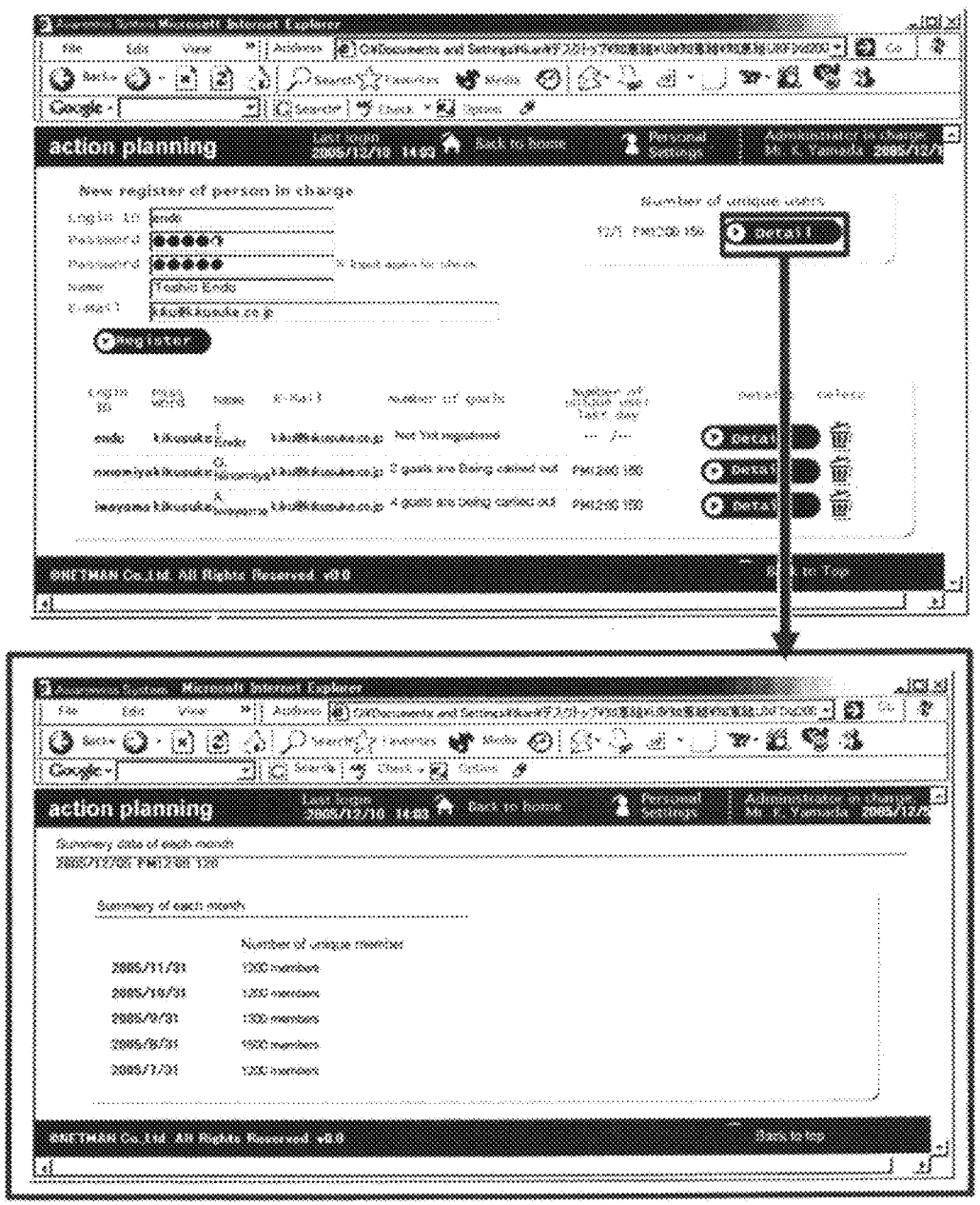
Figure 5A:
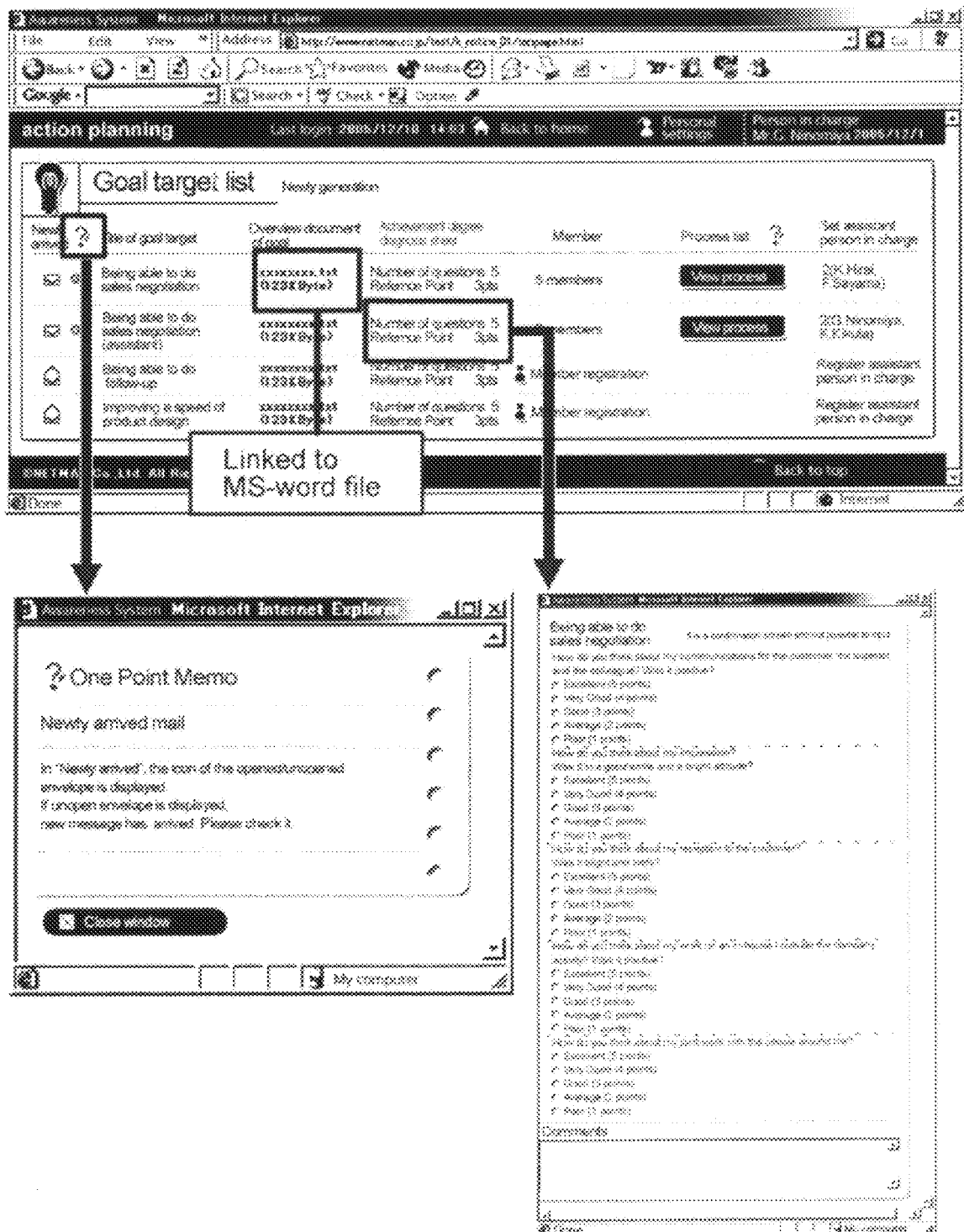
FIG. 5 (a) is a diagram showing the top page for the person in charge.
Figure 5B:
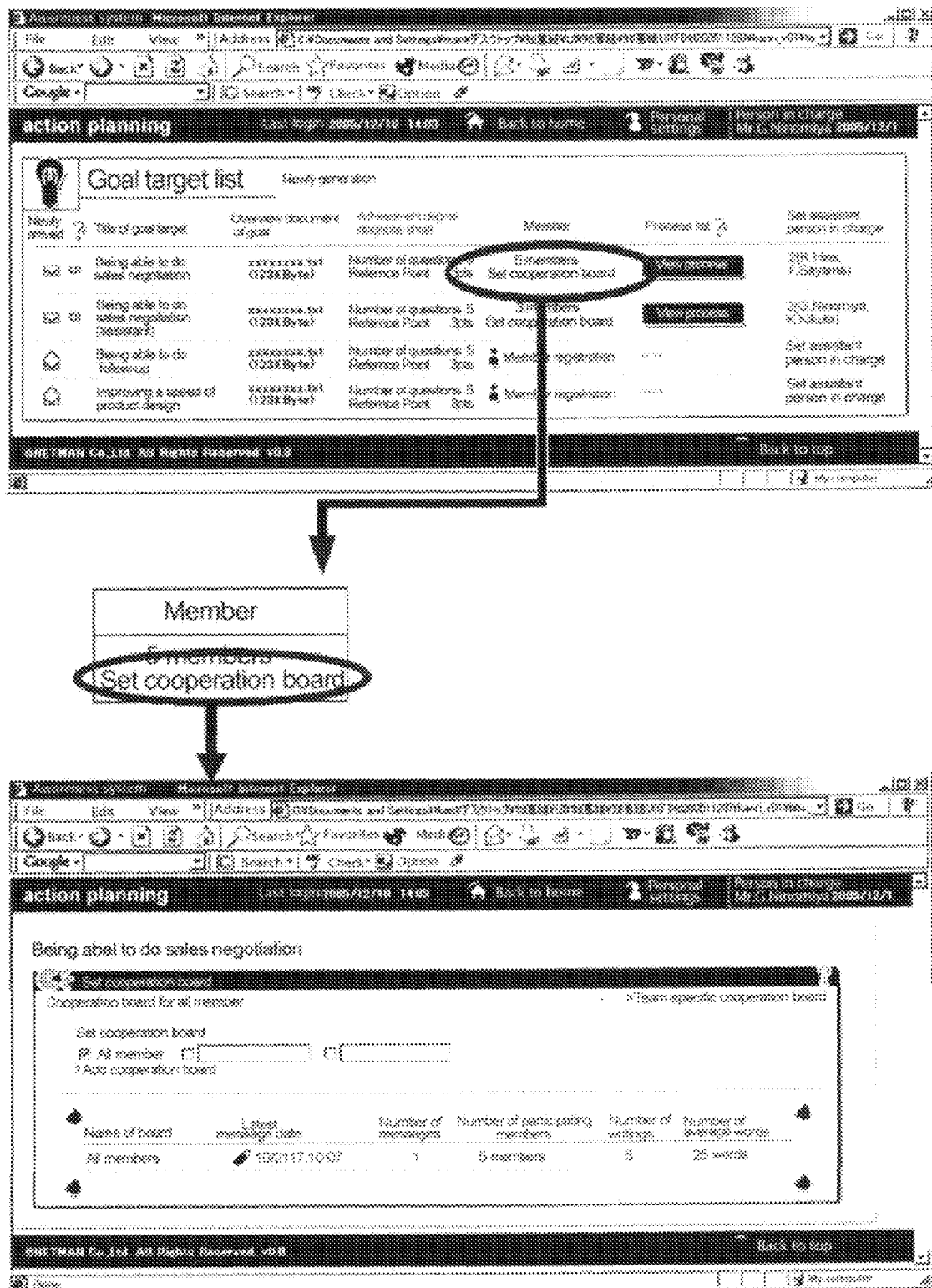
Figure 5C:
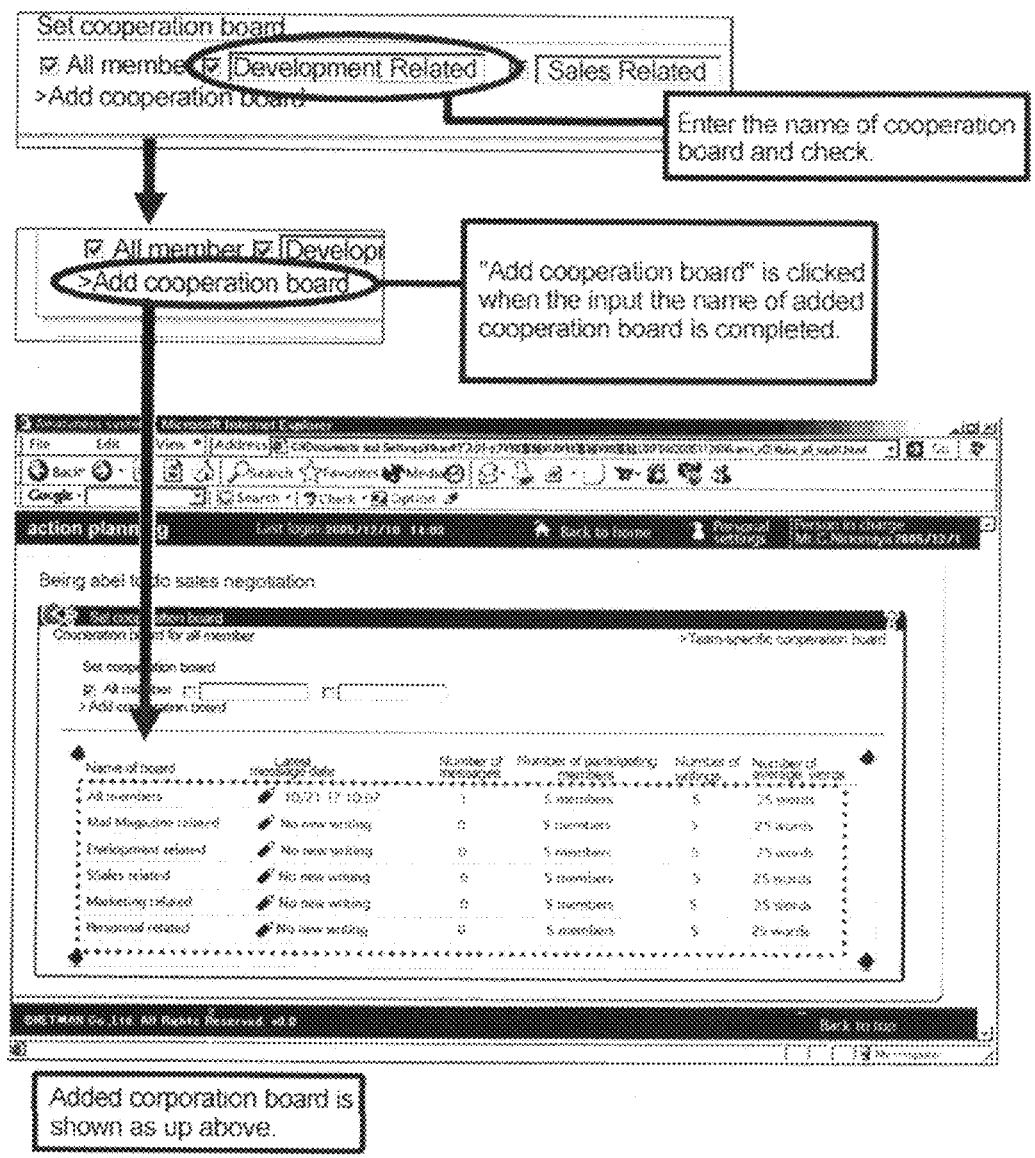
Figure 5D:
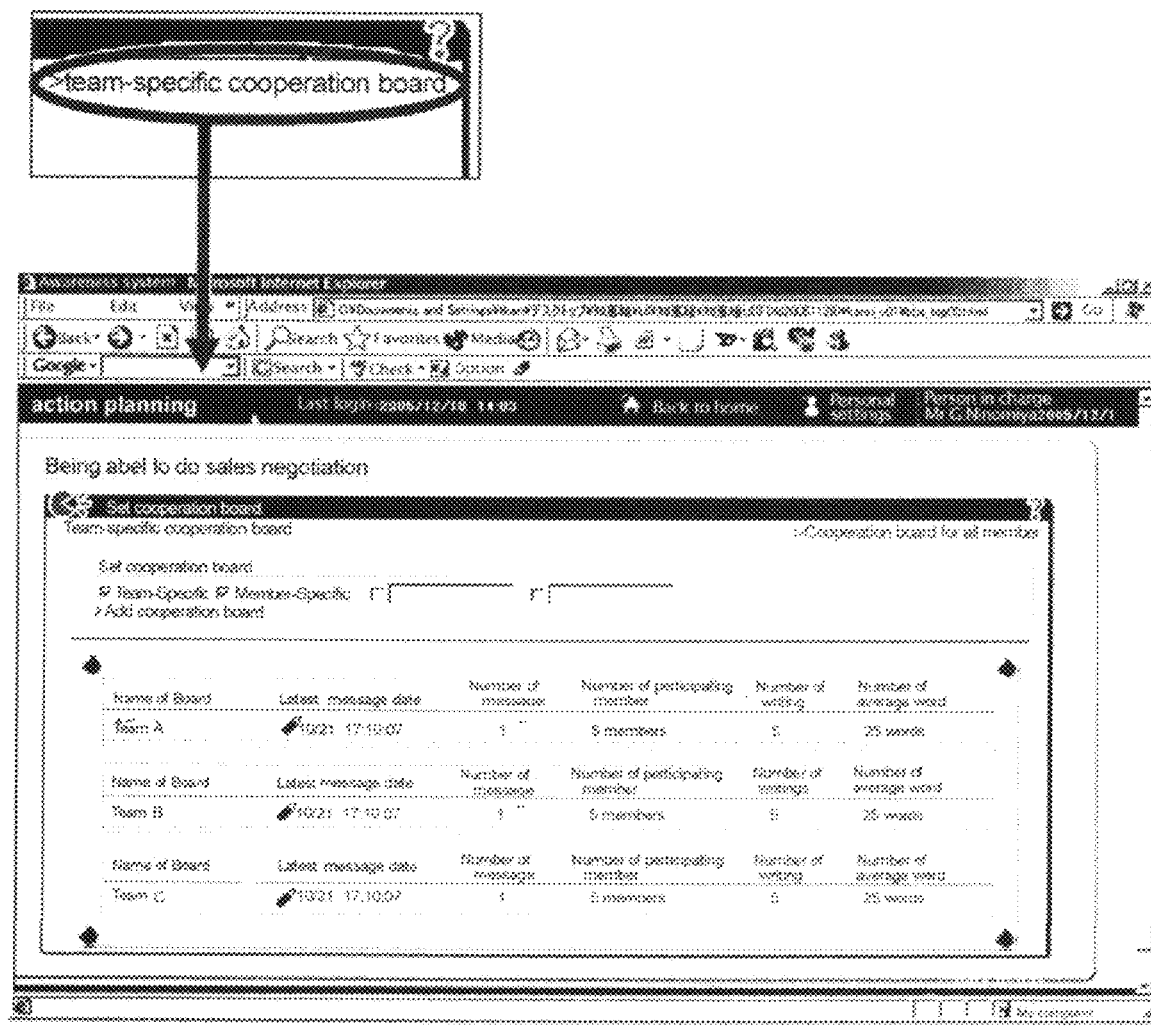
Figure 5E:
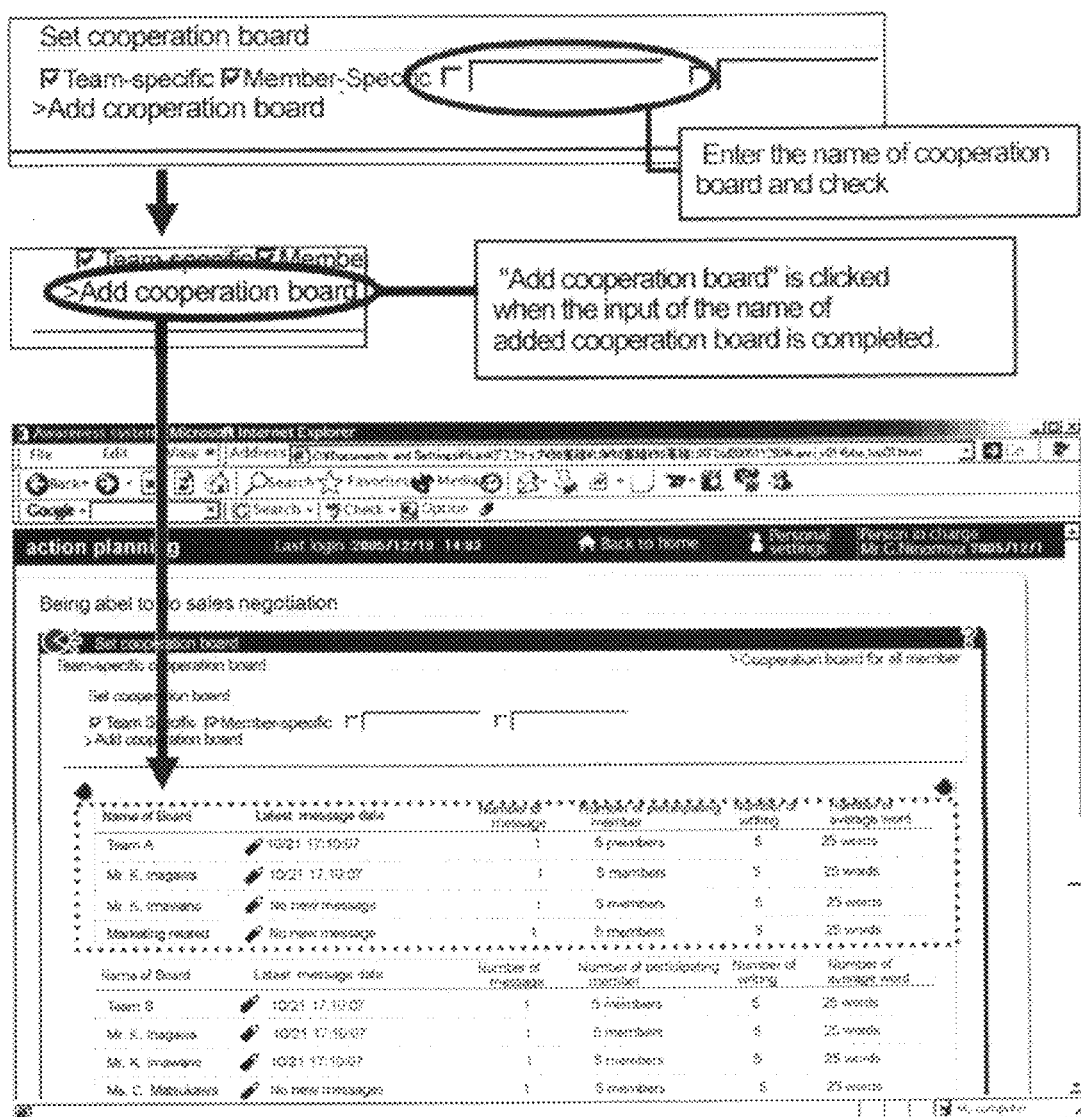
Figure 5F:
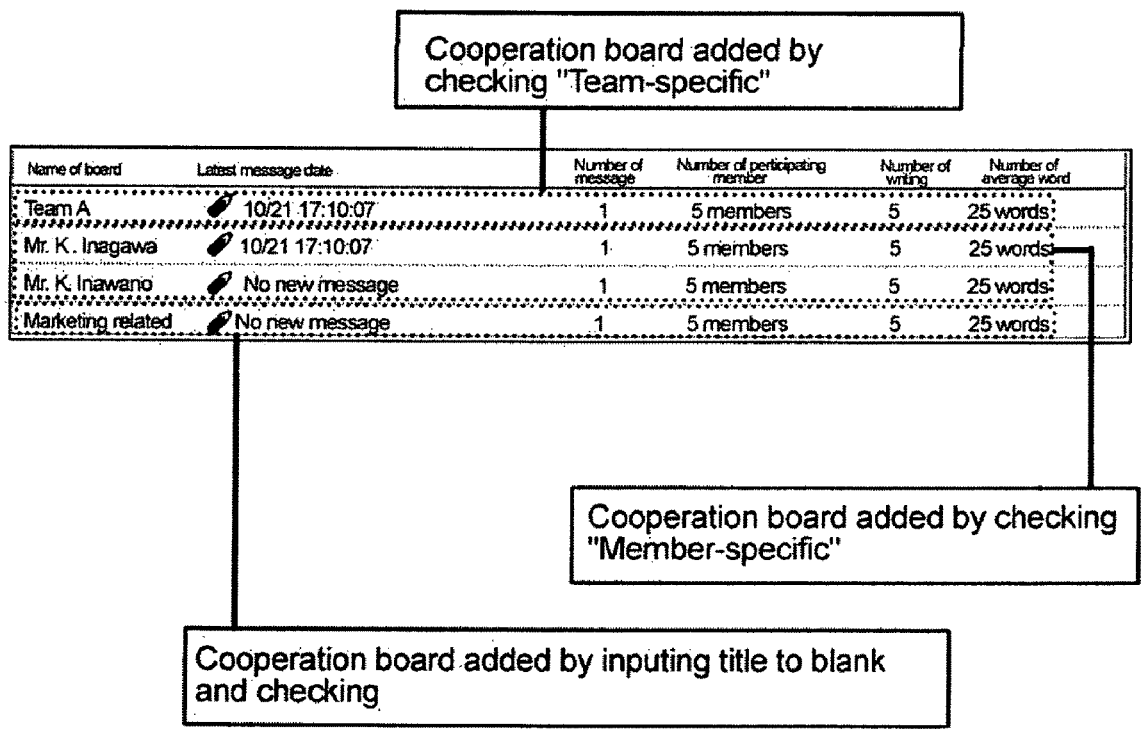
Figure 5G:
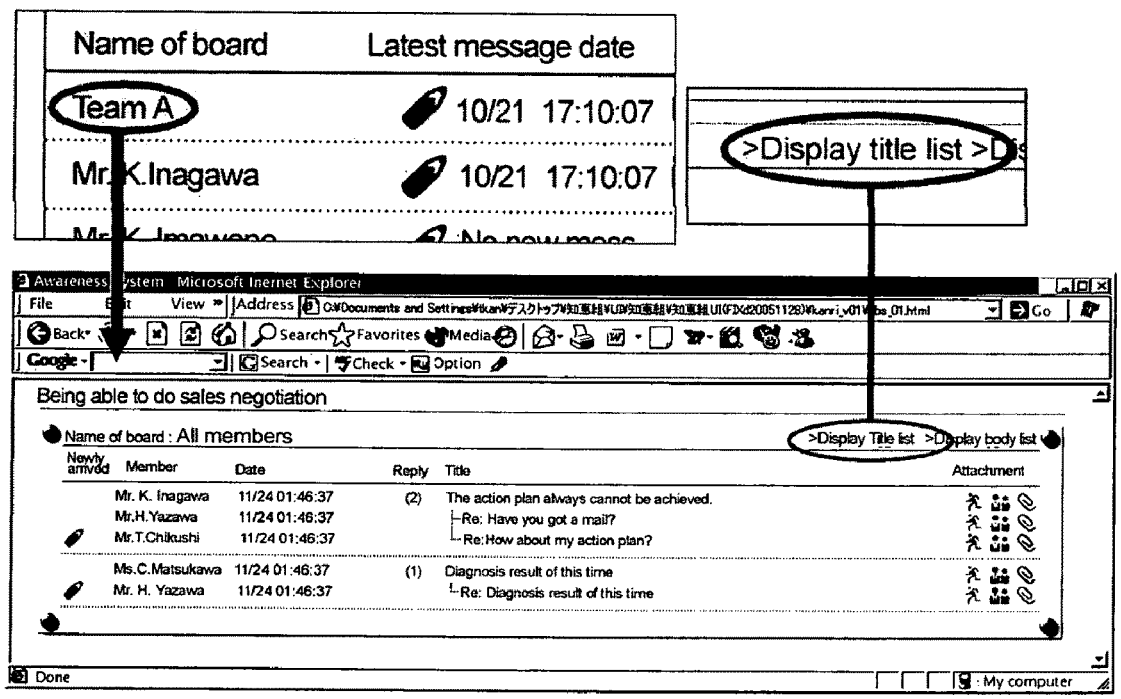
Figure 5H:
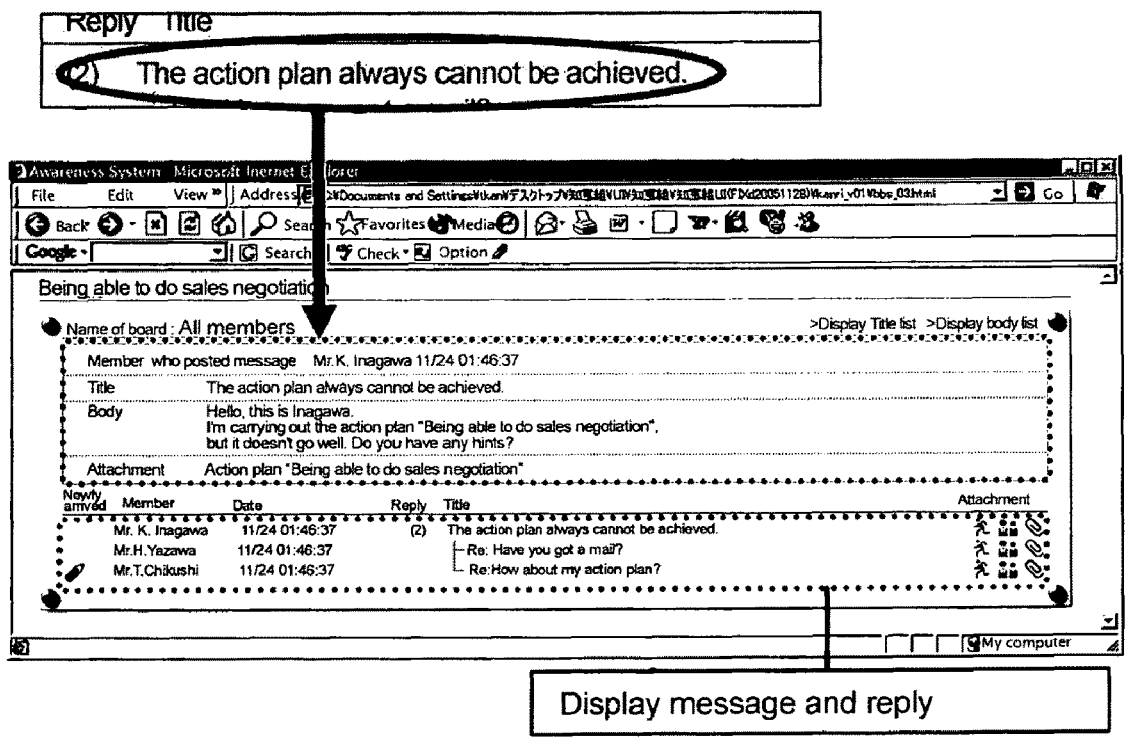
Figure 5I:
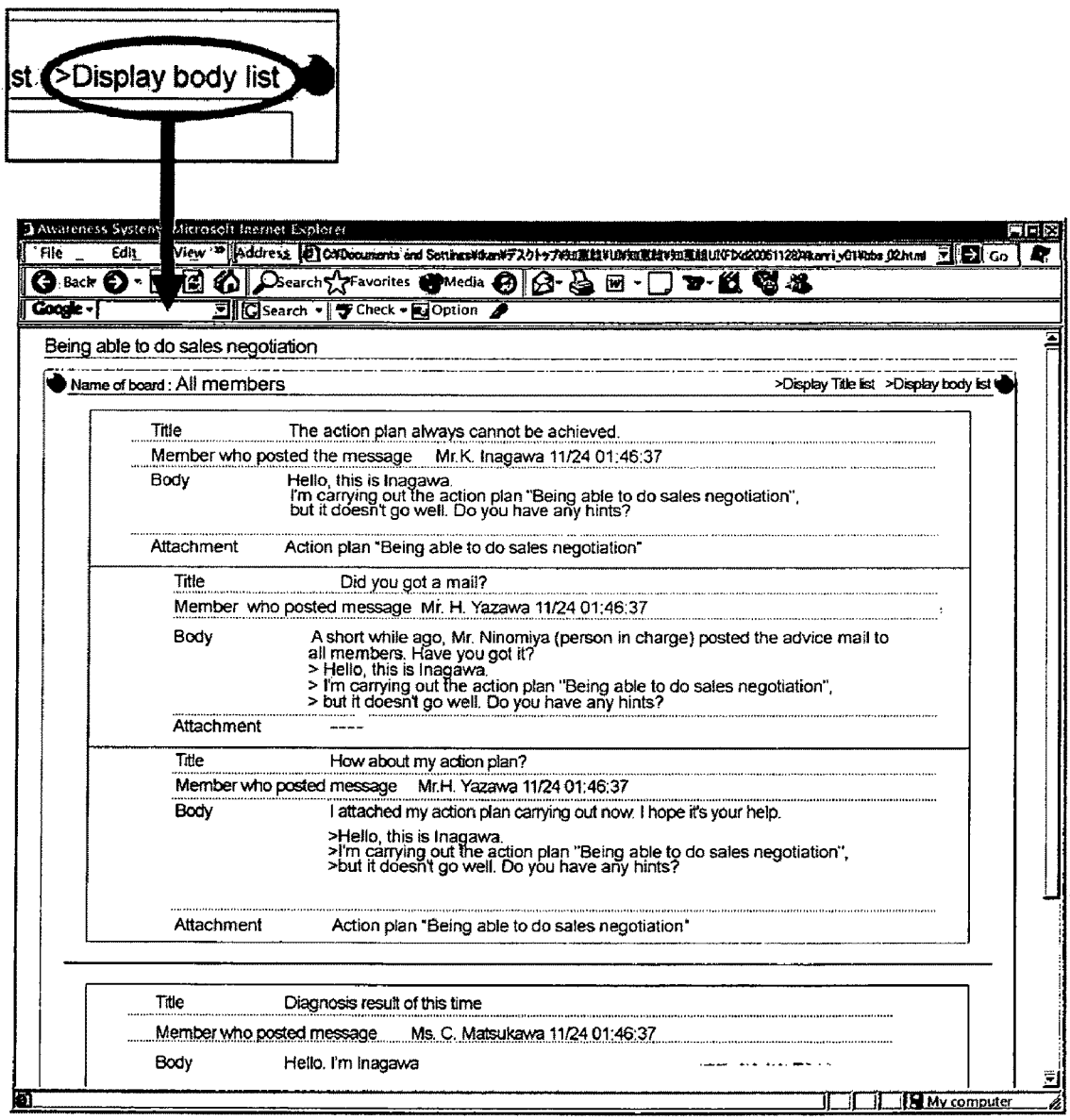

In the screen of FIG. 4(b), the item of "the number of members" (in the figure, the number of unique members) shows the number of members (150 members) of the current month (in the example shown by the figure, Dec. 1, 2005). When the "see details" button is clicked, how the number of members has changed is shown as summary data of each month, as shown by the arrow (see, FIG. 4(b)).

[Person in Charge]

The person in charge registered by the administrator in charge takes charge of reform support and education, can define a goal setting, can confirm a behavior process, can provide a follow-up with IT, and can do support activity by multiple persons.

That is, the person in charge has following five authorities.
(1) Set the goal setting
  1. Set a goal overview document
  2. Set a MAX date of an action plan timer
  3. Set a question/reference point of the diagnosis interview sheet
  4. Set a deadline of a starting date of the diagnosis interview sheet
  5. Set an advisor
(2) Register the member for each goal
(3) Register the assistant person in charge
(4) Give advice to the member
(5) Confirm the process

[Assistant Person in Charge]

The assistant person in charge is an advisor registered by the person in charge.

In many cases, the assistant person in charge is an expert, and has the same authorities as the person in charge, but cannot register the member and the assistant person in charge.

Accordingly, the assistant person in charge is the same as the person in charge except for the above-described registration of the member and the registration of the assistant person in charge, and thus, the description about the person in charge is substituted for the description about the assistant person in charge.

Figure 2A:
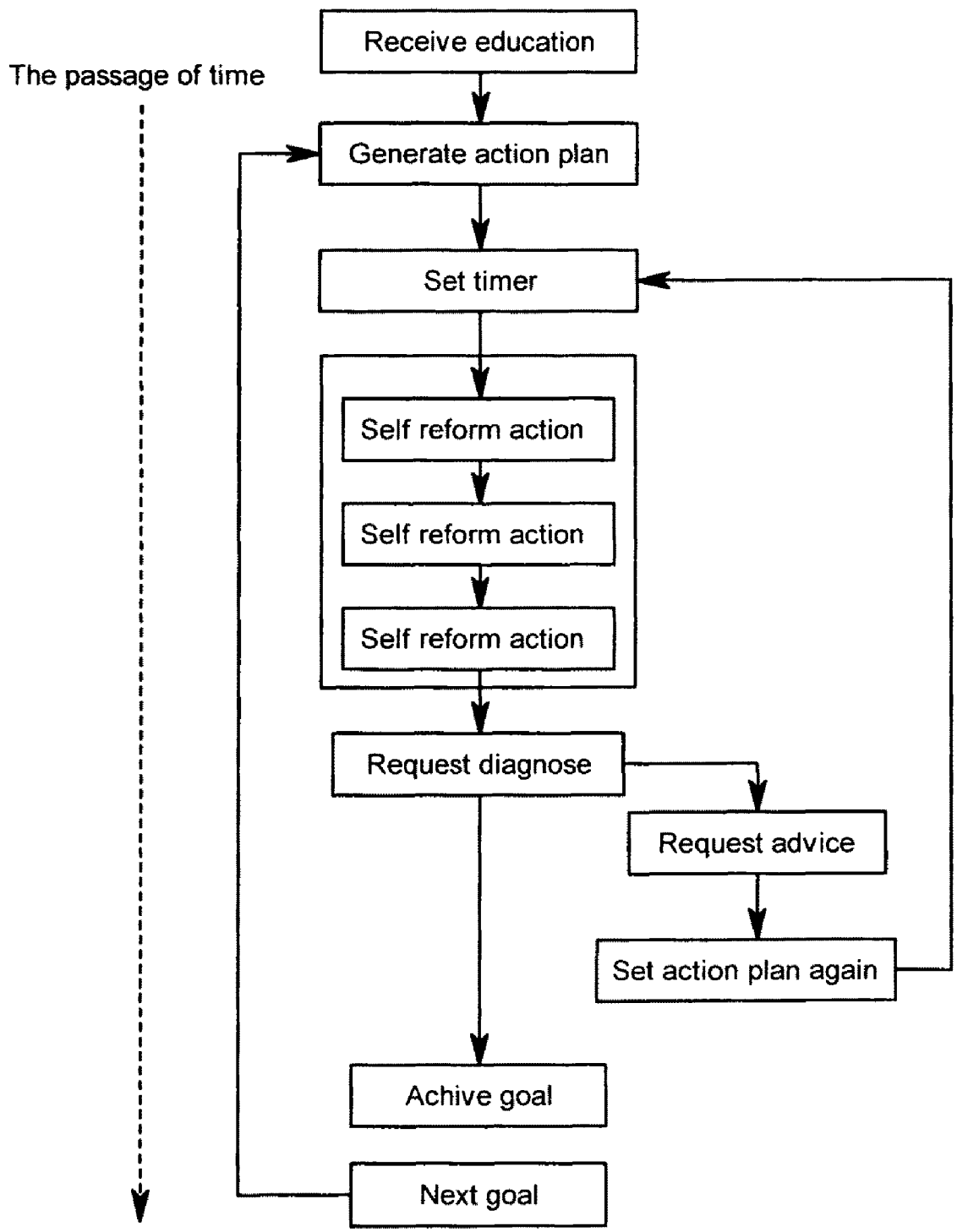
FIG. 2 (a) is a block diagram showing effects of the second embodiment.

In this system, as shown in FIG. 2(a), the constituent of the organization first receives an education, and in parallel with this, the goal is recognized, the action plan is made by the person in charge or by the member, a timer for mail transmission is set by a time capsule field.

Subsequently, the mail encouraging a self-check of the action plan is automatically and periodically delivered to the member at a date and time set by the timer.

By repeatedly doing the self-check of the action plan, the member repeatedly check self-reform behavior, and the action plan becomes a tool for making the member take notice (awareness) of the growth of behavior within him/herself, so that the member can be accustomed to a behavior checking of him/herself.

Subsequently, using the diagnosis interview sheet, the member undergoes the diagnosis performed by the member and the diagnostician, and a difference between a self-diagnosis and another person, i.e. the diagnostician, causes the member to take notice of a gap with the another person, thus allowing the member to go on to a subsequent behavior improvement. That is, a reutilization of changing a self-behavior based on an opinion of the another person is enhanced.

Subsequently, based on the diagnosis interview result showing a gap between the member and the diagnostician, an advisor consisting of the person in charge and the assistant person in charge is requested for a specialistic advice, and the member is encouraged to achieve behavior improvement of more high quality.

The advisor uses a mail function to reply an advice to the member or a questioner, and where the goal is determined to be achieved, the advisor uses the mail function to reply to the member to that effect and terminates the processing.

The member receiving the advice of the new action plan returns back to the above-described declaration of the new action plan and the setting of the timer for the mail transmission, and repeats the above-described steps up to achieving the goal.

The member uses the bulletin board function called a cooperation board at any time to mutually communicate between all of the members having the same goal target or some of the members, so that the member can take notice of the behavior improvement with each other person in the same position.

Figure 2B:
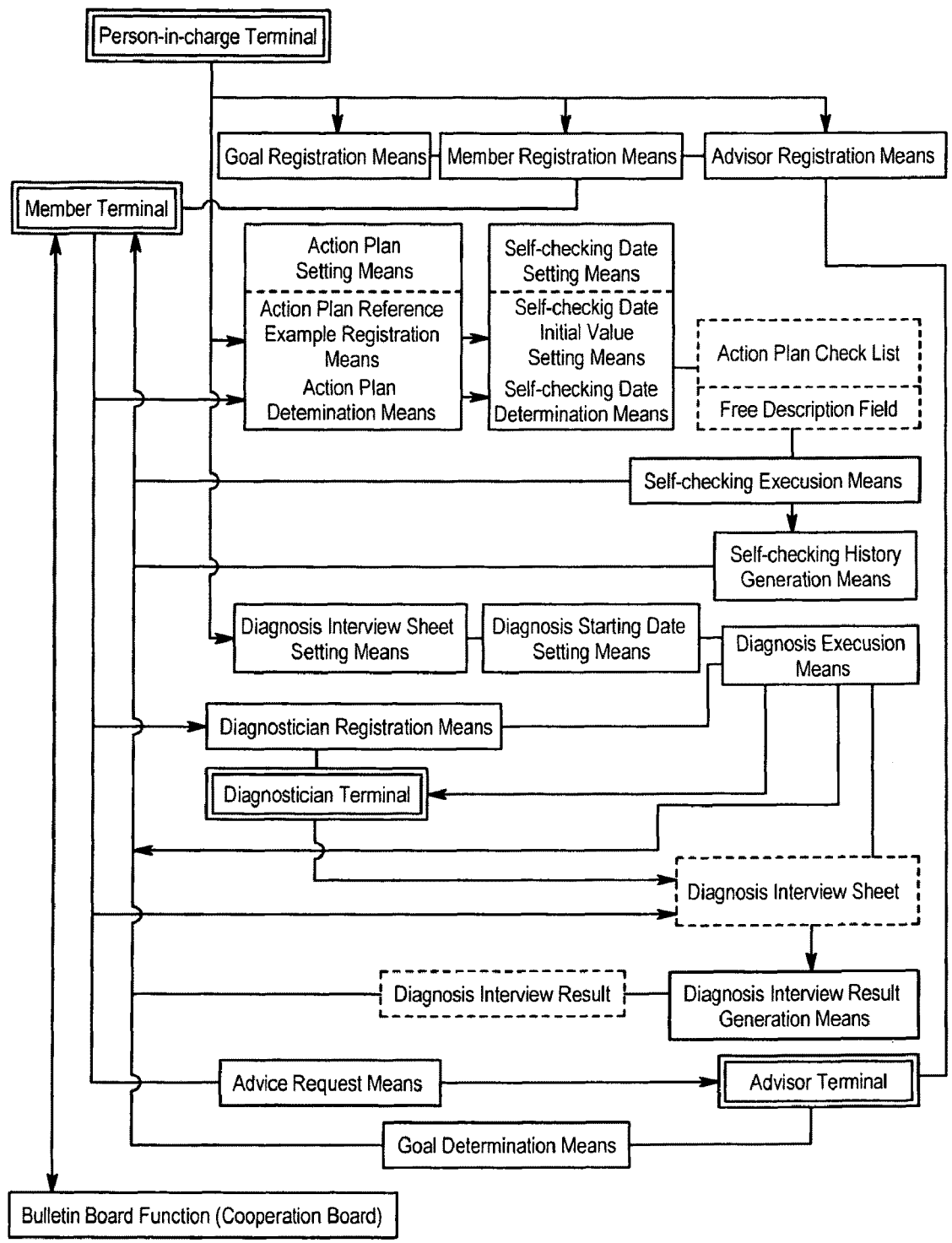

FIG. 2(b) is a function block diagram describing the second embodiment by comparison with the first embodiment, and a detailed description thereabout is given later by descriptions of each screen.

Figure 6:
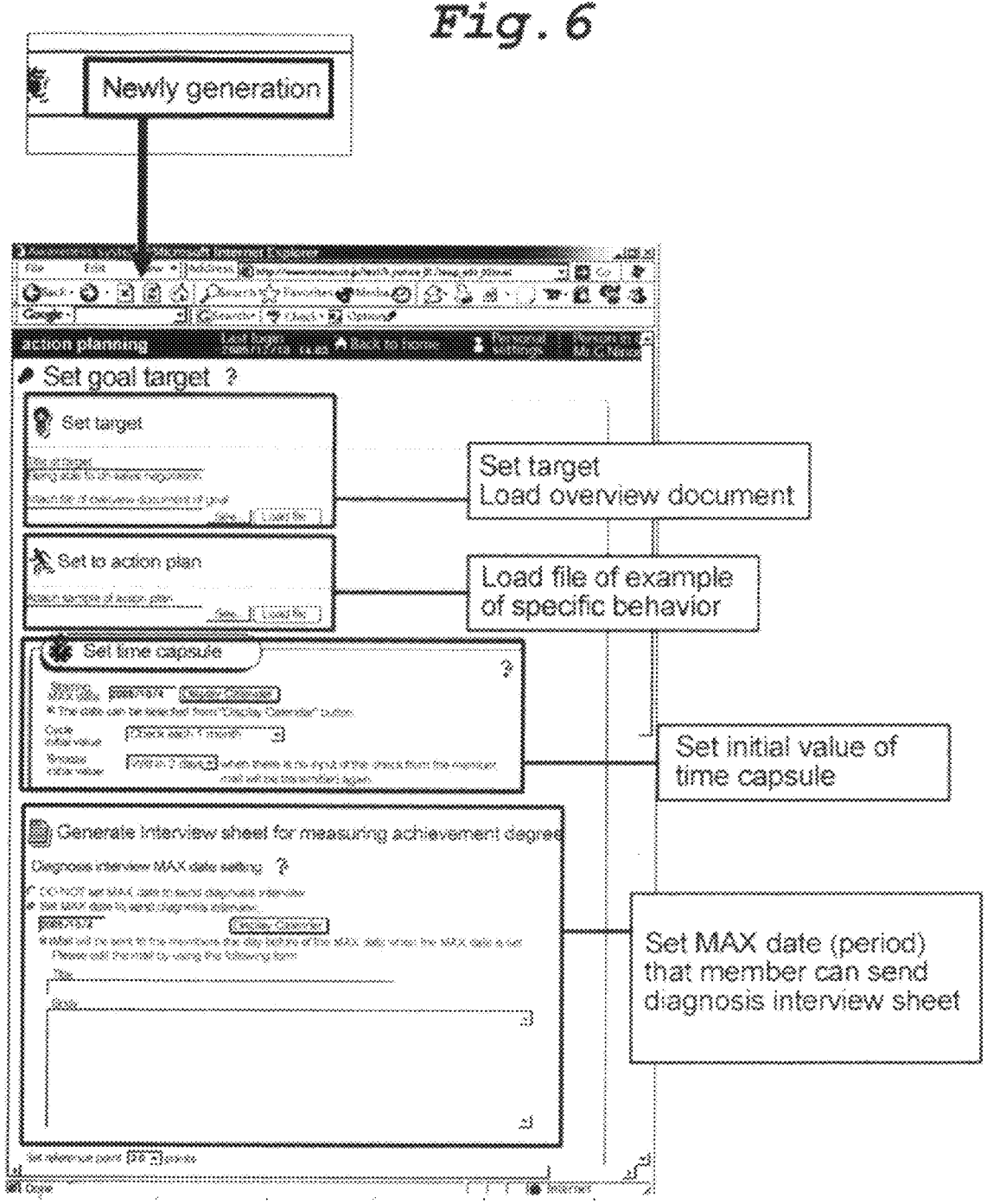
FIG. 6 is a newly generation screen of a target of a goal.

Herein, the person in charge is connected to the goal registration means (see, FIG. 6) receiving an input from the terminal 3 of the person in charge, the member registration means (see, FIGS. 17 and 18), an advisor registration means (see, FIGS. 7 and 26), an action plan reference example registration means (see, FIG. 6) of the action plan setting means, a self-checking date initial value setting means (see, FIG. 6) of the self-checking date setting means, the diagnosis interview sheet setting means (see, FIG. 7), and the diagnosis starting date setting means (see, FIG. 6).

Figure 33A:
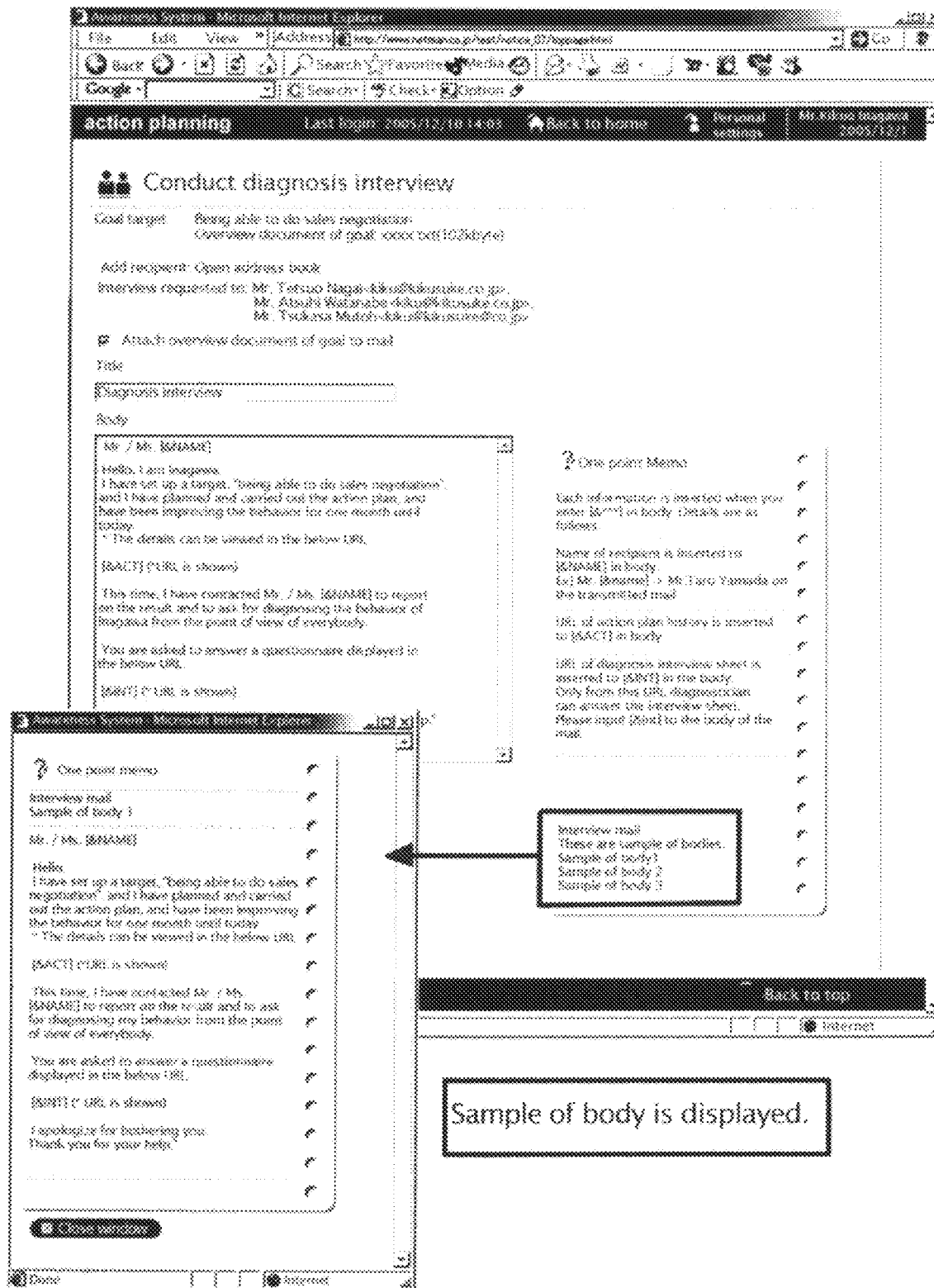
FIG. 33 (a) is a transmission mail generation screen of the diagnosis interview sheet.
Figure 39:
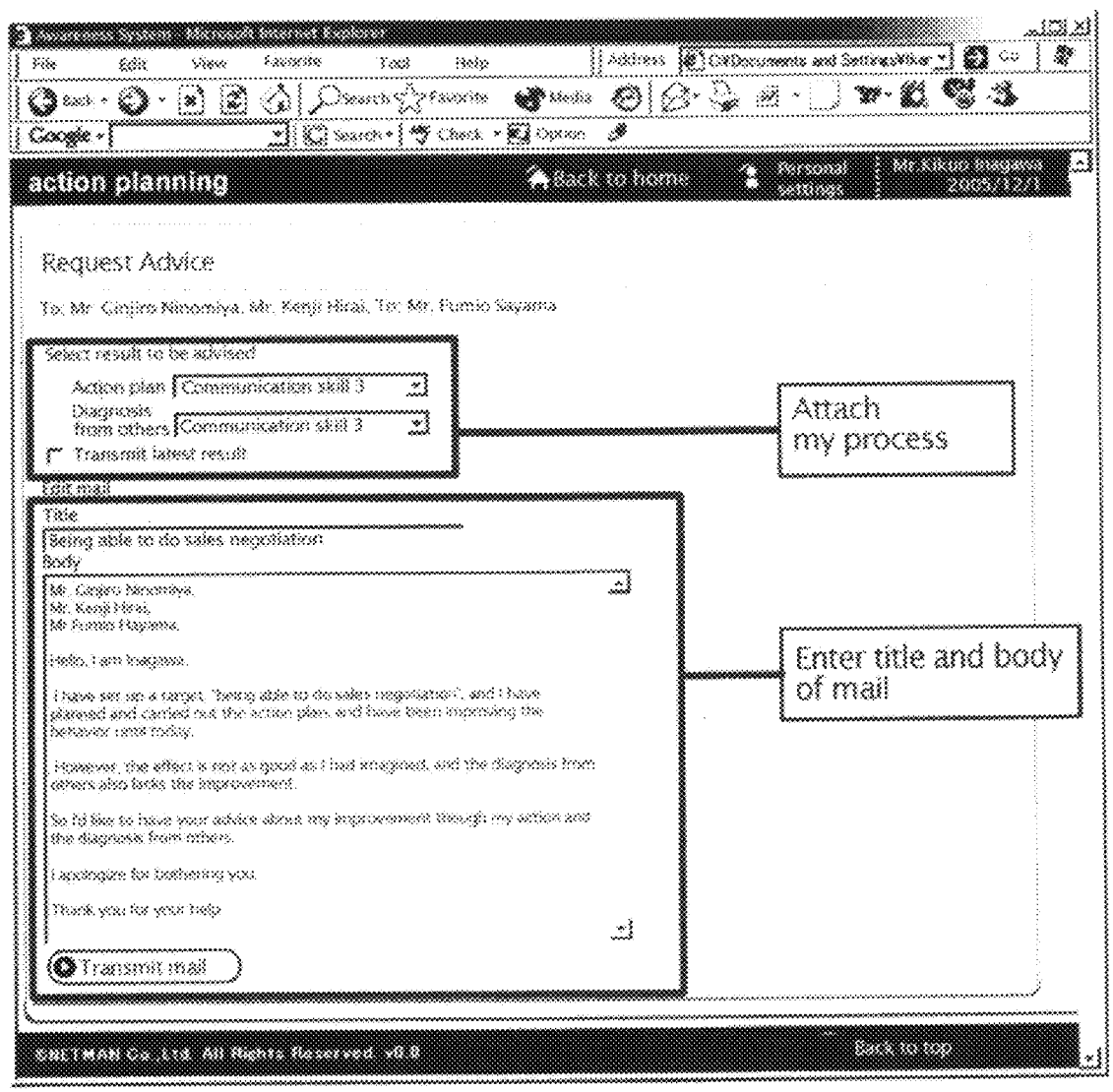
FIG. 39 is a mail generation screen requesting an advisor for an advice.

The member is connected to an action plan determination means (see, FIG. 28) receiving an input from the member terminal 4, a self-checking date determination means (see, FIG. 28), a diagnostician registration means (see, FIG. 33(b)), the diagnosis interview sheet (see, FIG. 40), and the advice request means (see, FIG. 39).

The diagnostician is connected to the diagnosis interview sheet (see, FIG. 40) receiving an input from the diagnostician terminal 5.

On the other hand, each of the self-checking execution means, a self-checking history generation means (see, FIG.

31), the diagnosis execution means, the diagnosis interview result, the goal determination means (see, FIGS. 14 and 16) of the action plan is connected to the member terminal 4, and is connected to transmit data by e-mail and link.

The member terminal 4 is connected to the terminals 4, 4, . . . of other members with the bulletin board function (the cooperation board) (see, FIGS. 41 to 46) set by the person in charge.

The advisor terminal 6 is connected to the advice request means and receives a mail from the member terminal 4, and is connected so that the advisor terminal 6 can make a determination as to the goal with the goal determination means and can transmit a mail for advice to the member terminal 4.

[Screen for Person in Charge]

A screen for the person in charge is a screen used by the person in charge, and the person in charge logs in upon entering each of a dedicated ID and a dedicated password to an initial screen (not shown) that prompts for the input of the login ID and the password.

Then, a screen of a top page ("goal target list" screen) for the person in charge as shown in FIGS. 5 (*a*) and (*b*) is displayed.

This screen shows a goal target list consisting of each of items "Newly Arrived/HELP/Title of Goal Target/Overview Document of Goal/Achievement Degree Diagnosis Sheet/Member/Process List (see process)/Set Assistant Person in Charge".

In a similar manner as a later-described screen for a member side, "HELP" represented by "?" mark has a link to a one-point memo that is helpful in using this system.

"Title of Goal Target" shows titles of goal targets, for example, "being able to do sales negotiation", "being able to do follow-up", and the like.

"Overview Document of Goal" has a link to an overview of each of the goals shown by the titles of the goal targets. For example, it is linked to a text file or a word file.

"Achievement Degree Diagnosis (Interview) Sheet" recites the number of questions and a reference point, and has a link to the corresponding "Achievement Degree Diagnosis Interview Sheet".

When "Newly Generate" is clicked in the screen of the top page, the screen becomes "Set Goal Target" screen as shown in FIG. 6. Where a title is entered to "Title of Target" field in "Set Target" portion in the first section of the screen, the entered title is shown in "Title of Goal Target".

A destination to save the file of the overview document defining the previously generated goal is entered to "Attach File of Overview Document of Goal" field, and is specified, so that the file is loaded.

In "Set to Action Plan" portion in the second section, a destination to save a file of an example (an action plan reference example) of a specific behavior previously generated by the person in charge is entered to "Attach Sample of Action Plan" field, and is specified, so that the file is loaded.

In "Set Time Capsule" portion in the third section, a starting MAX date is configured, that is, an initial value of a starting date (a self-checking date) on which the start of the self-check of the action plan with the check sheet is notified to the member via mail, and a cycle initial value (an interval for mails repeating the above-mentioned check addressed to the member), a snooze initial value (a period for mails encouraging the self-check of the above-mentioned action plan where there is no input of the check from the member), and the like are set. The above-mentioned input values may be changed by an input from the member terminals as described later.

In "Generate Interview Sheet for Measuring Achievement Degree" portion in the fourth section, a later-described diagnosis starting date (a transmission date) of the diagnosis interview sheet is set to "Diagnosis Interview MAX Date Setting" field.

The MAX date is the diagnosis starting date, and a date on which the person in charge inputs is usually determined as the transmission date of a mail requesting for a reply to the diagnosis sheet.

Furthermore, input fields for a title and a body are arranged for generating the above-mentioned mail.

Figure 7:
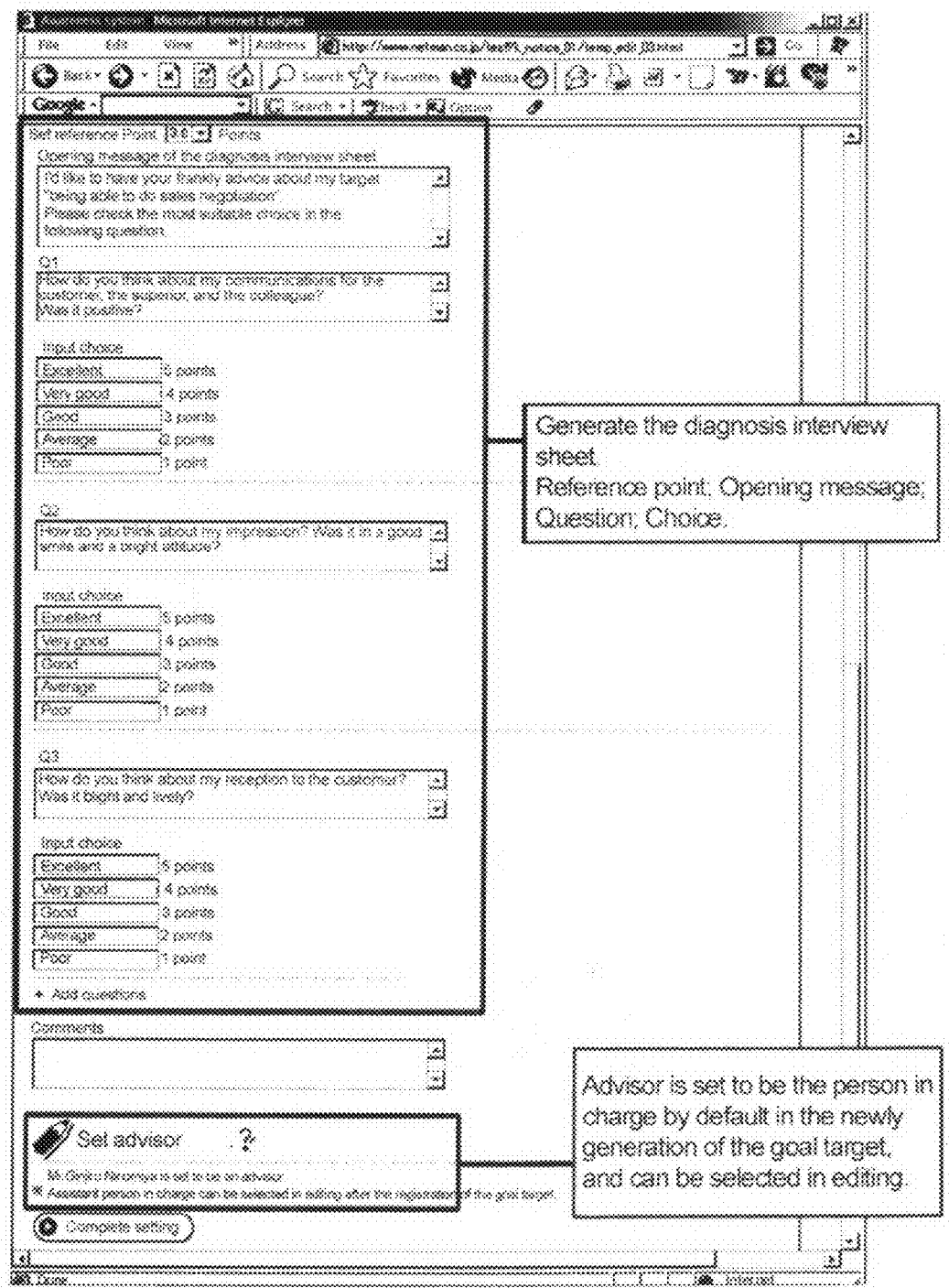
FIG. 7 is a screen subsequent to FIG. 6.

A screen shown in FIG. 7 is a screen subsequent to the above-mentioned FIG. 6, and is a screen on which the person in charge generates "the diagnosis interview sheet" requesting the member and the diagnostician for the diagnosis.

In the screen, "Set Reference Point", "Opening Messages of Diagnosis Interview Sheet", examination Messages for each "question", "Input Choice" serving as a reply, and the like are entered.

Regarding "Reference Point" in the example shown by the figure, for example, each question is counted as one point, and the reference point is set as three points out of full five points.

Multiple question examples and alternative examples are previously registered, and the person in charge can easily generate the diagnosis interview sheet by choosing them.

Furthermore, there is "Set Advisor" item, and the advisor is set to be the person in charge by default in the newly generation of the goal target.

After the goal target is registered, the assistant person in charge can be selected as the setting of the advisor in editing.

In a top page for the person in charge as shown in FIG. 5 (*a*), it is preferable to set up the cooperation board (the bulletin board) that enables the members to discuss with each other on the server by arranging "Set Cooperation Board" item for each of the goal targets set for the members in "Member" item as shown in FIG. 5 (*b*).

When a character portion of the above-mentioned "Set Cooperation Board" is clicked, a selection screen is opened that allows selection of the cooperation boards for all of the members allowing participation of all of the members registered in each of the goal targets and team-specific cooperation boards that the member can view in units of the teams, and in the example shown by the figure, a cooperation board generation screen for all of the members is first displayed as shown by the arrow in FIG. 5 (*b*).

In the cooperation board generation screen for all of the members in the example shown by the figure, there are "Participation of Everybody" and "Blank Field" in an item of generation of the cooperation board, and a field for checkmark is formed for each of them.

In the present embodiment, "Participation of Everybody" is checked, and when "Add Cooperation Board" is clicked, the cooperation board having a name "Participation of All Members" is generated.

Furthermore, upon unchecking "Participation of Everybody", entering, for example, "Development Related" to the blank field as a name of the cooperation board, checking the field, and clicking "Add Cooperation Board", the cooperation board having the name "Development Related" can be added.

In the lower section of the cooperation board generation screen for all of the members as described above, a list of the cooperation board for all of the members is shown, and a cooperation board name, a latest messages date, the number of messages, the number of participating members, the number of writings, and the like are set in the list of the cooperation board as shown in FIG. 5 (*c*).

Next, when ">Team-Specific Cooperation Board" is selected and clicked in the screen of FIG. 5 (*b*), the screen becomes a team-specific cooperation board generation screen for generating the cooperation board that can be viewed in units of teams as shown in FIG. 5 (d).

Herein, it is necessary to previously divide the members to teams as described later so that the team-specific cooperation board is generated.

In the team-specific cooperation board generation screen, there are "Team-Specific", "Member-Specific", and "Blank Field" in an item of generation of the cooperation board, and fields for checkmarks are formed for each of them as shown in FIG. 5 (e).

Then, when "Team-Specific" is checked, the cooperation board having the name of each team is added. When "Member-Specific" is checked, the cooperation board having the name of the member is added. When a desired title is entered to the vacant field and the field is checked, the cooperation board having the desired title is added.

Then, in the lower section of the team-specific cooperation board generation screen, for example, a list is shown consisting of the team-specific cooperation board of "A Team", the member-specific cooperation board of "Mr. Kikuo Inagawa" and "Mr. Seizaburo Imawano", the desired title cooperation board of the "Marketing Related", and the like as shown by a list in FIG. 5 (f).

Display items of the cooperation board are the cooperation board name, the latest messages date, the number of messages, the number of participating members, the number of writings, and the like, and are the same as the display items of the cooperation board in FIG. 5 (c).

Then, regarding each of the cooperation boards, when the team-specific cooperation board name is clicked, the selected cooperation board is opened as shown in FIG. 5 (g).

The cooperation board shows items "Newly Arrived" showing whether a message is unread, "Member" showing the name of the member who posted the message, "Reply" showing the number of replies to the new message, "Title" showing the titles of the messages and the replies, and "Attachment" showing whether there is a material.

When the title of the message in the above-described cooperation board, namely, "(2) The action plan always cannot be achieved" in the example shown by the figure, is clicked, all of a content of the message (the member posted the message, the title, the body, and the attachment) is shown in the upper section, and in the lower section, the above-described selected message and the reply thereto are shown in association, as shown in FIG. 5 (h).

When ">Display Body List" is clicked, the bodies of all of the messages in the above-described cooperation board are displayed as shown in FIG. 5 (i).

The bulletin board function of the cooperation board as described above enables communication between all of the members having the same goal target or between the members within the team and enables the members to take notice (awareness) of new ideas with each other member.

Figure 8:
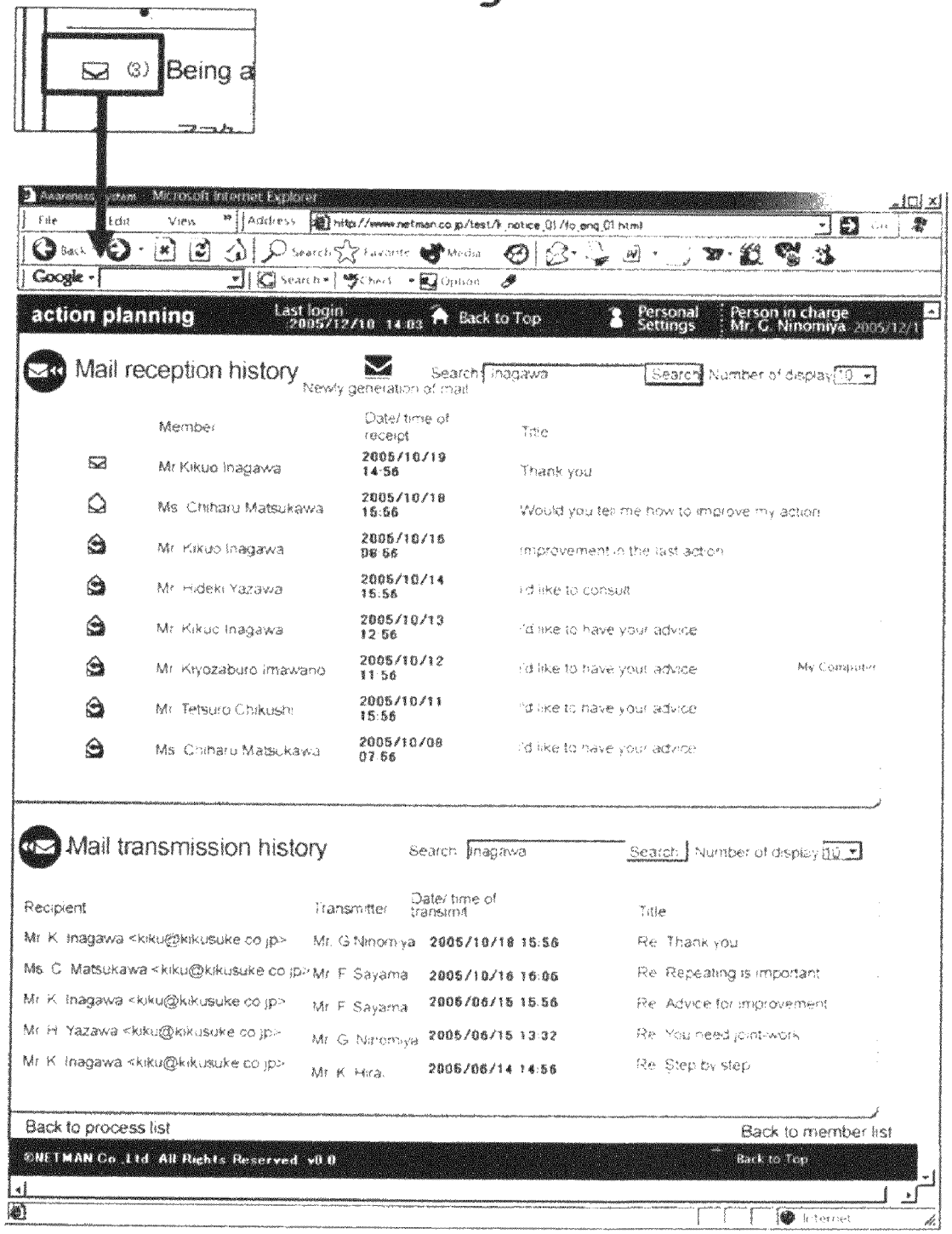
FIG. 8 is a transmission and reception list screen of mails of advice.

In the screen of the above-described FIG. 5 (a), when an envelope mark in the "Newly Arrived" field for each of the goal targets is clicked, the screen moves on to "Mail Reception History/Mail Transmission History" screen as shown in FIG. 8, and a list screen of transmission and reception history of advice mails between the advisor and the member regarding the prescribed goal target is shown.

Herein, the mail reception history section consists of items "Member/Reception Date and Time/Title".

On the other hand, the mail transmission history section consists of items "Recipient/Sender/Transmission Date and Time/Title".

Figure 9:
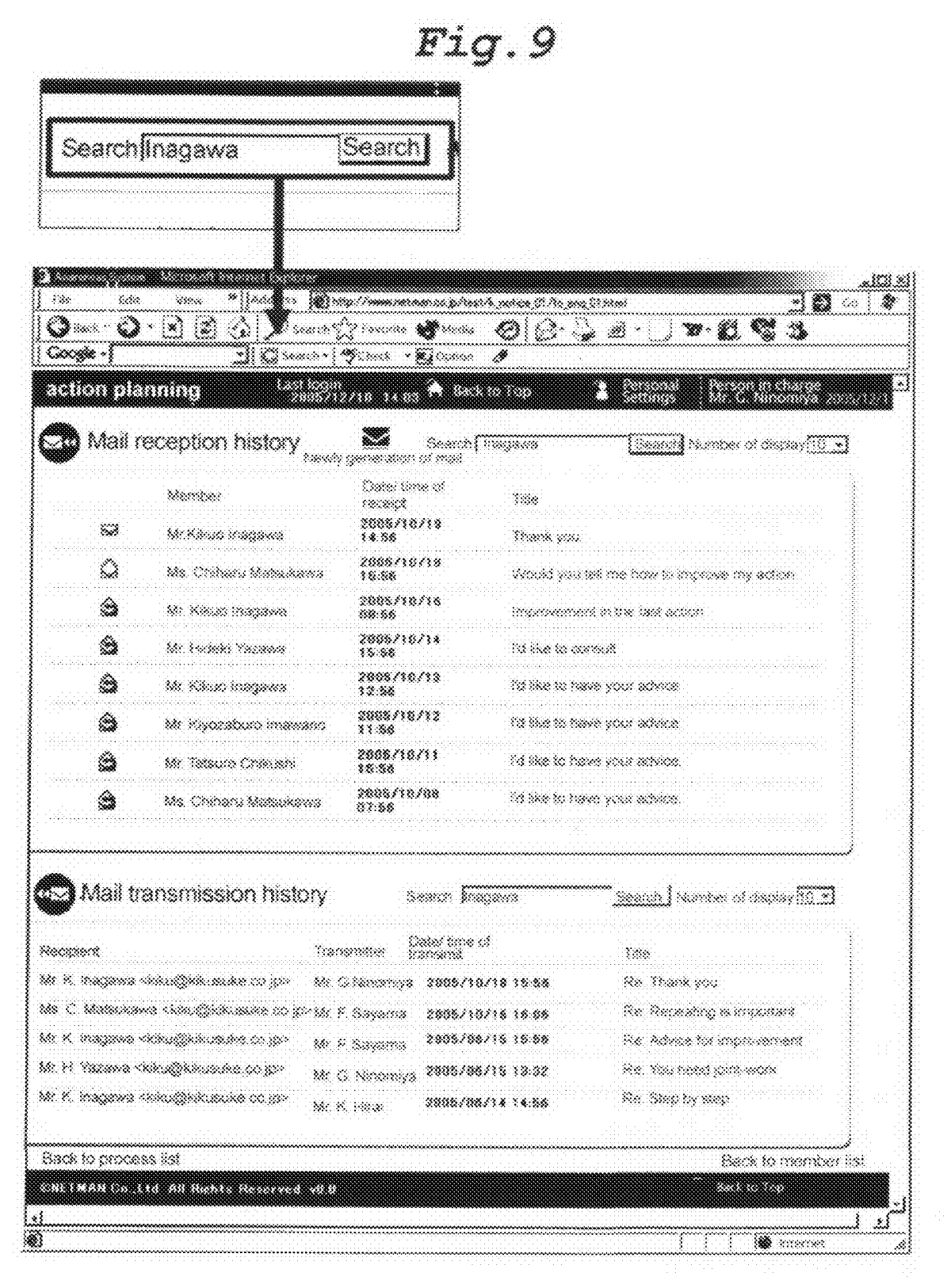

In the above described screen, as shown in FIG. 9, "Search" field and "The Number of Display" field are arranged for each of the mail transmission and reception history sections, so that a keyword can be entered to the search field, and transmitted and received mails can be searched with the number of display specified. Thus, a keyword search such as a name can be executed.

For example, in the example shown by the figure, when "Inagawa" as the name is entered as the keyword and is searched, the mail reception history and the mail transmission history of the member corresponding to "Inagawa" are extracted and displayed in the list.

Figure 10:
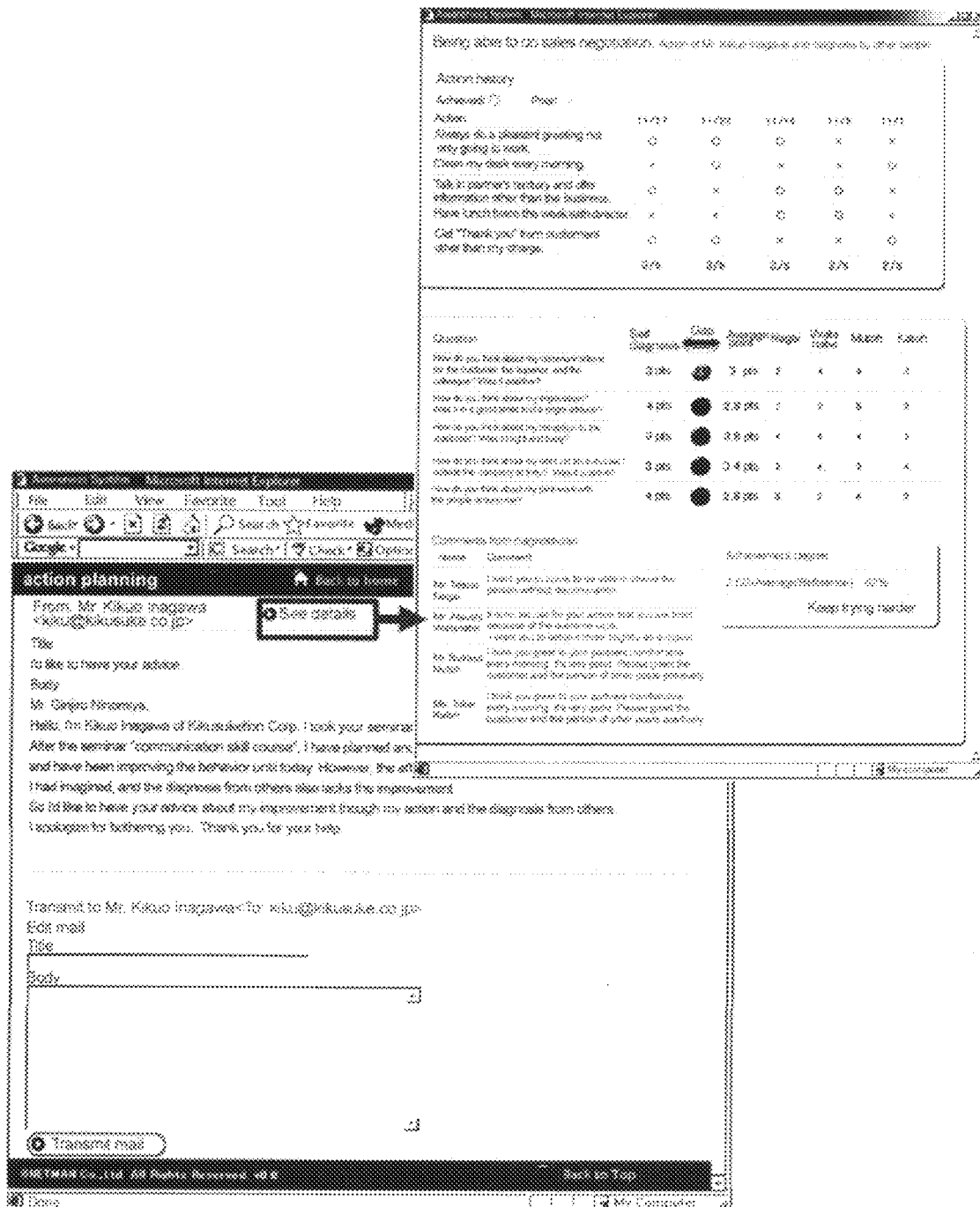
FIG. 10 is a mail screen from a member to an advisor.

Then, when the title or the envelope mark of each of the mails shown in the mail reception history is clicked, the title and the body of the clicked received mail and a screen of a reply generation section for replying thereto are displayed as shown in FIG. 10, and input fields for the title and the body are arranged in the reply section to enter a reply message, such as the advice from the advisor (the person in charge or the assistant person in charge), replying to the above-described received mail.

In a case where the received mail is the request for the advice, "See Details" button is shown in the mail screen (see, FIG. 10).

When "See Details" button is clicked, the data attached (or linked) to the mail by the member is shown on the screen, that is, in the example shown by the figure, "Behavior History" consisting of a history of the self-checks, a result of the diagnosis interview comparing the diagnosis interview results of the member him/herself and the diagnostician, and a history of self-comments are shown on the screen, and the advisor generates the reply message considering these screens.

The person in charge can generate at one time a transmission mail from the screen of the list of the transmitted and received mails.

Figure 11:
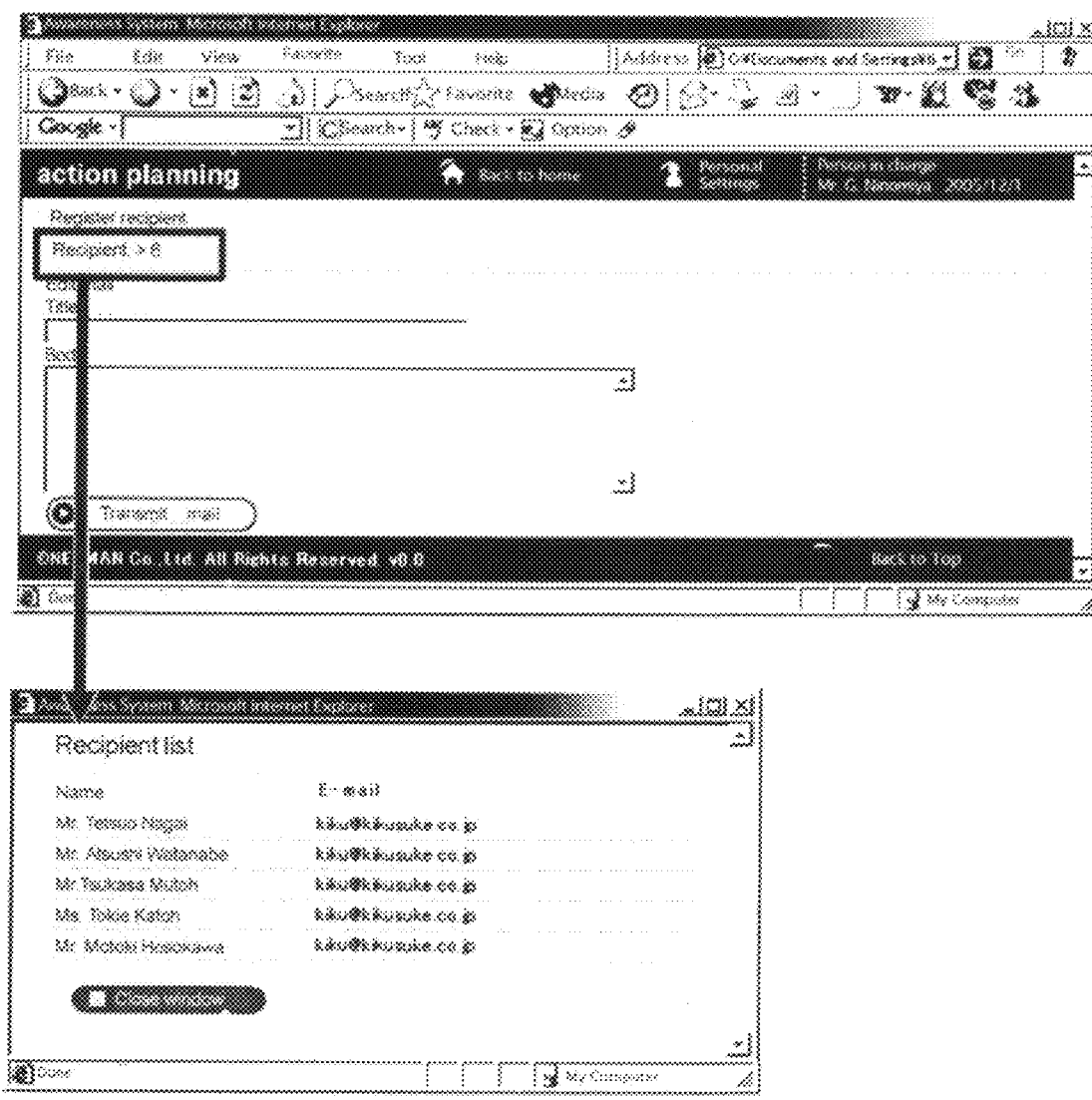
FIG. 11 is a transmission mail generation screen.

For example, when "Generate New Transmission Mail" in FIG. 8 is clicked, a screen in FIG. 11 is opened.

In this screen, "Recipient: >6 sets" is displayed in "Register Recipient" item, and when a character portion thereof is clicked, "Recipient List" screen is opened that shows a list of names and e-mail addresses of the members registered for each of the goals, and thus, the members to which the mail is planned to be transmitted can be confirmed.

Furthermore, when "Mail Title" and "Mail Body" fields are entered in this screen and "Transmit Mail" button is clicked, the mail of the same content can be transmitted at one time to all of the six sets registered in the above-described recipient list.

Figure 12:
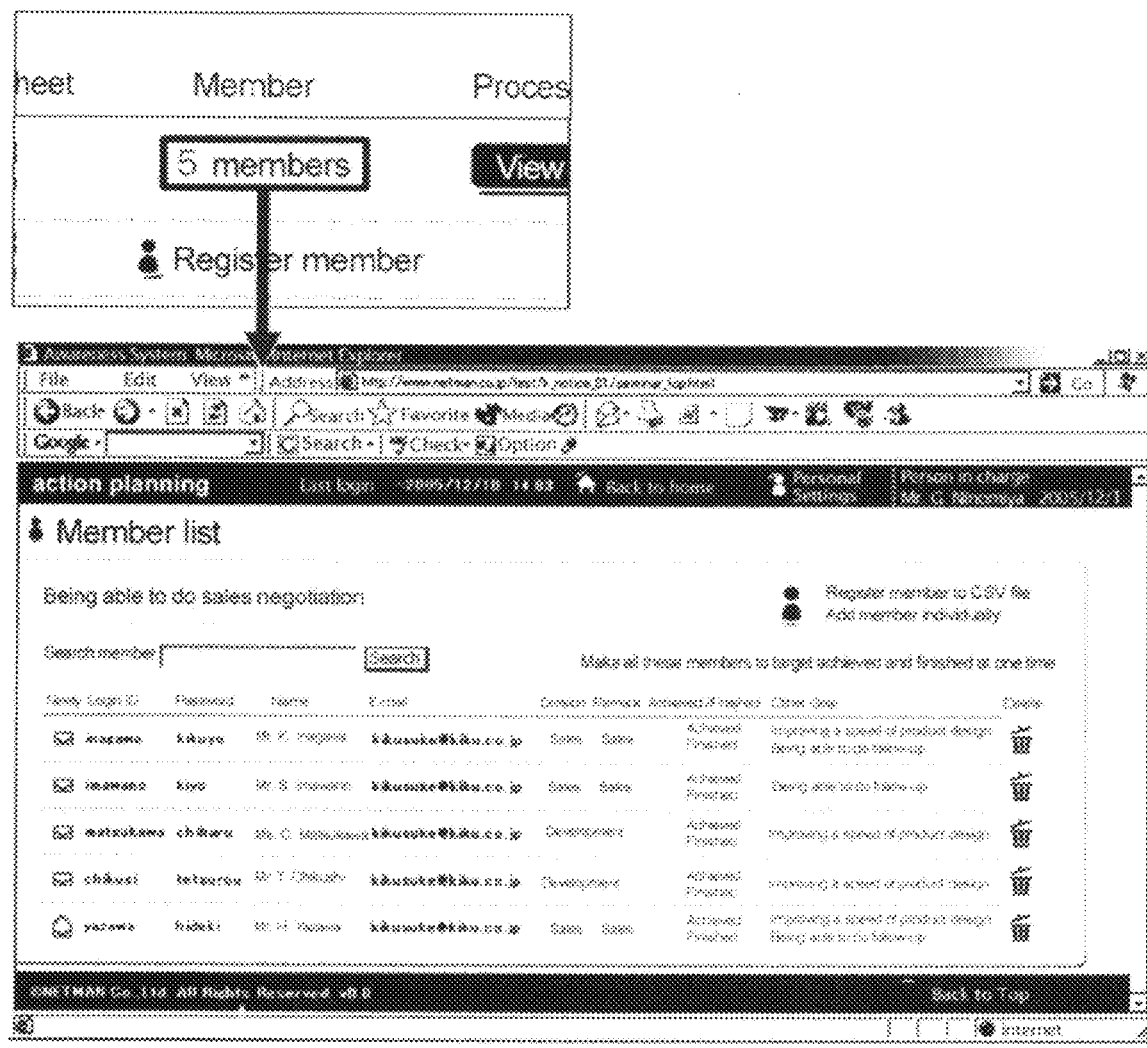
FIG. 12 is a screen showing member information.
Figure 13A:
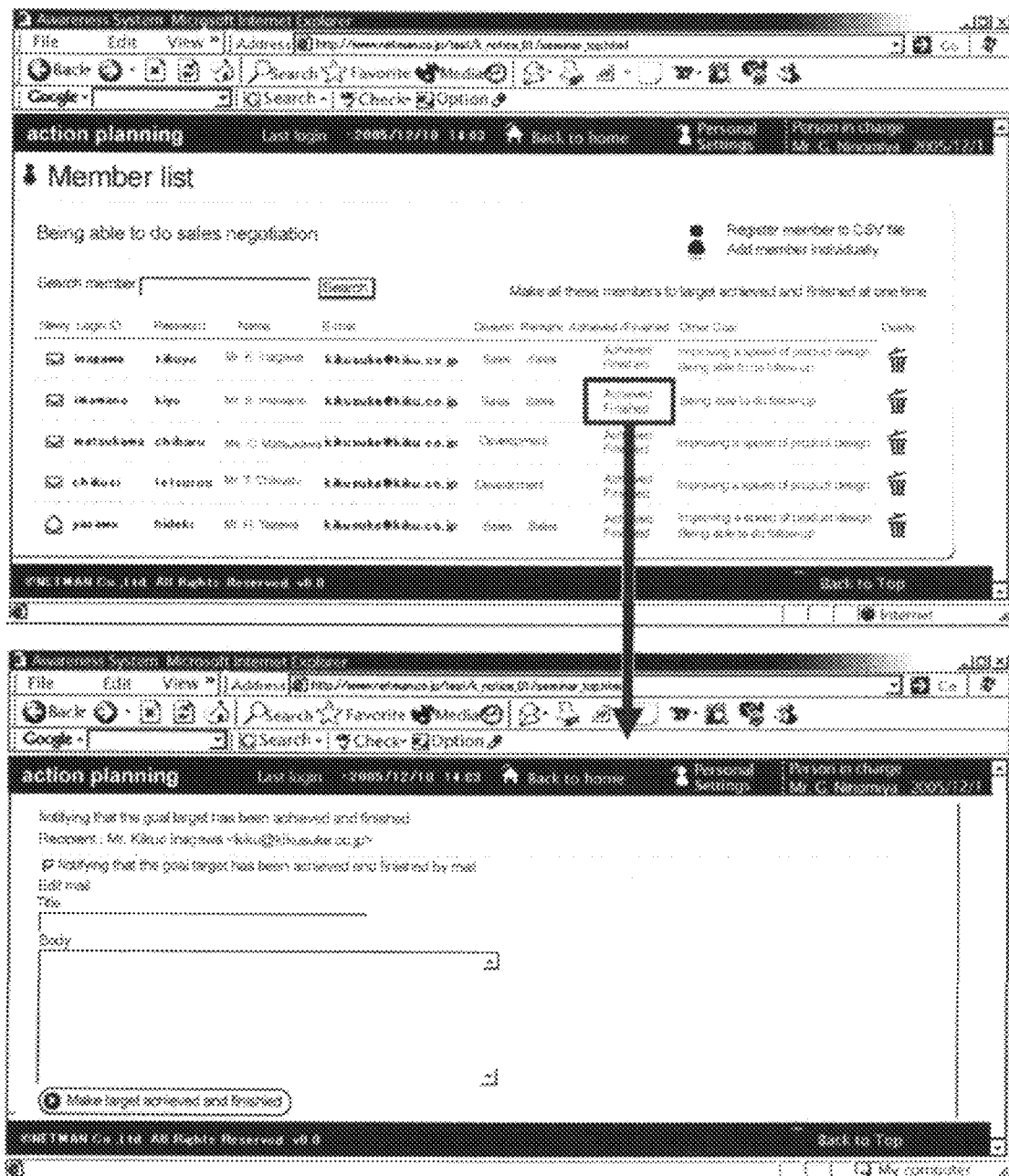
FIG. 13 (a) is a mail generation screen notifying a goal achievement to the member.
Figure 13B:
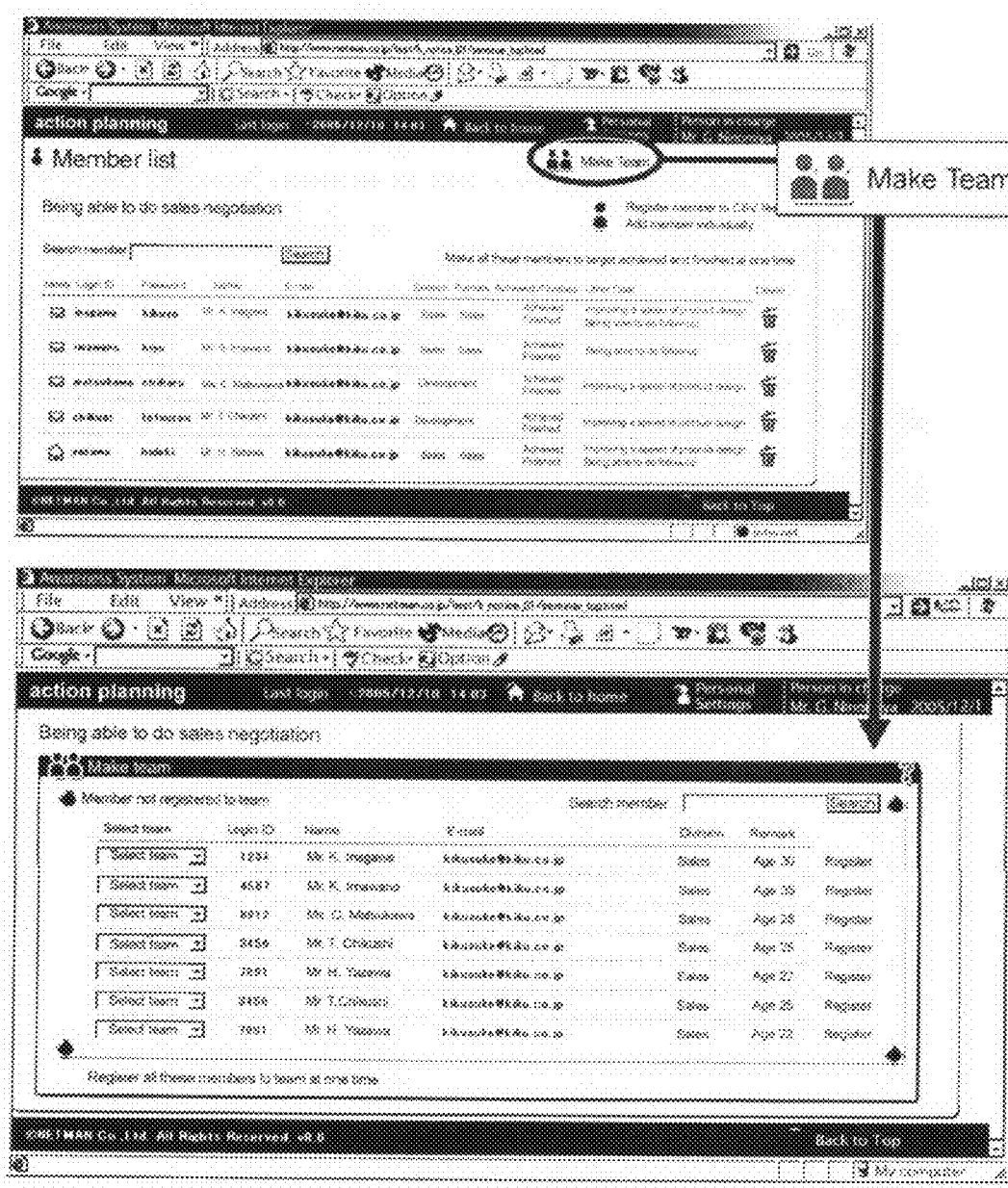
Figure 13C:
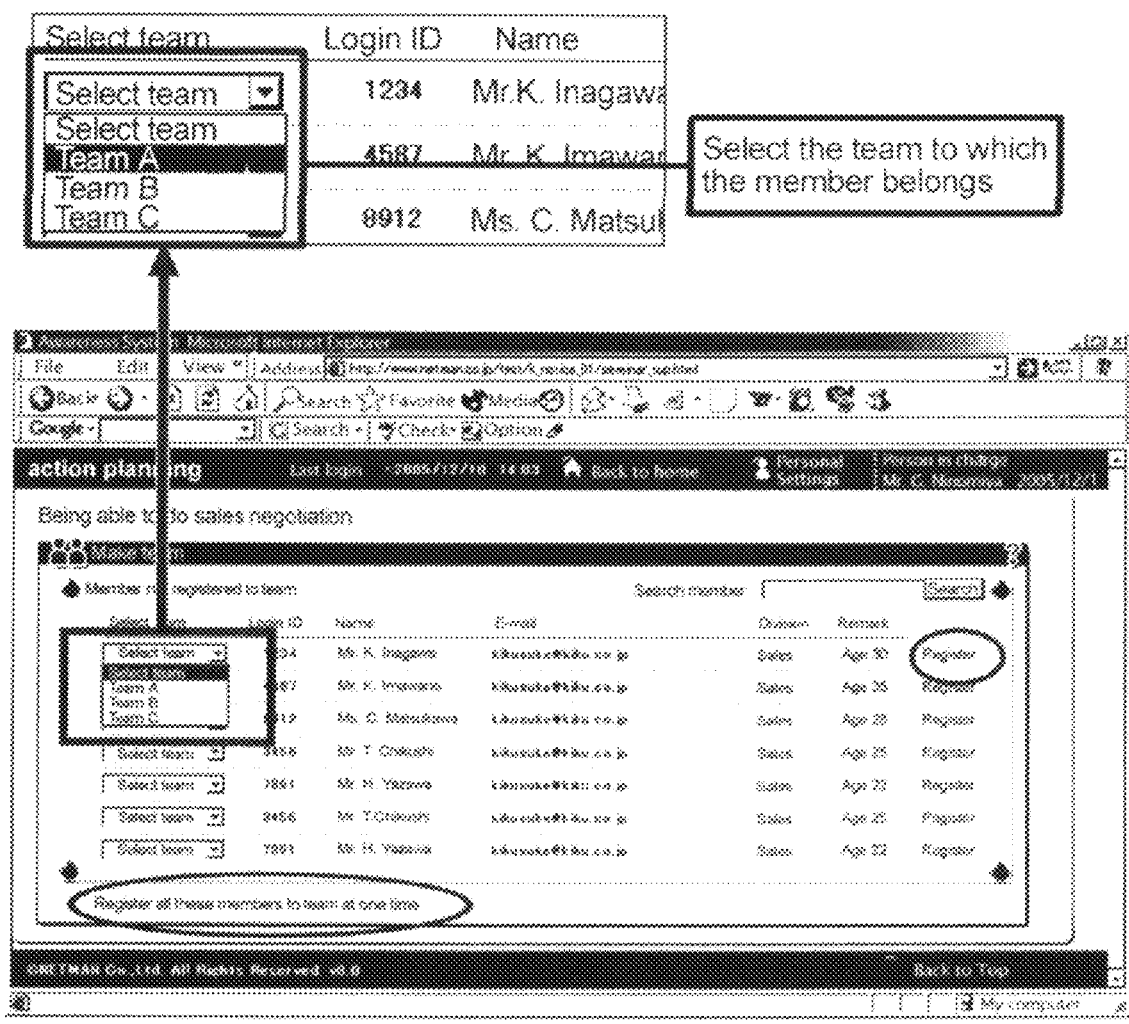
Figure 13D:
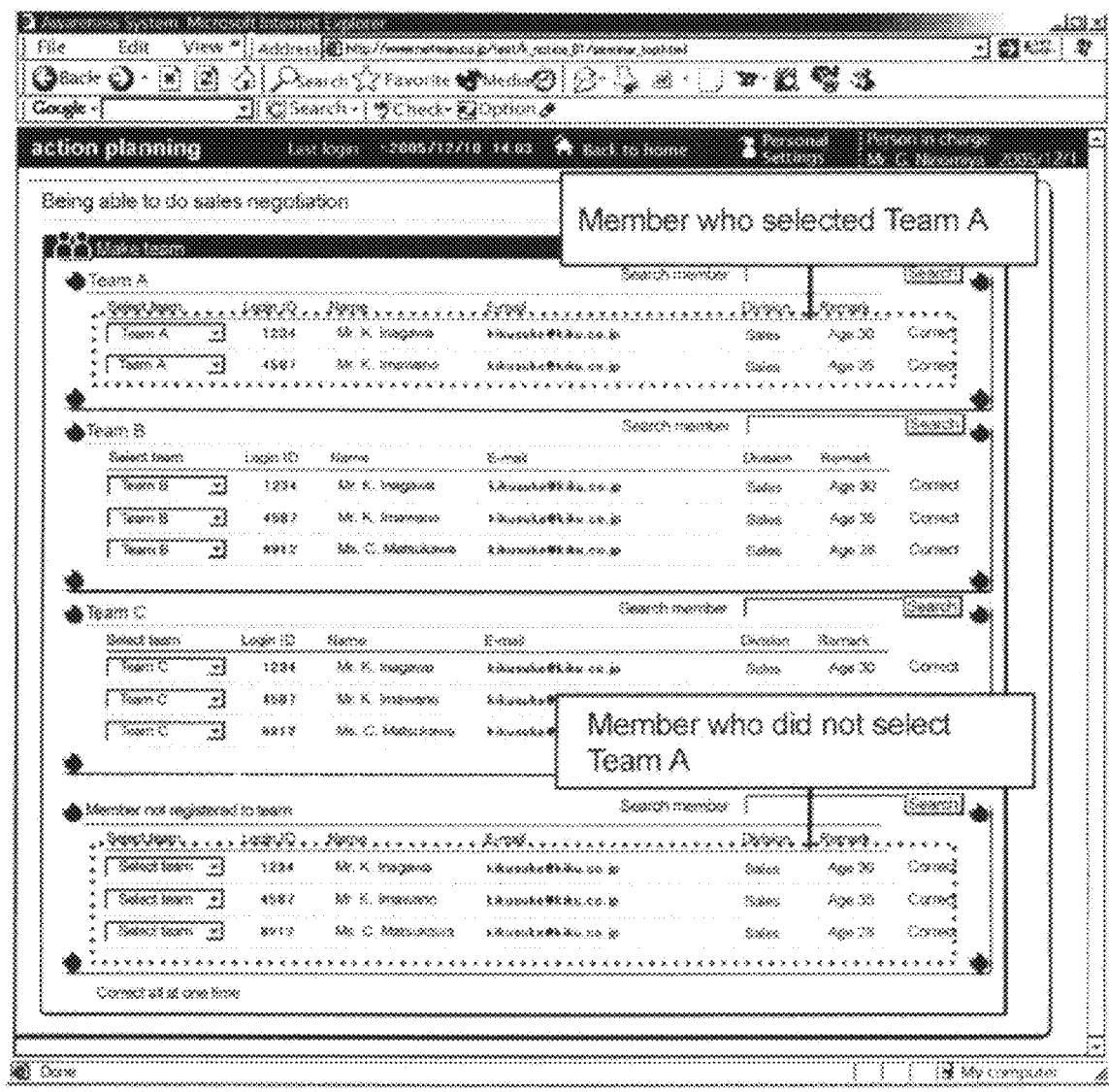

"Member" item in the top page in FIG. 5 (a) shows information about the members registered for each of the goals as shown in FIG. 12.

Figure 17:
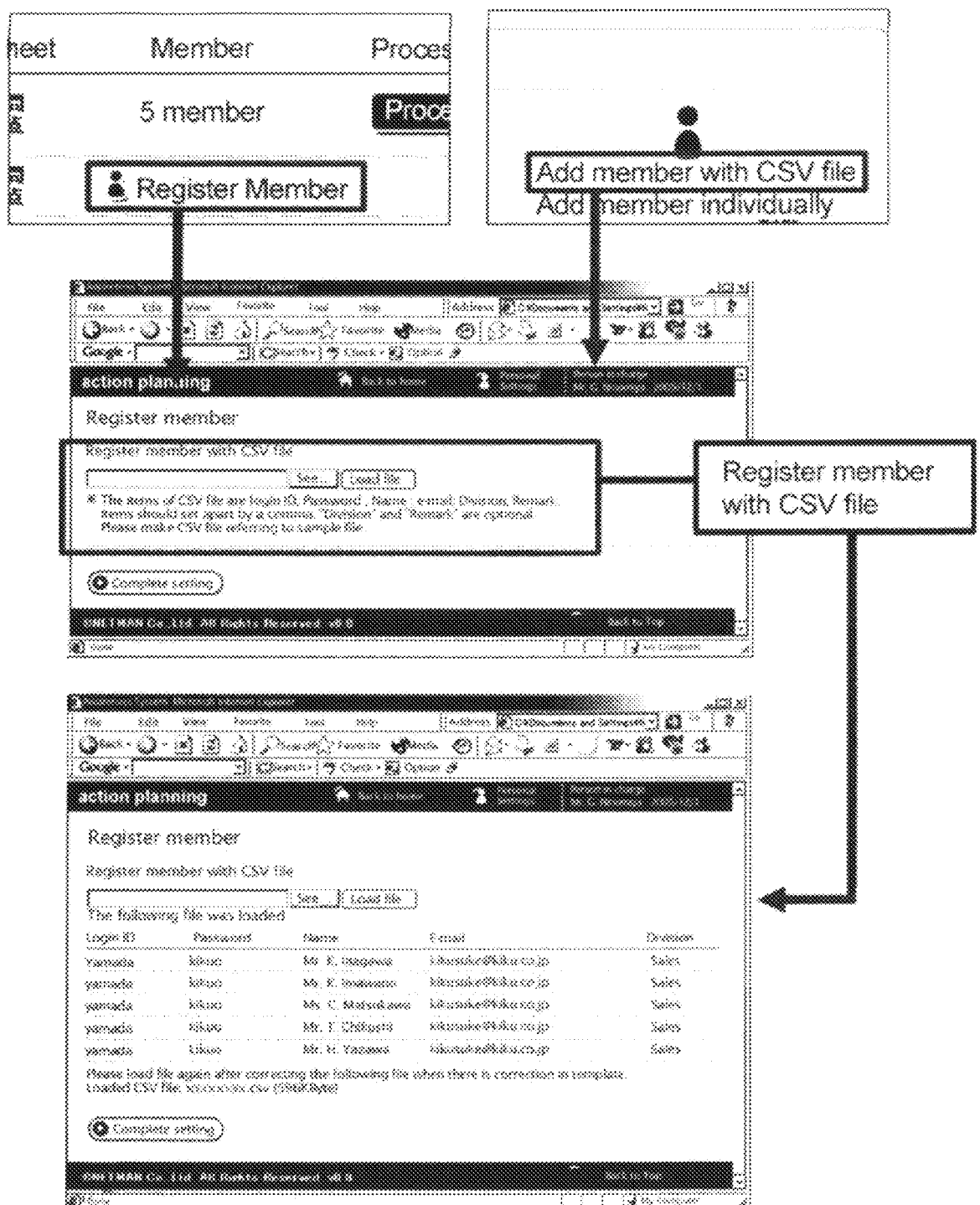
FIG. 17 is a registration screen of the members.

In FIG. 5 (a), there is not yet any members at a portion shown as "Register Member" in relation to the goal target, and when a character portion or an icon thereof is clicked, the screen moves on to a new registration screen of the member, and the new member can be newly registered as described later (see, FIGS. 17 and 18).

In FIG. 5 (a), when a character portion of "X people" (in the example shown by the figure, "5 people" in "being able to do sales negotiation" item) in "Member" section is clicked, the screen moves on the a screen of a list of the members in FIG. 12.

This screen shows each of items "Newly Arrived (Mail)/Login ID/Password/Name/E-mail/Division/Note/Achieved and Finished/Other Goals/Delete", and data is inputted for each of the members.

Herein, as shown in FIG. 13 (b), a "Make Team" button may be arranged on the member list screen to divide the members into multiple teams. Where the members can be divided into teams, the above-described cooperation board for each of the teams can be generated.

When "Make Team" button is clicked, "Select Team" item is arranged for each of the members, and as shown in FIG. 13 (c), the team to which the member belongs to (in the example shown by the figure, Team A, B, and C) can be selected.

When the person in charge selects the team of each of the members and clicks "Register Members to Teams at One Time" on a screen, each of the members are divided into the selected team.

In the member list screen, "Register" item is arranged for each of the members, and the member can be registered to the team by individually selecting the team in "Select Team" item of the member and clicking the characters of "Register".

All of the members registered for the same goal "being able to do sales negotiation" are divided into teams and displayed in a list on the "Make Team" screen as shown in FIG. 13 (d).

In the example shown by the figure, 2 people of A Team, 3 people of B Team, 3 people of C Team, and 3 people not registered to any team are shown in a separated and grouped manner.

Next, when "Achieved and Finished" item from among the member list screen in the above-described FIGS. 12 and 13 (a) is clicked, a generation screen of a mail "Notifying that the Goal Target has been Achieved and Finished" is displayed as shown by the arrow in a lower part in FIG. 13 (a).

This screen is a mail generation screen for notifying the member that the goal target has been achieved and finished, and shows a check field of "notify that the goal target has been achieved and finished" and input fields for a title and a body of "generate a body of a mail".

When the mail is generated and "Target is Achieve/Finish" button at the bottom is clicked, the mail is transmitted to the members specified in the above-described member list screen to notify the members that the goal target has been achieved and is finished.

In the above-described member list screen, a display of "Achieved and Finished" item of the corresponding member is changed. In the present embodiment, a background color of the item of the corresponding member is changed, "Having Been Achieved/Finished" is displayed with characters in a different color, and a behavior of the goal target is finished (see, a screen at the lower portion in FIG. 14).

The person in charge can change all of the members to the above-described "Achieved and Finished" state at one time.

Figure 14:
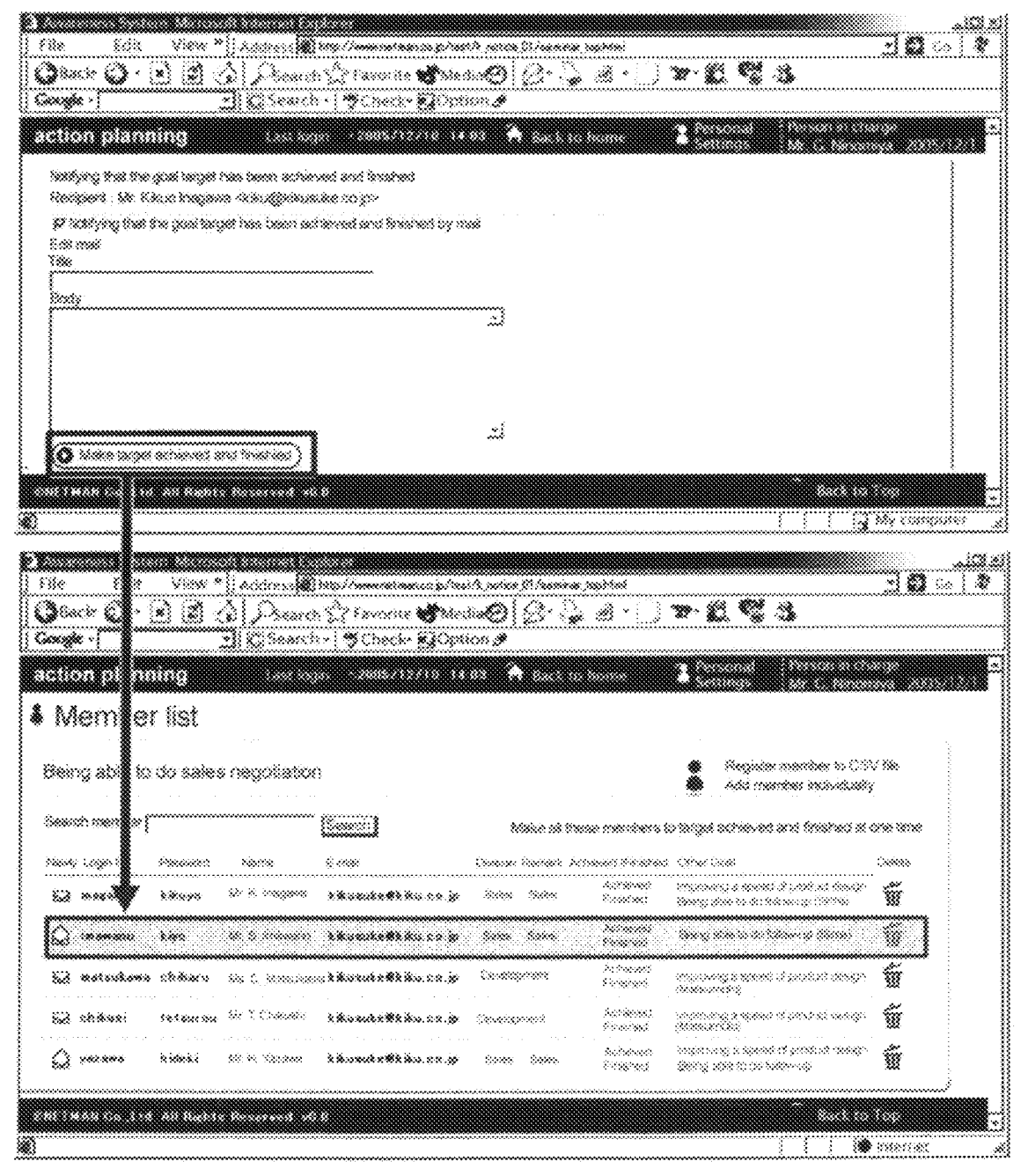
Figure 15:
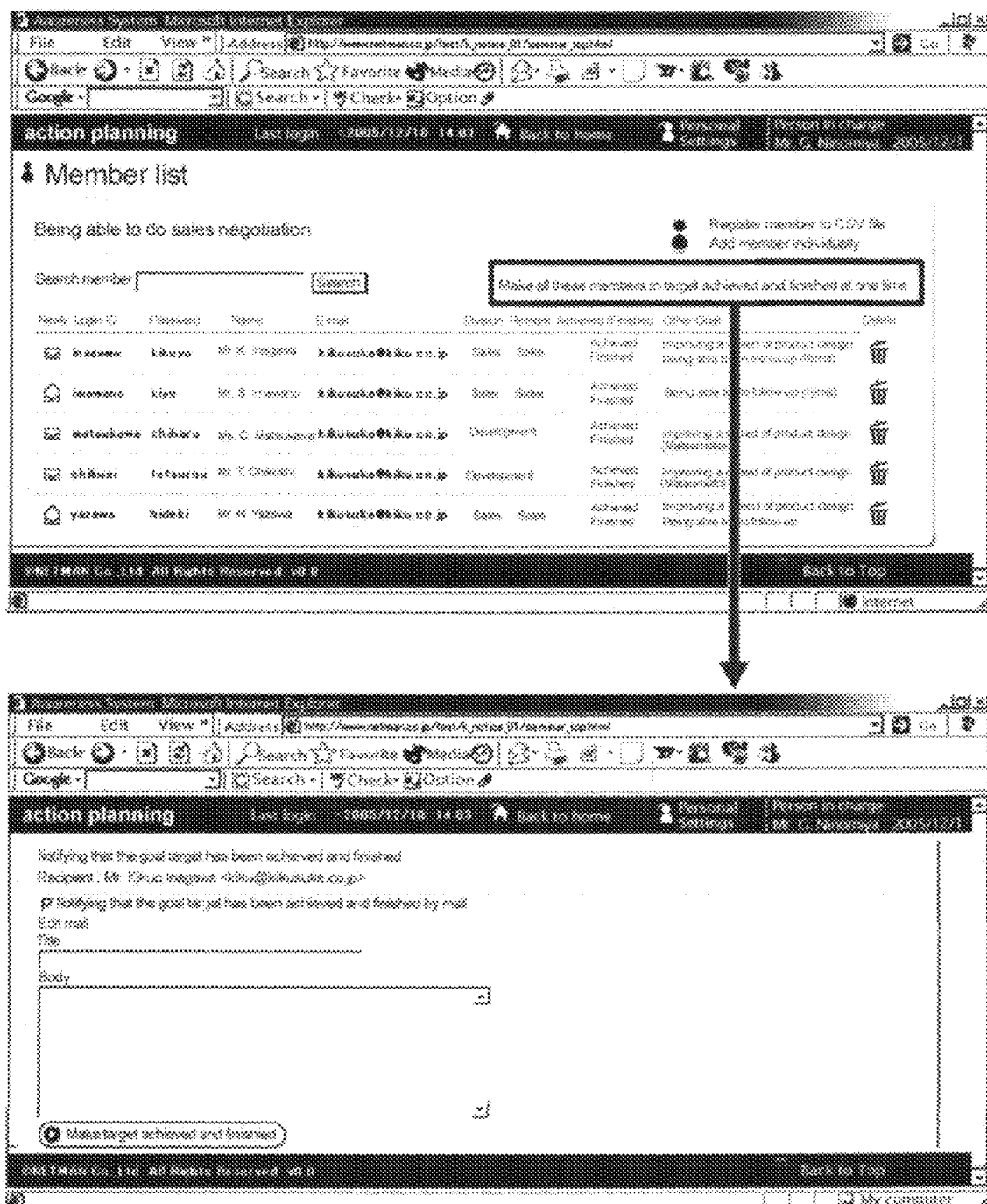
FIG. 15 is a mail generation screen in a case where all of the members are set as having achieved the goal.

That is, as shown in FIG. 15, when a character portion of "Make All These Members to Target Achieved and Finished at One Time" in the member list screen is clicked, the linked "Notifying that the Goal Target has been Achieved and Finished" screen as shown in the upper portion in the above-described FIG. 14 is displayed.

Figure 16:
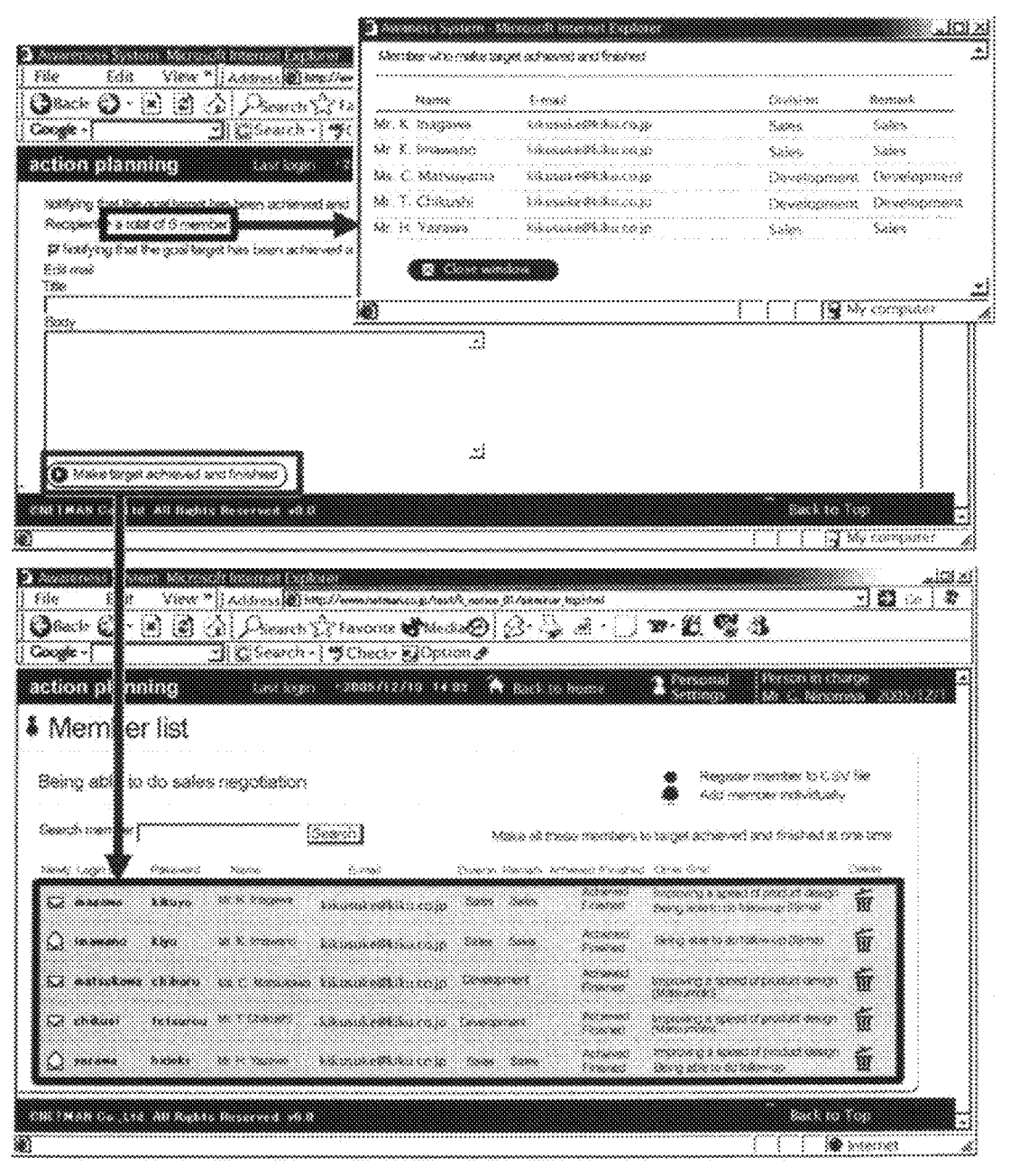

Then, as shown in FIG. 16, when "Recipient: >Totally 6 Recipients" portion in "Notifying that the Goal Target has been Achieved and Finished" screen is clicked, a list screen of the destination addresses of all the members is shown overlappingly as "Members Achieving and Finishing Target" screen.

When "Target is Achieve/Finish" button is clicked, the mail is transmitted to all of the members displayed in the above-described member list screen, the display of "Achieved and Finished" items are changed, the background color of the items of each of the members in the member list screen is changed as described above, and "Achieved and Finished" field is displayed as "Having Been Achieved/Finished" with characters in a different color.

In the above-described goal target list screen in FIG. 5 (a), there are not any members in items displaying "Register Member". When the corresponding portion or the icon is clicked, the screen moves on to "Register Member" screen as shown in FIG. 17, and the members having the same goal target can be newly registered. Alternatively, the members can also be easily newly registered by clicking a link "Add Member with CSV File" on the member list screen to similarly move to "Register Member" screen and reading a CSV file.

Figure 18:
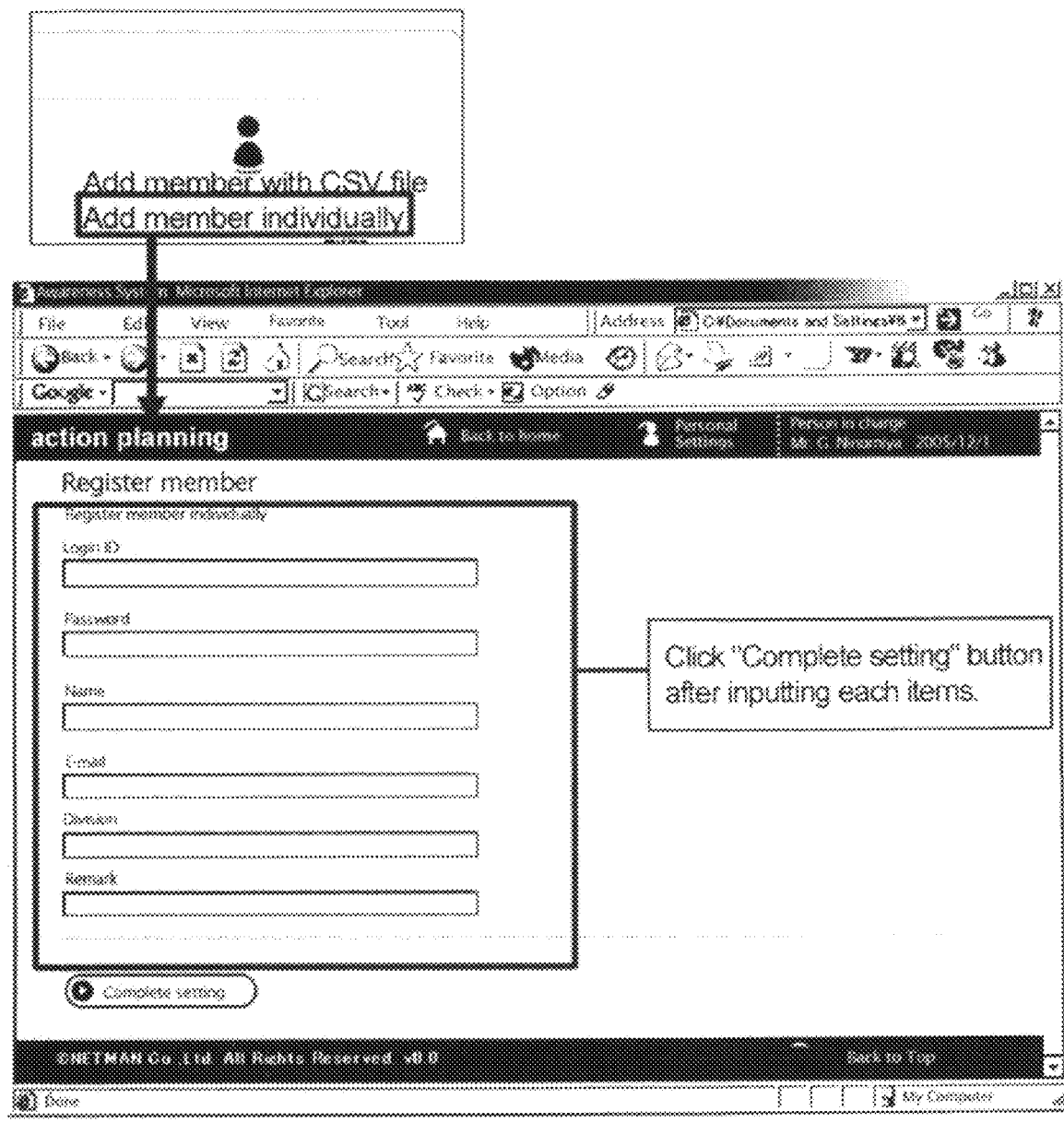
FIG. 18 is a screen for individually registering the member.

Regarding the registered members, the items such as "Login ID/Password/Name/E-mail/Division" are shown in a list on the above-described "Register Member" screen.

Where the member is individually registered, a character portion of "Add Member Individually" is clicked as shown in FIG. 18.

The screen moves on to the above-described "Register Member (Individually Register)" linked thereto, and "Login ID/Password/Name/E-mail/Division/Note" are entered, and "Finish Setting" button is pushed, so that the member is registered.

Figure 19:
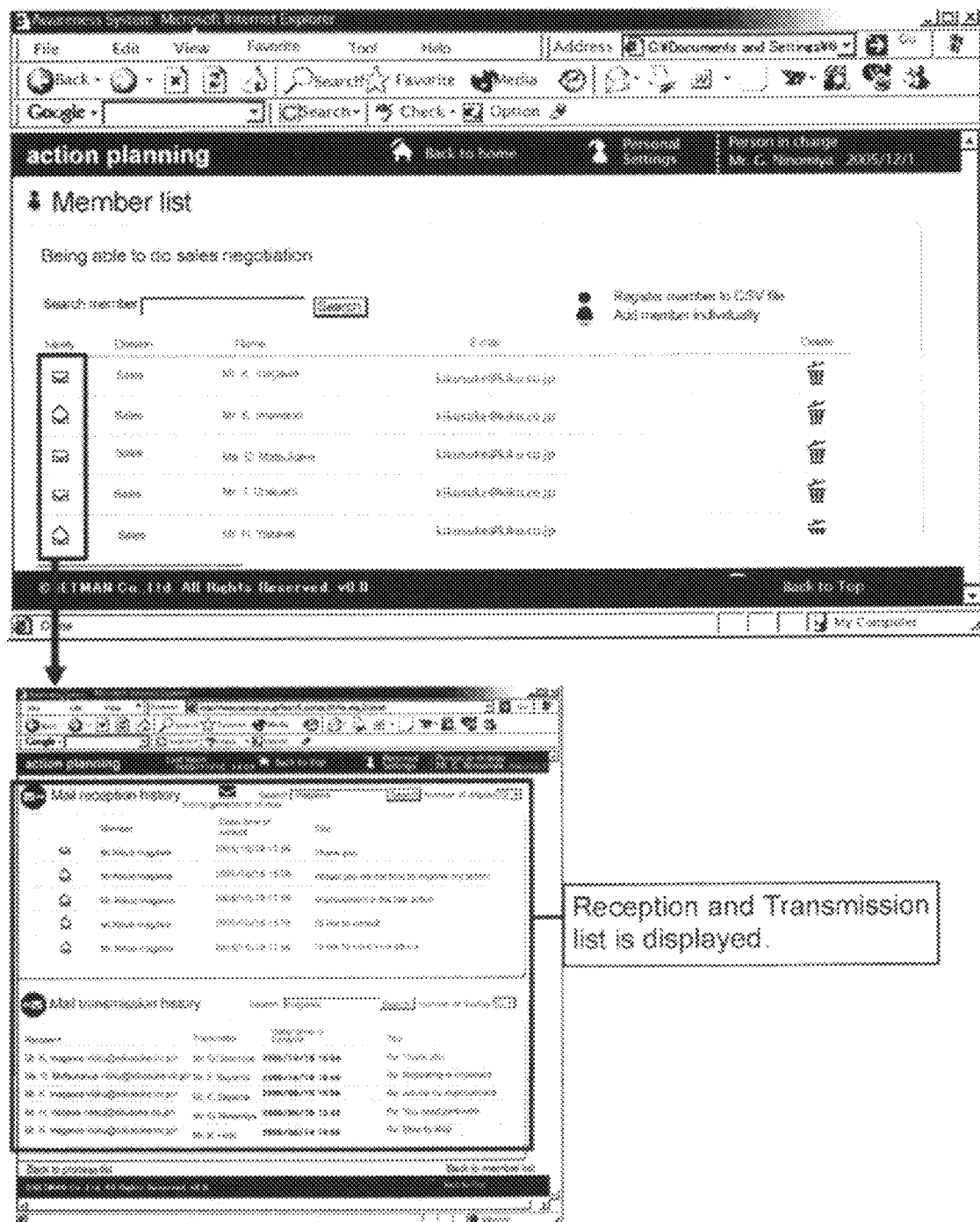
FIG. 19 is a mail list screen of each of the members.
Figure 20:
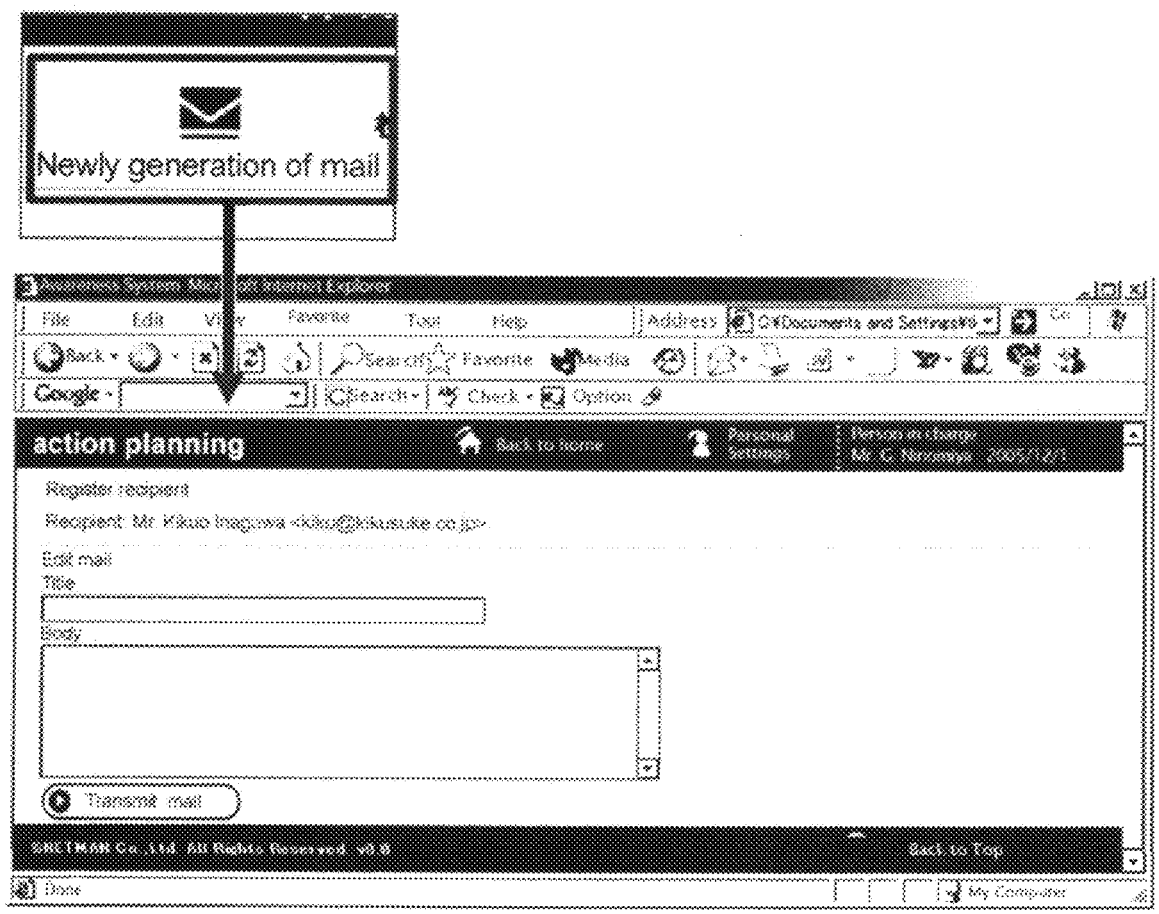
FIG. 20 is a screen for generating a transmission mail from a received list of the member.

When an icon of an envelope of "Newly Arrived Mail" in the screen of "Member List" is clicked, a list of mail transmission and reception history for each of the members can be viewed as shown in FIG. 19.

Where a transmission mail is generated from the reception history list of each of the members, an icon or a characters of "Transmission Mail Newly Generation" is clicked, so that a transmission mail generation screen as shown in FIG. 20 is opened, and by entering each item and clicking "Transmit Mail" button, the mail can be transmitted to the selected members as described above.

On the top page for the person in charge in FIG. 5 (a), "View Process" button is arranged in an item of "Process List".

Figure 21:
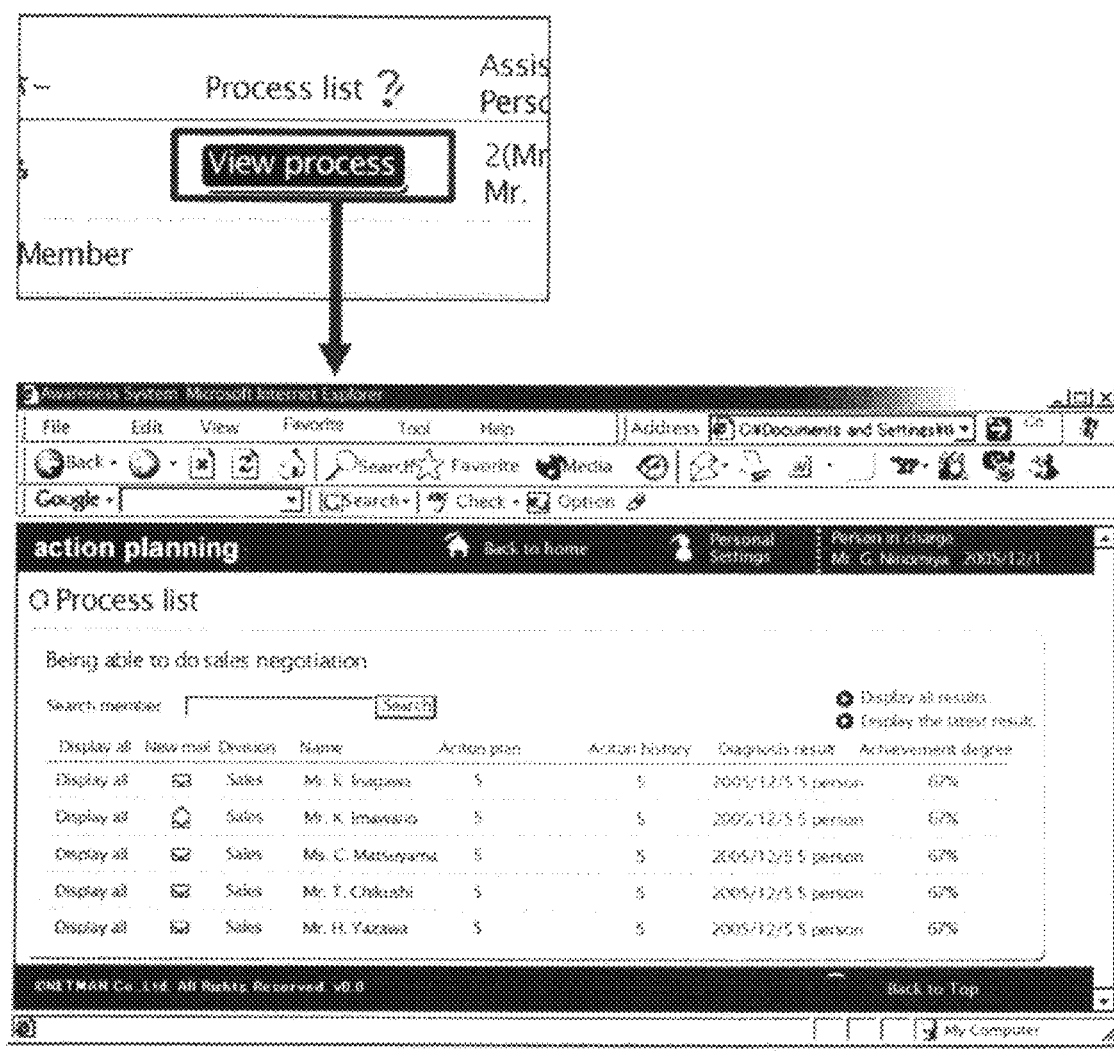
FIG. 21 is a list screen of a behavior and a diagnosis of each of the members.

When "View Process" button is clicked, the screen moves on to a process list screen as shown in FIG. 21.

This screen consists of items such as "Display All/Newly Arrived Mail/Name/Action Plan/Behavior History/Diagnosis Result (Diagnosis Interview Result)/Achievement Degree".

Figure 22:
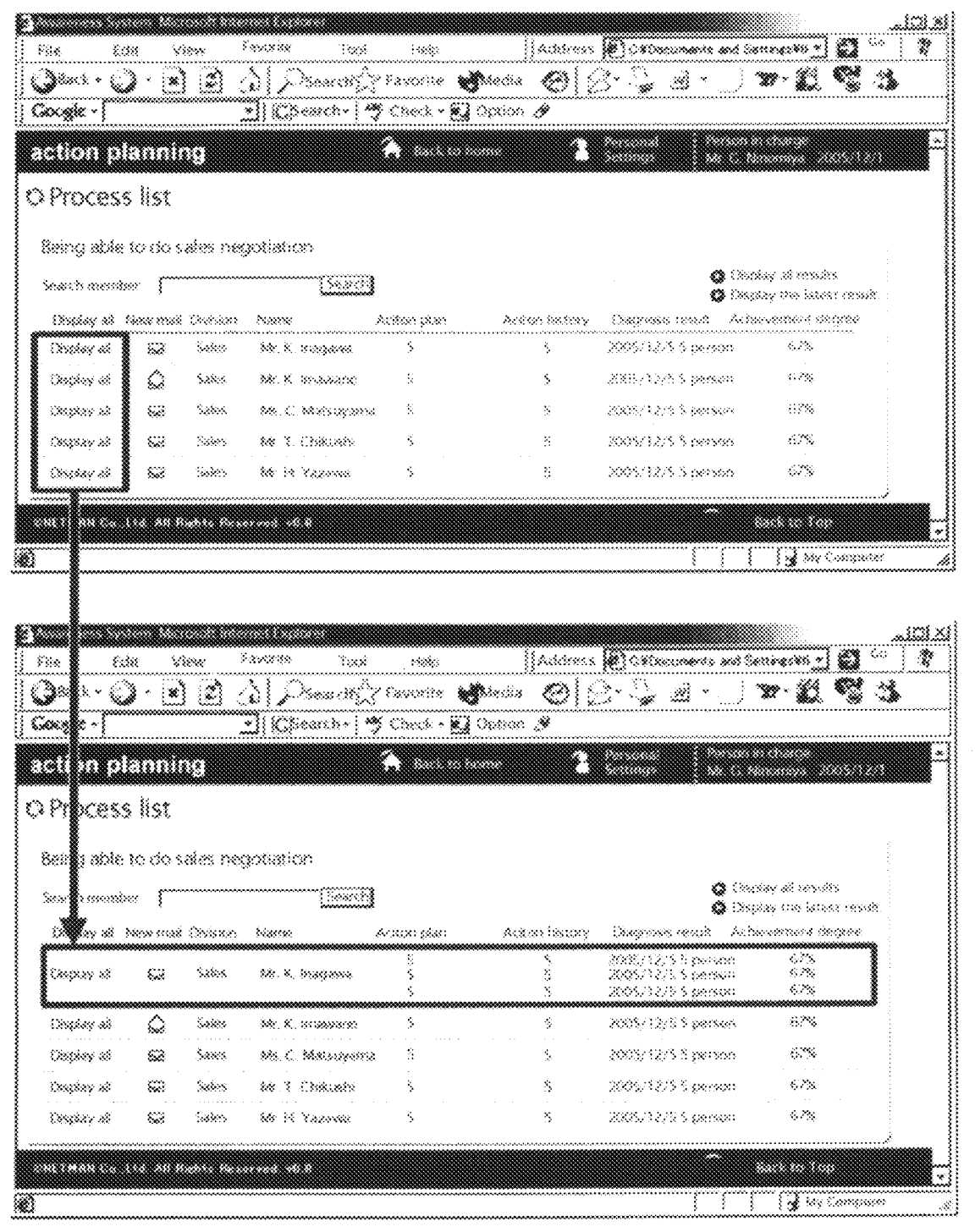

When a character portion of "Display All" of a predetermined member is clicked, all of the action plan, the behavior history, the diagnosis interview result, and the history of the achievement degree of the clicked member are displayed as shown in FIG. 22.

Figure 23A:
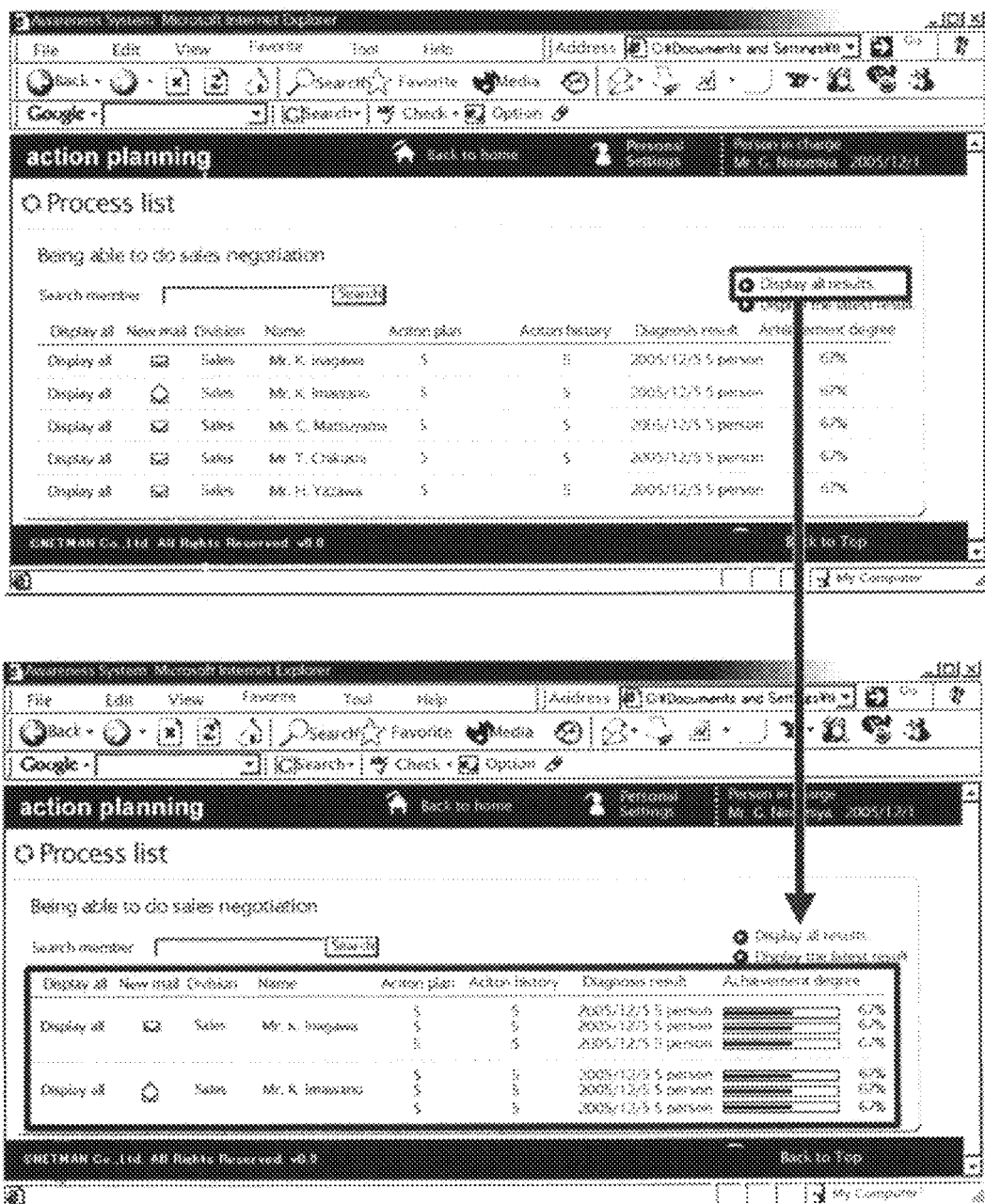
FIG. 23 (a) is a list screen of histories of each of the members.
Figure 23B:
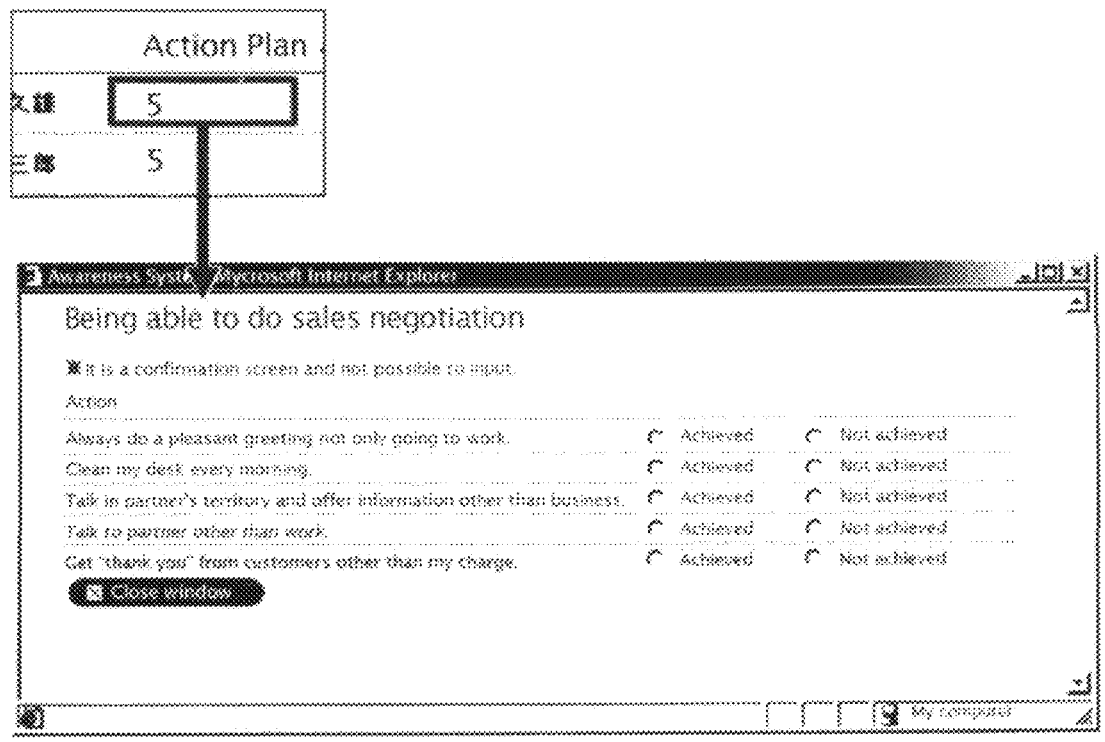

When a link "Display All Results" is clicked, a figure showing a graph of the achievement degree is displayed as shown in FIG. 23 (a), and everything is displayed.

When a numerical portion of the item "Action Plan" is clicked in the "Process List" screen, a list of the check-items of the member is displayed as shown in FIG. 23 (b).

Figure 24:
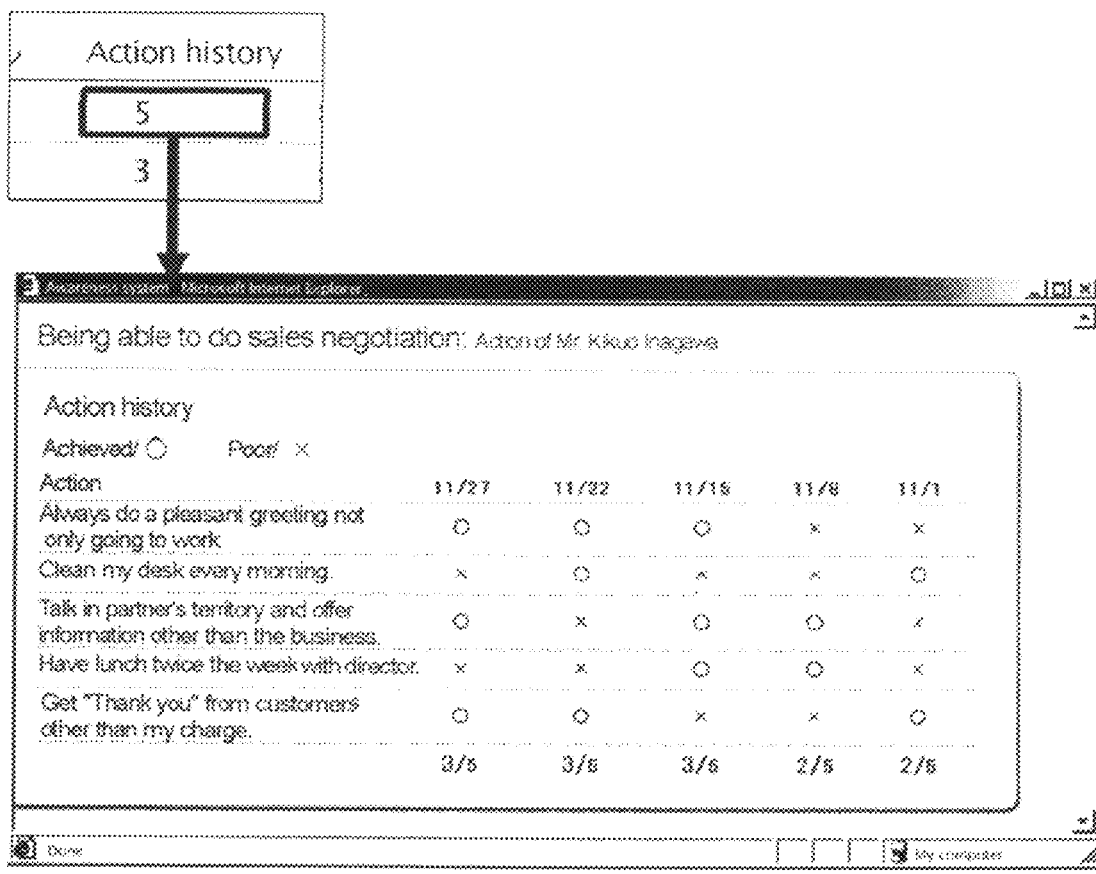
FIG. 24 is a history screen of check results of the action plans of the members.

When a numerical portion (in the example shown by the figure, "five times") of the item "Behavior History" in the process list screen as shown in FIG. 21 in the "Process List" screen is clicked, a history (a history of the behavior) of a self-checking result with respect to the action plan of the member in question is displayed as shown in FIG. 24.

Figure 25:
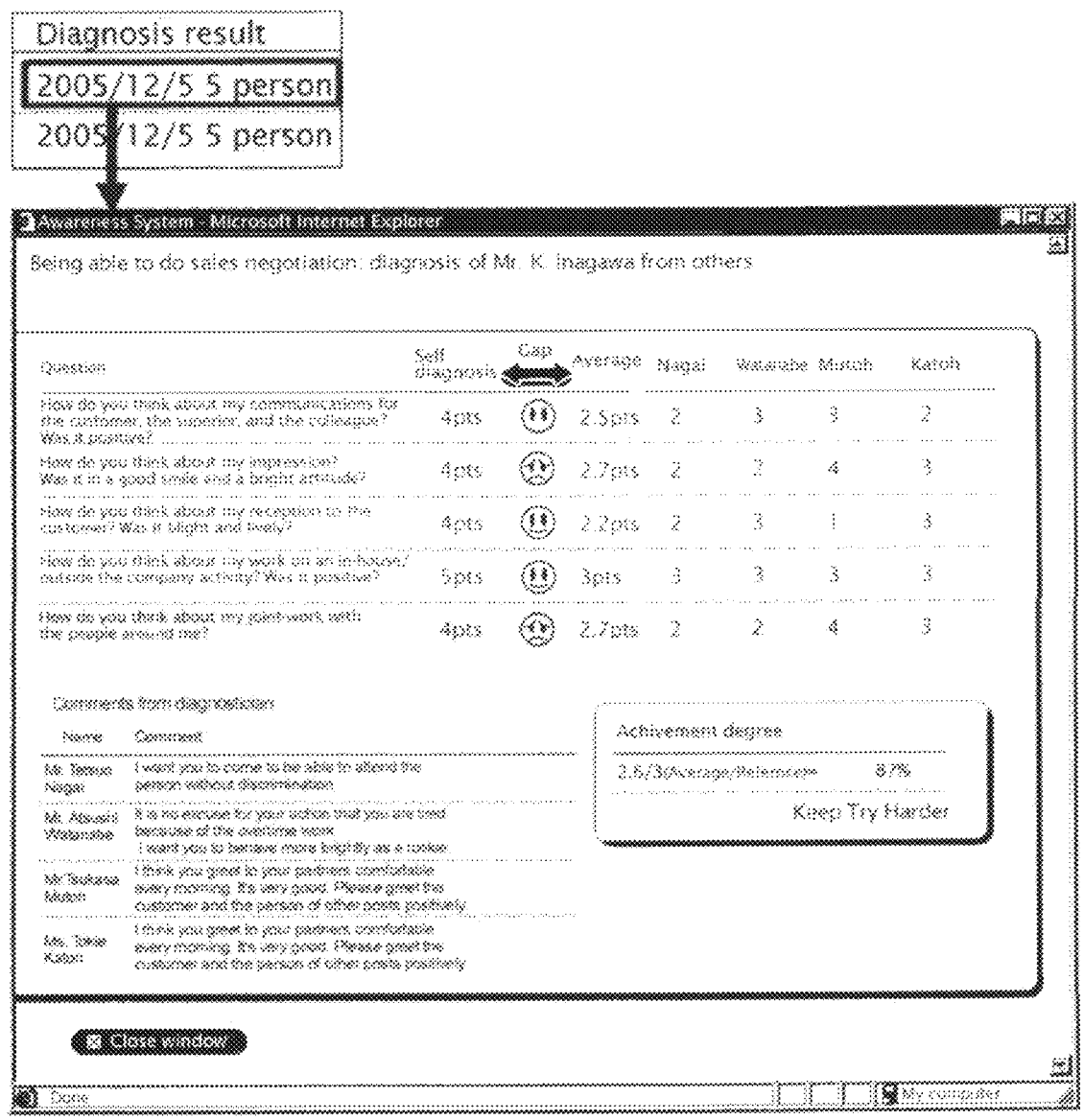
FIG. 25 is a screen displaying a diagnosis interview result of the member.

Furthermore, when a numerical portion (in the example shown by the figure, "five people") of the item "Diagnosis Result (Diagnosis Interview Result)" in the "Process List" screen in FIG. 21 is clicked, a screen of the diagnosis interview result of the diagnostician with respect to the member in question is displayed as shown in FIG. 25.

On the top page for the person in charge in FIG. 5 (b), there is an item "Setting of Assistant Person in Charge".

Figure 26:
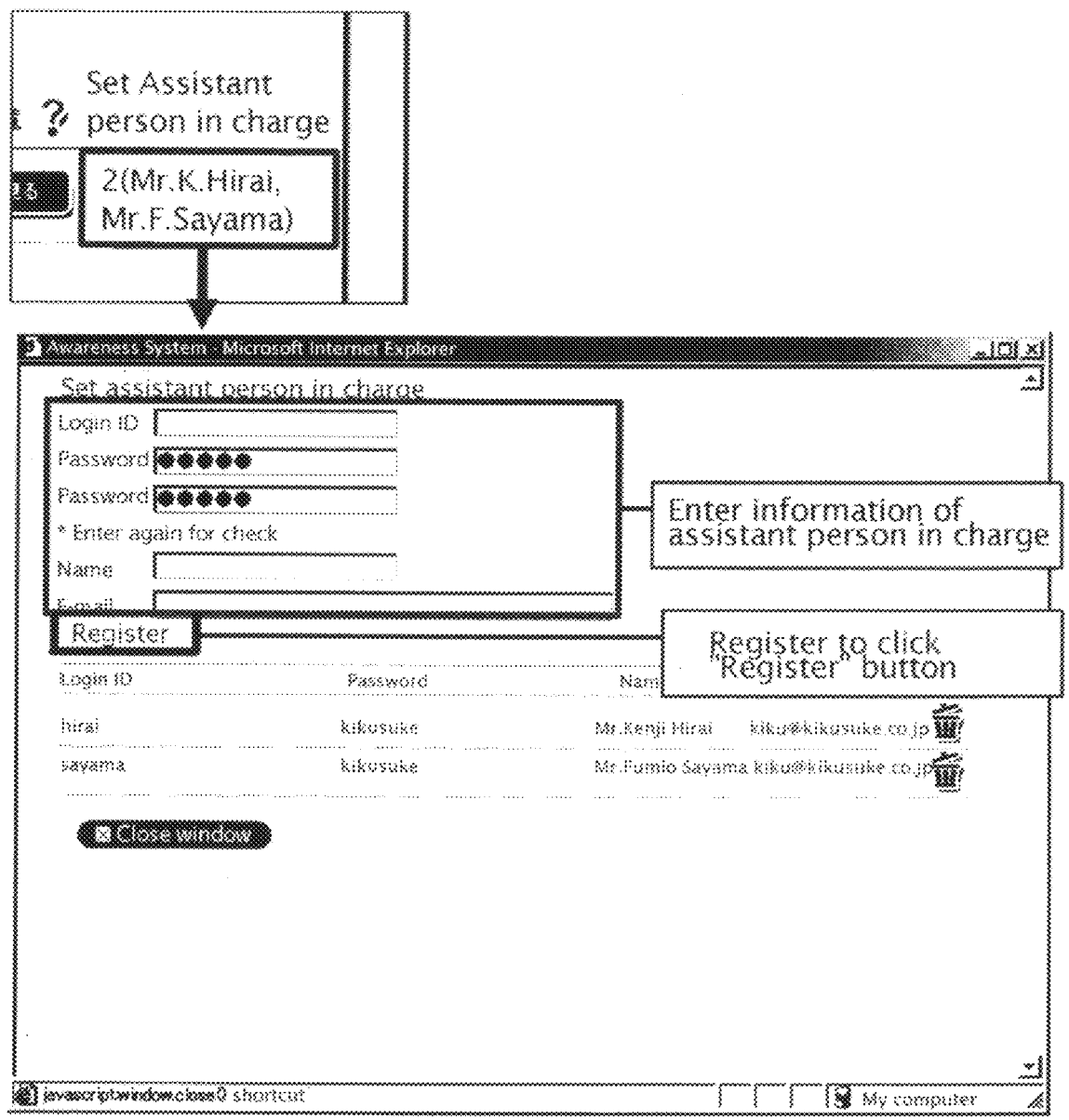
FIG. 26 is a registration screen of an assistant person in charge.

This item is linked to a screen of "Newly Register Assistant Person in Charge", and the assistant person in charge serving as an advisor other than the person in charge can be set on the screen of "Newly Register Assistant Person in Charge" (see, FIG. 26).

[Member]

The member is a person who does self-behavior improvement (self-reform behavior), can make the action plan, can do the self-check of the action plan, can conduct the diagnosis interview or view the diagnosis interview, and can receive the advice.

The member understands the target to be achieved because the goal target and the diagnosis interview sheet are given by the person in charge and the assistant person in charge.

The member can do the self-check in an automated cycle.

The member can conduct the diagnosis interview, and can receive the advice from the person in charge and the assistant person in charge.

The member can view a growth record of the member him/herself.

Furthermore, by using the later-described bulletin board function, all of the members having the same goal target and the members divided into teams can discuss with each other.

[Screen for Member]

A screen for the member is a screen used by the member, and the member logs in upon entering each of a dedicated ID and a dedicated password to an initial screen (not shown) in the same manner as described-above.

Figure 27A:
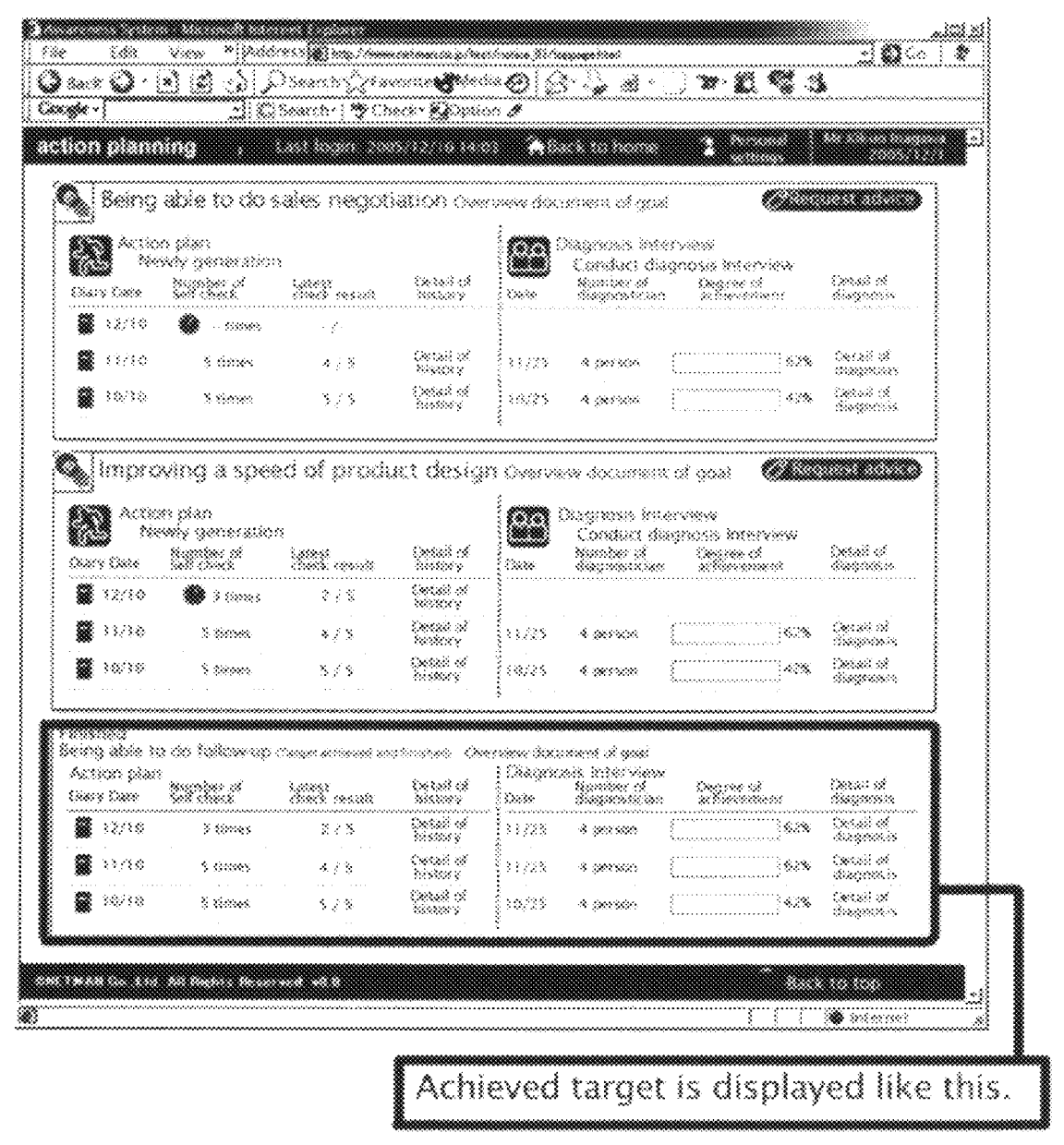
Figure 27B:
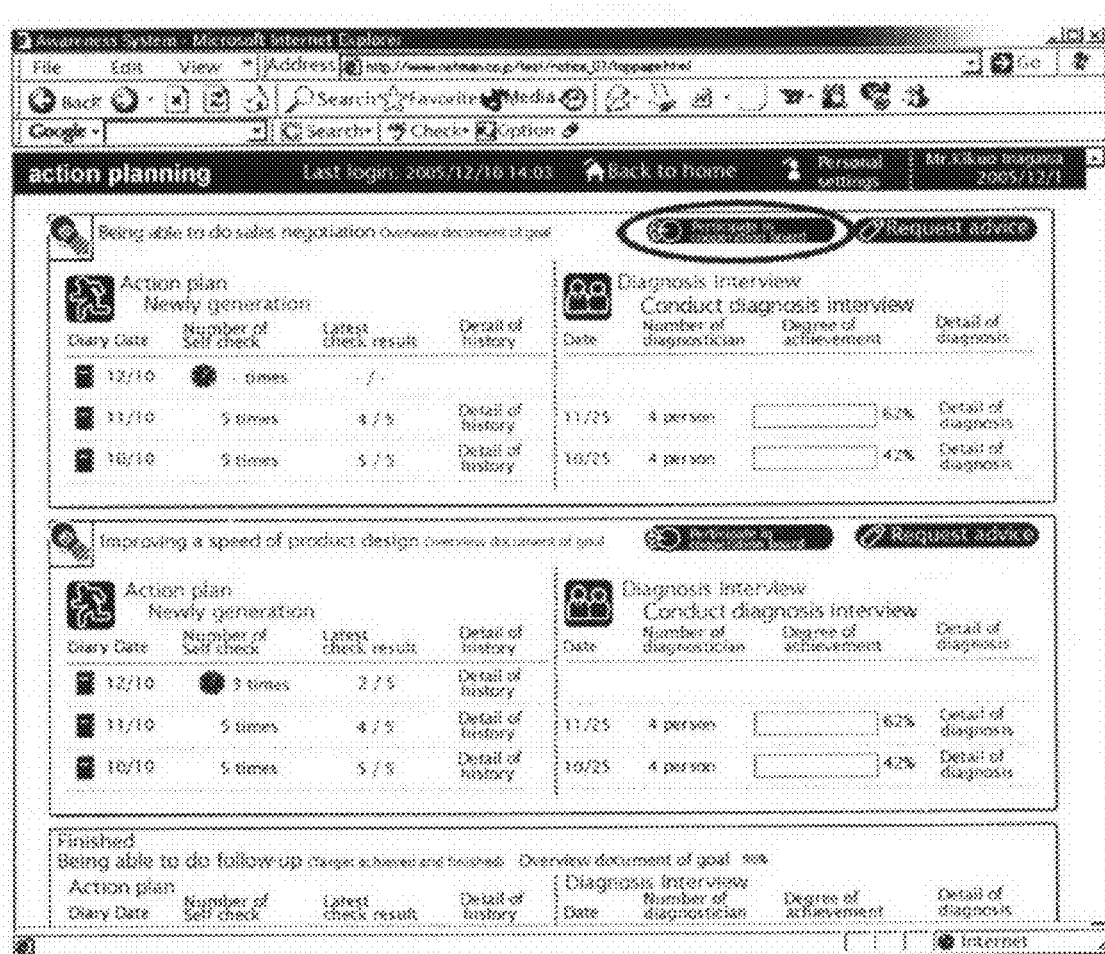
FIG. 27 (a) is a top page for the member.

FIG. 27 (*a*) is a screen of a top page for the member, which is a screen displayed right after logging in.

That is, on the upper section of the screen, the items of "Action Plan" and "Diagnosis Interview" are displayed for each of the goal targets currently carried out by the members, and on the lower portion of the screen, a history of "Action Plan" and "Diagnosis Interview" of the goal targets are displayed that have become targets having been achieved and finished.

In the example shown by the figure, two items "being able to do sales negotiation" and "improving a speed of products design" are displayed as the goal targets being carried out, "being able to do follow-up" is displayed as the goal target having become the targets having been achieved and finished, and the histories of "Action Plan" and "Diagnosis Interview" are displayed for each of them.

The member can generate the action plan on the screen of the top page in FIG. 27 (*a*).

Figure 28:
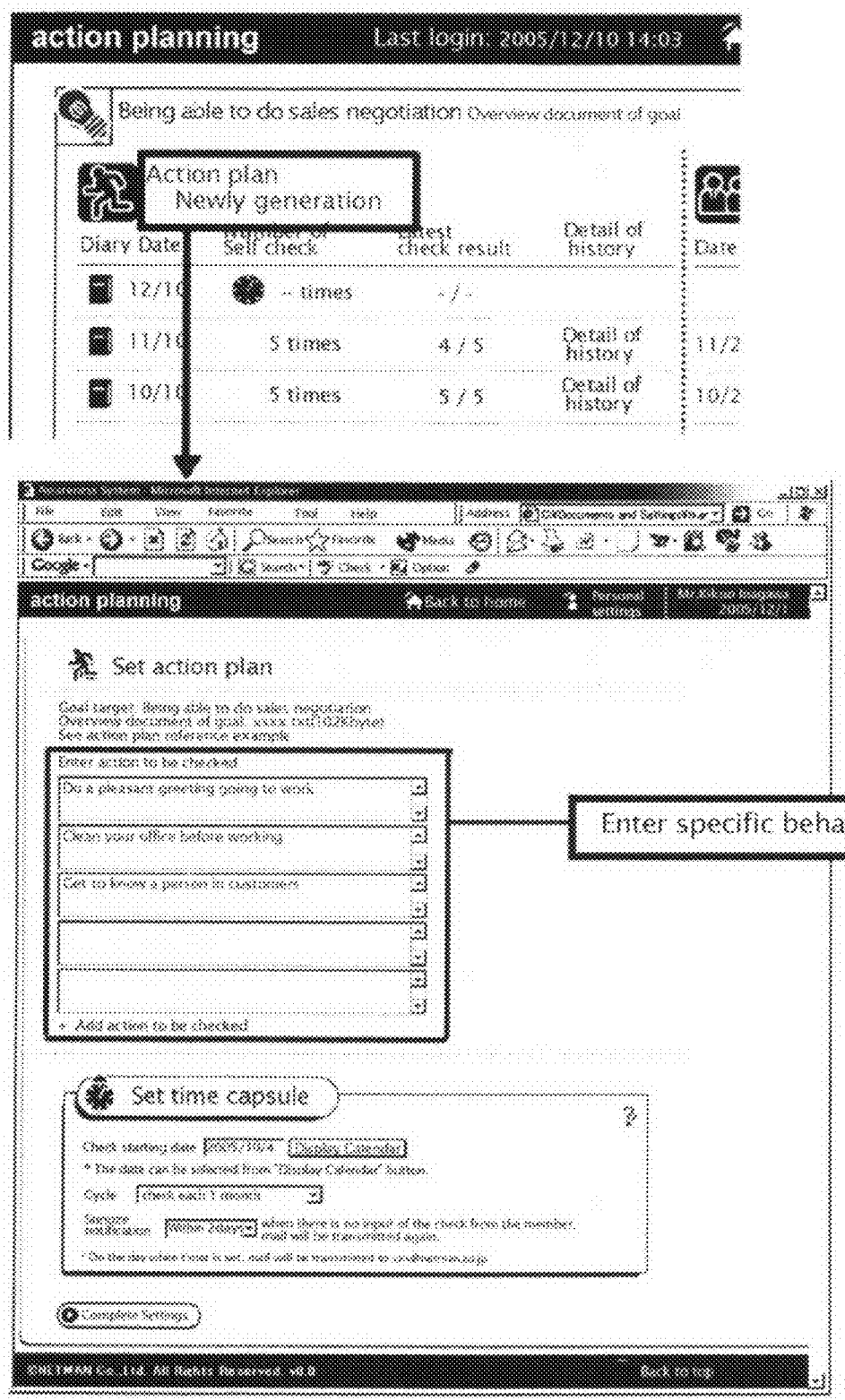
FIG. 28 is a screen on which the member generates the action plans.

As shown in FIG. 28, the member clicks "Newly Generate" in the field of "Action Plan", opens a screen "Set Action Plan" shown by the arrow in a lower part, and enters a specific behavior in a field "Enter Behavior to be Checked".

In the input fields, reference examples of the multiple actions plans previously generated by the person in charge as described above are displayed as initial values, and thus, the member can specify one of them.

The member can further add and enter other behaviors.

In the present embodiment, the member enters the specific behavior on the top page for the member while viewing the reference examples of the action plans previously entered by the person in charge, and a content of the check sheet for requesting the member him/herself for a reply is determined based on this.

In the lower section of the above-identified field "Action Plan", a field of "Time Capsule Setting" is arranged.

The field of "Time Capsule Setting" has items "Starting Date of Check", "Cycle", and "Snooze Notification" as shown in FIG. 28, and numerals previously specified by the person in charge with the above-described FIG. 6 as described above are displayed as the initial values, but the member can enter and change each of the numerals where the numerals are directed for a period shorter than the initial value.

A date is entered to "Starting Date of Check" on which date the member him/herself is to start to be reminded to enter checks to the check sheet of the action plan.

For example, where the check is wished to be started from Oct. 7, 2005, "2005/10/7" is entered. In the example shown by the figure, an input from a calendar is enabled.

To "Cycle" of the check, a cycle is entered for a case where the self-check of the same action plan is periodically done by the member.

For example, in a case where the starting date of the check is set to be "2005/12/7" and the cycle is set to be "Check Every Week", the mails are transmitted every week from Dec. 7, 2005.

"Snooze Notification" is a function showing a time when a mail is transmitted again in a case where the member does not do the check after receiving the mail.

Figure 29:
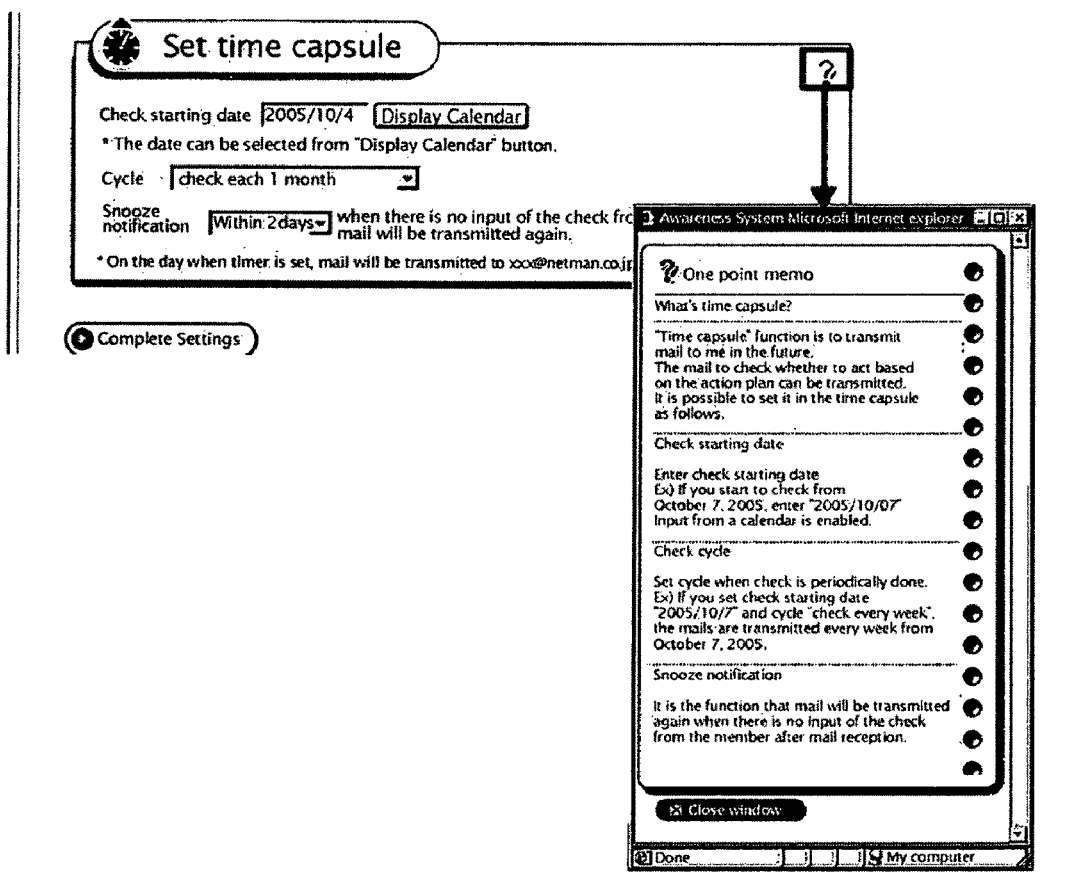
FIG. 29 is a screen on which the member reserves a self-check of the action plans with a timer.

"?" mark is a help function displaying a simple explanation, named as a one-point memo, about the time capsule in a separate frame (see, FIG. 29).

The initial values of these are previously set by the person in charge as described above.

A mail having a content as below is delivered to the member on the set starting date of the check.

"<Title>

A mail is delivered from the behavior check timer

<Body>

Action Plan: "Regarding Communication Skills"

Please fill out the behavior check sheet in the below URL.

Figure 30:
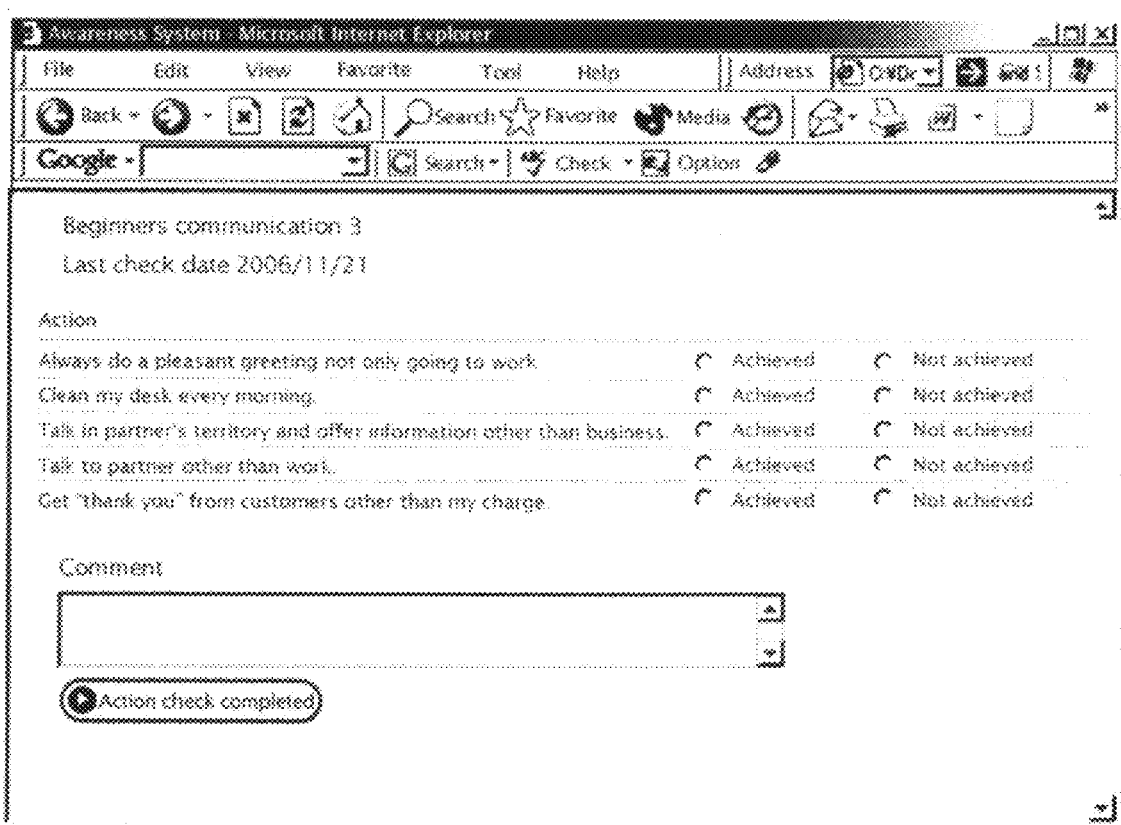
FIG. 30 is a screen for the self-check of the action plans.

[&URL]"

Where the URL recited in the body is accessed, a screen of "Behavior Check" in FIG. 30 is displayed.

This behavior check screen consists of a behavior field for checking one of "Achieved" or "Cannot be Said to Have Achieved" for each of the predetermined action plans and a free description field (in the example shown by the figure, a field for "Leave Comment") in a diary form in which the member can freely write a comment.

Figure 31:
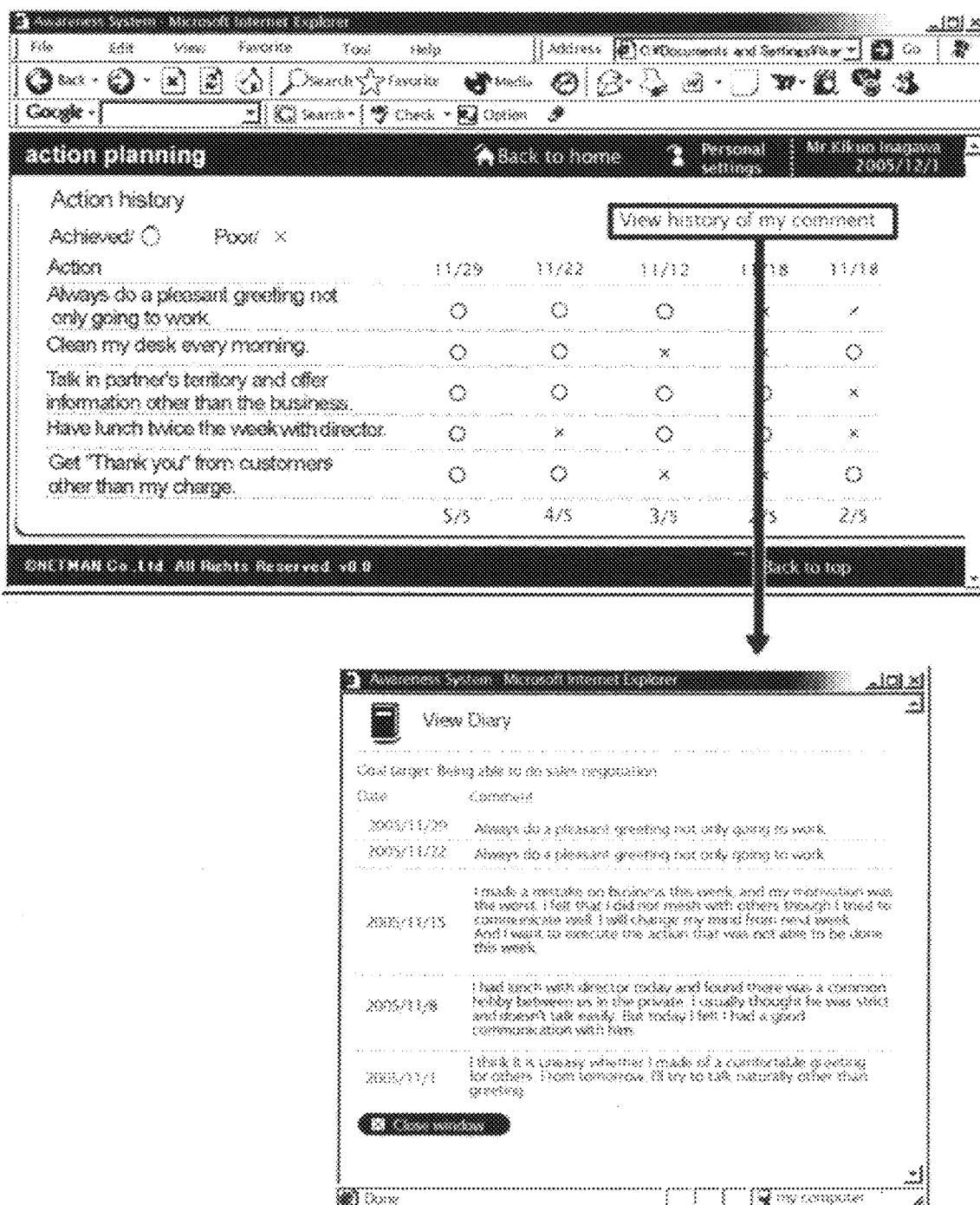
FIG. 31 is a screen showing a self-checking history of the action plans and a history of comments in a diary form.

Regarding a result of the self-check of the member, as the check is repeated, check result data is accumulated to the screen as shown in FIG. 31, and is displayed as the self-check history in a list in the time series.

In the example shown by the figure, the check result data is arranged to become newer in sequence from the right to the left on the screen.

The comments written by the member to the "Leave Comment" field (the free description field) at checking are sorted in time series and recorded, and comment input dates and comments are displayed in the order of date in "View Diary" screen linked to a character portion of "View Self-Comment History".

That is, as shown by the arrow in FIG. 31, by clicking the character portion of "View Self-Comment History", "View Diary" screen pops up, and the comments of the member at these moments are displayed in order in the order of comment input dates from the latest to the past.

Figure 32:
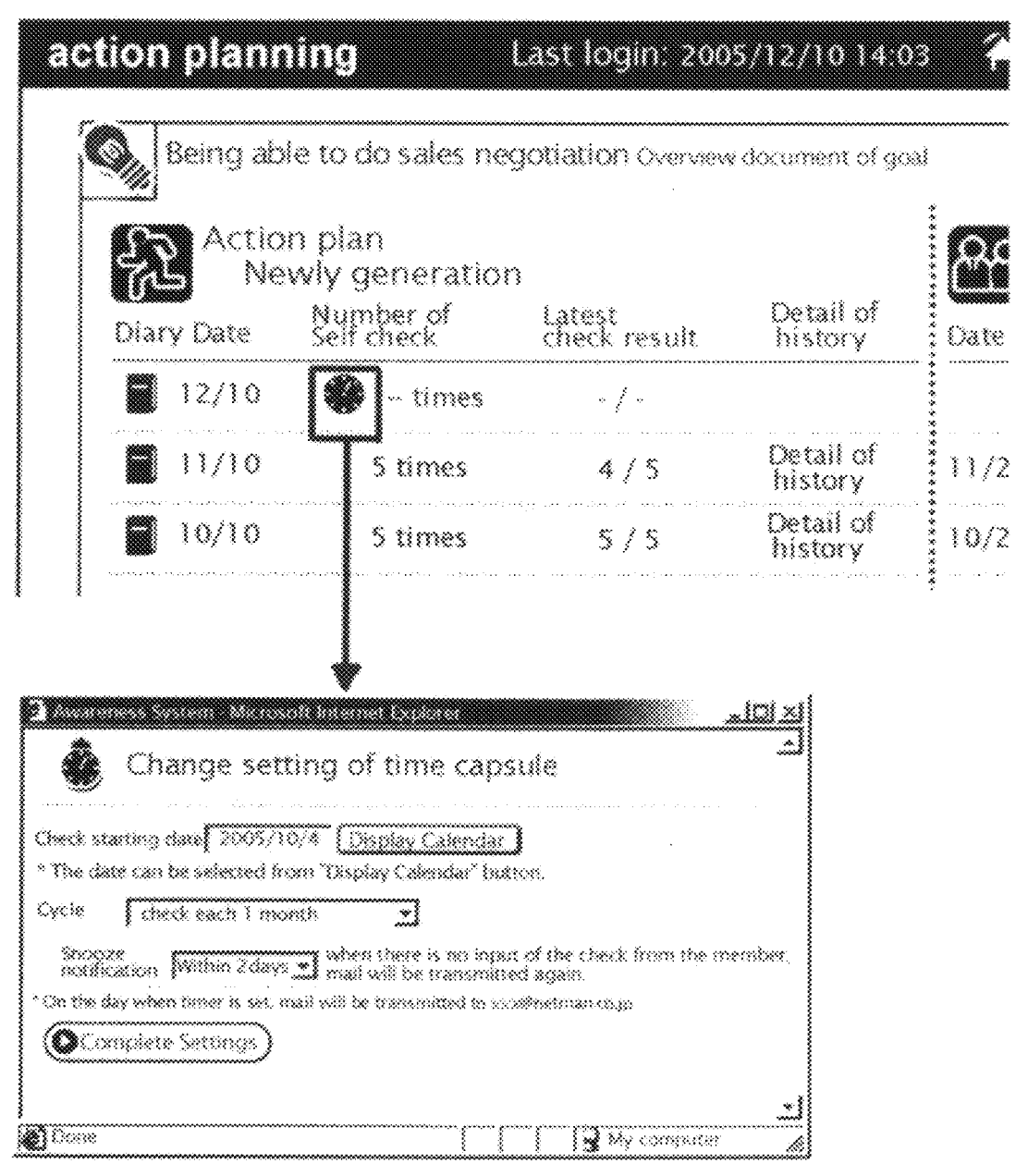

Regarding a timer setting of mail transmission with the above-described time capsule, by clicking a clock mark in the above-described top page as shown in FIG. 32, "Change Time Capsule Setting" screen pops up, and the above-described input value set by the member can be changed.

FIG. 33 (*a*) is a screen of "Conduct Diagnosis Interview" for conducting the diagnosis interview with another person, i.e., the diagnostician, and several kinds of previously-set samples (in the example shown by the figure, samples 1 to 3)

of mail bodies for requesting the diagnosis are displayed, so that the member can select and incorporate the samples as necessary and can generate a mail message.

Then, by clicking "Open Address Book" in the above-mentioned screen, an address list owned by the member is displayed (see, FIG. 33 (b)).

By clicking an item of a person who is to become a recipient from among persons displayed in the address list, the person is set as the diagnostician, and the address of the diagnostician is specified as the recipient address of the above-mentioned mail.

A case is herein described as an example where the diagnostician is set by the member with the terminal, but in the present invention, the diagnostician for the member may be initially set by the person in charge with the terminal. For example, in a case where the members are divided into teams, choosing of a person can be proceeded efficiently, such as setting the member within a team as the diagnostician. Furthermore, it may be possible that the person in charge forcibly sets the diagnostician.

Figure 34:
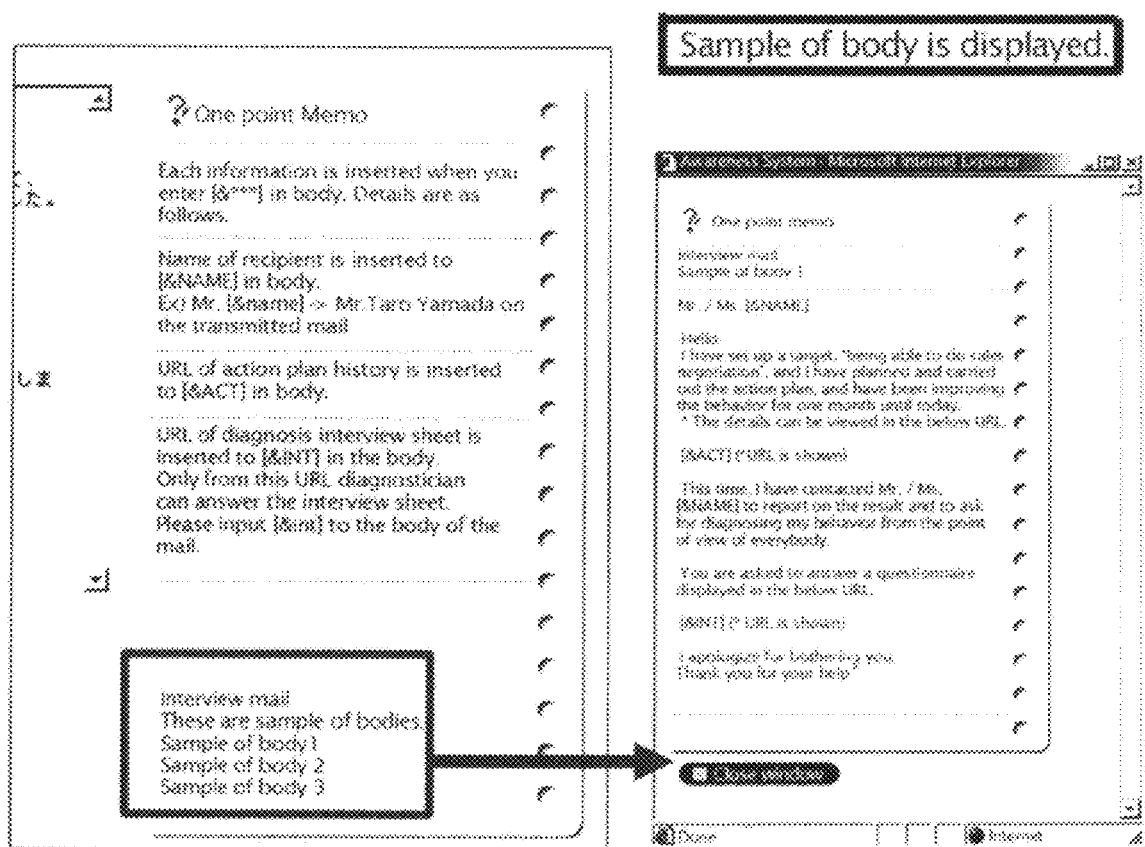
FIG. 34 is a sample screen of a mail to the diagnostician.
Figure 35:
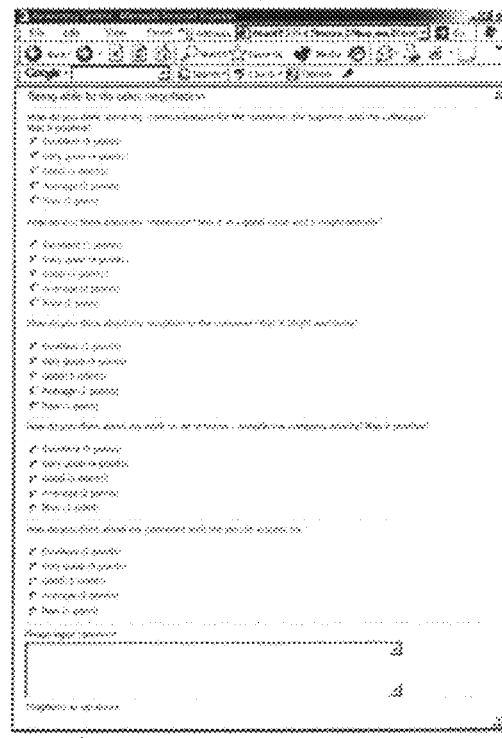
FIG. 35 (a) is a behavior history linked to &ACT in the mail, and (b) is a diagnosis interview sheet screen linked to &INT.

When [&ACT] is clicked in a display of a mail message as shown in FIG. 34, a behavior history (FIG. 31) is displayed as the self-check history of the action plan as shown in FIG. 35 (a). When [&INT] is clicked, the diagnosis interview sheet as shown in FIG. 35 (b) is displayed via a link.

When the mail is transmitted, the mail as shown below is transmitted to the diagnostician.

It should be noted that the title and the content of the body are samples, and can be edited by the member.

"<Title>

A mail is delivered from a behavior check timer

<Body>

Mr./Ms. [&NAME]

Hello, I am Inagawa.

I have set up a target, "being able to do sales negotiation", and I have planned and carried out the action plan, and have been improving the behavior for one month until today.

* The details can be viewed in the below URL.

[&ACT] (*URL is shown)

This time, I have contacted Mr./Ms. [&NAME] to report on the result and to ask for diagnosing the behavior of Inagawa from the point of view of everybody.

You are asked to answer a questionnaire displayed in the below URL.

[&INT] (* URL is shown)

I apologize for bothering you. Thank you for your help."

Herein, a name in the address book is inserted to [&NAME] as the diagnostician.

A URL of [&INT] is linked to a screen in FIG. 36 (same as FIG. 35 (b)) showing the diagnosis interview sheet previously generated by the person in charge, the diagnostician diagnoses the behavior of the member in the form of answering this questionnaire.

In the example in the figure, five alternatives of a reply and allocated points are shown for each of the questions, and the reply is divided into "having done (5 points), somewhat having done (4 points), neither having done or not (3 points), not having done somewhat (2 points), and not having done (1 point)".

When the diagnostician answers the diagnosis interview sheet with respect to the member, a mail as shown below is delivered to the member.

"<Title>

An opinion is delivered from Mr. Nagai.

<Body>

A report of "Communication Skill Improvement Course" is delivered from Mr. Nagai.

The details can be viewed in the below URL.

[&URL]"

Figure 37:
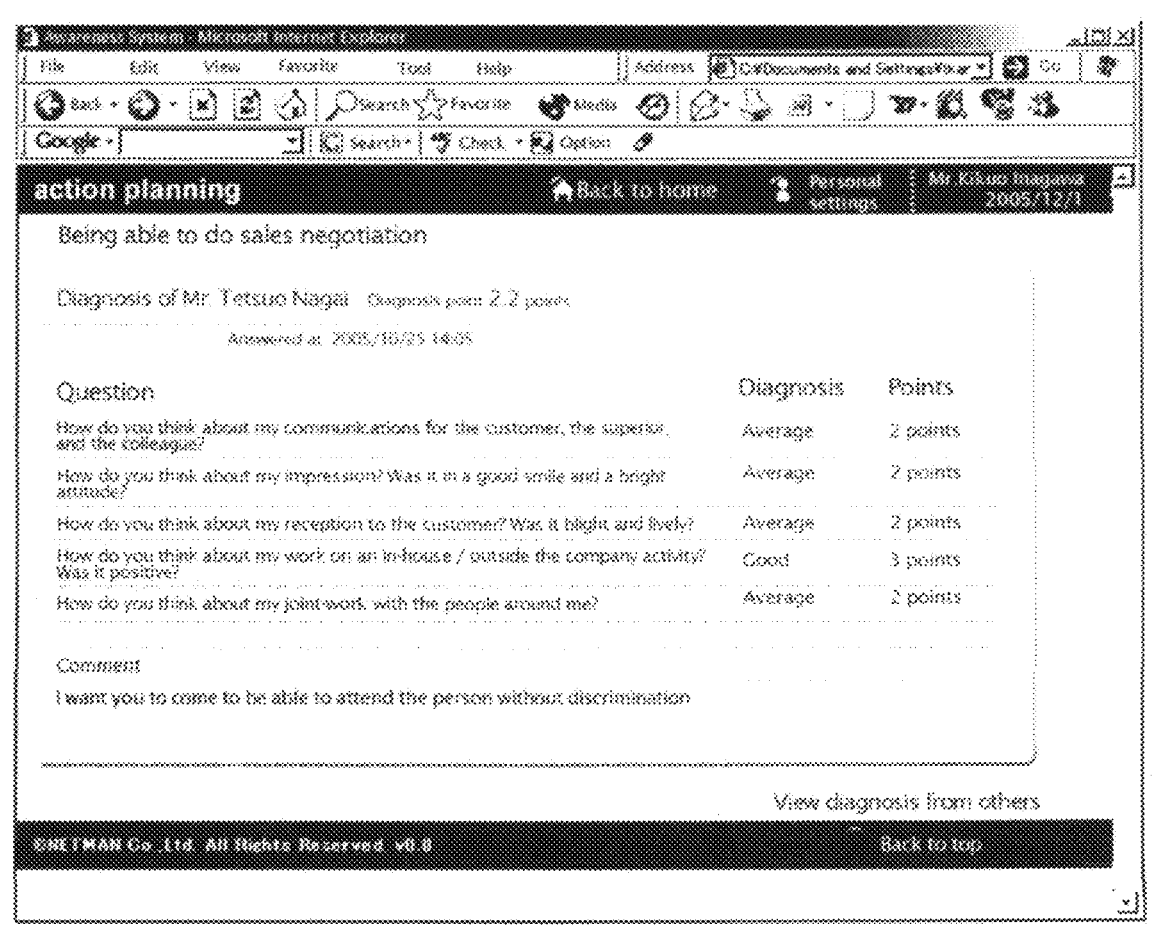

By accessing the URL recited in the body, a screen as shown in FIG. 37 is displayed.

The screen displays the replies showing the questions, the diagnoses, and the diagnoses points for each person and for each time based on the above-described reply of the diagnostician.

It should be noted that it is configured not to allow the member to view the diagnosis interview results of other people if the member has not yet done the self-diagnosis before the member views the diagnosis interview result of other people in FIG. 37, so that the self-diagnosis can be answered first.

Figure 38:
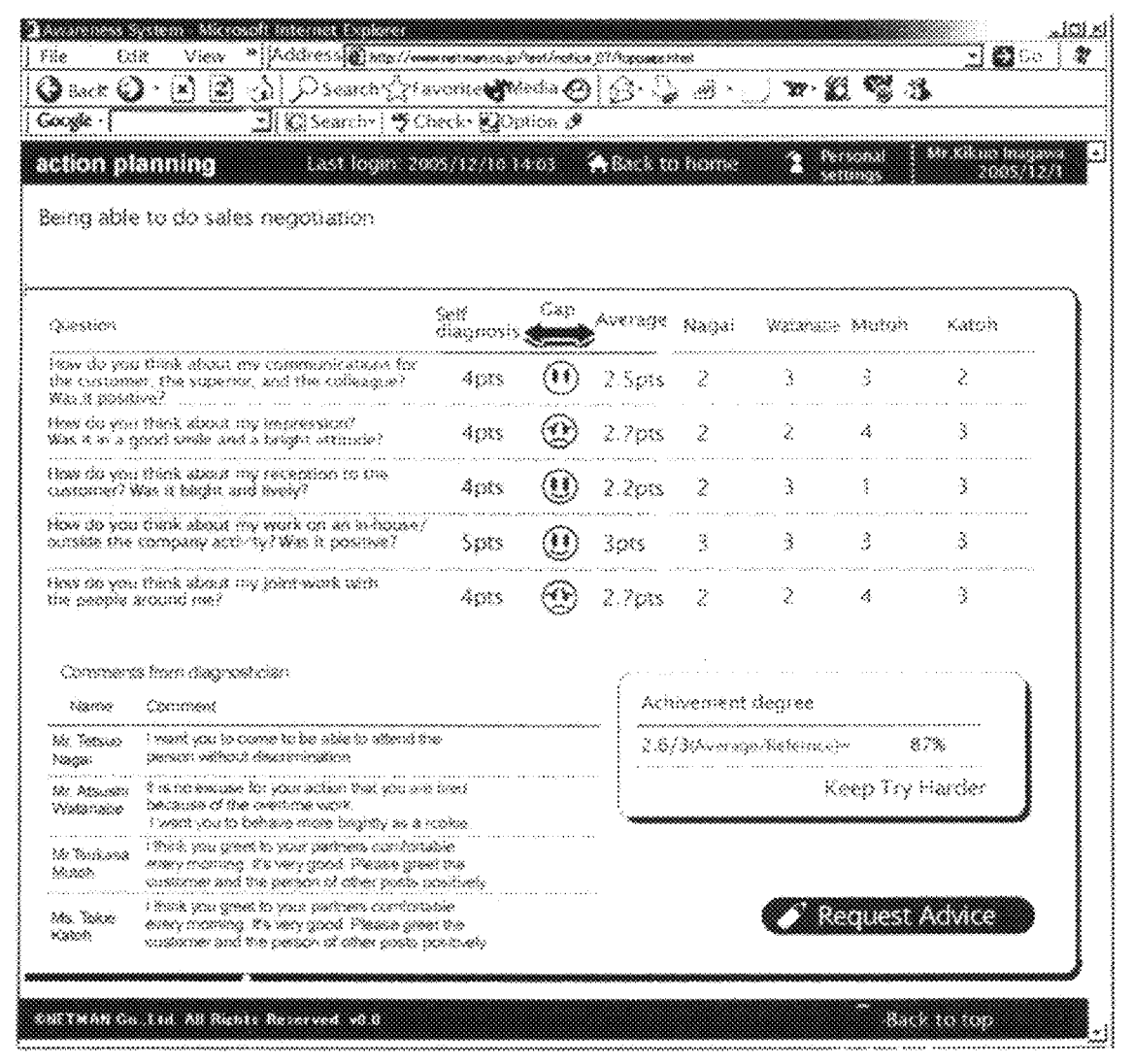

As shown in FIG. 38, the diagnosis interview result makes judgment as to the questions, self-diagnoses (points) of the interview sheet by the member, points of each of the diagnosticians, average points of the diagnosticians, and gaps between the average points and the points of the self-diagnoses.

As the achievement degree of this time, for example, in a case where it is assumed that with respect to the previously defined reference point (assuming 3 points), the average point of the diagnosticians is 2.6 points, the achievement degree is calculated from the average point/the reference point, and in the present embodiment, 2.6/3=87%, and a message (in the example shown by the figure, "keep trying harder") is automatically displayed according to a number of the achievement degree.

In the present embodiment, the achievement degree is less than a passing point, and an encouraging message and the like is displayed according to the achievement degree.

Comments from each of the diagnosticians on the diagnosis interview sheets are combined, and a list of the names and the comments is displayed as "Comments from those who have diagnosed".

In the above-described screen, "Request for Advice" button is displayed, and by clicking this, the screen moves on to a mail generation screen for "Advice Request".

In this screen as shown in FIG. 39, choices can be made as to "Action Plan" and "Diagnosis by Other People" with "Select Result Wished to be Consulted about".

Then, by entering input fields for "Mail Title" and "Mail Body" and clicking a button "Transmit This Mail", a consultation mail is transmitted to the assistant person in charge and/or the person in charge.

In a different embodiment of the top page for the member as shown in FIG. 27 (b), one "Participate in Cooperation Board" button is displayed for each of the goal targets.

Figure 41:
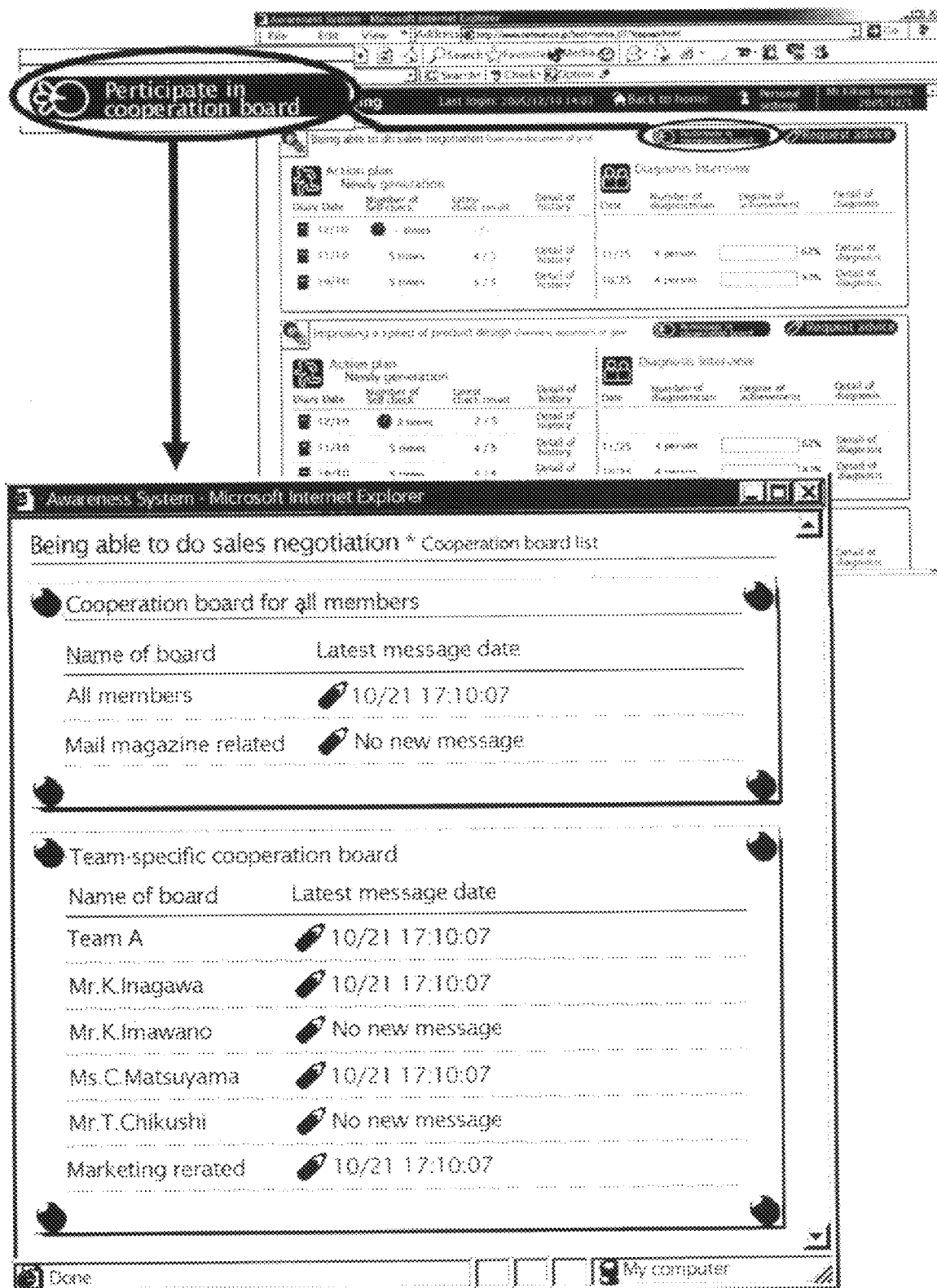
FIG. 41 is a list screen of the cooperation board as the bulletin board.

Upon clicking this "Participate in Cooperation Board" button", the cooperation boards (the bulletin boards) that the member can participate in are displayed in a list as shown in FIG. 41.

In the example shown by the figure, the cooperation board is divided into the cooperation board for all of the members and the cooperation board for the team. The former is divided into the two cooperation boards, "Participation of All the Members" and "Mail Magazine Related". The latter is divided into the six cooperation boards, "A Team", "Four Teams of Individual Names such as Mr. Kikuo Inagawa", and "Marketing Related".

Each of the cooperation boards is displayed when the title of the cooperation board is clicked.

Figure 42:
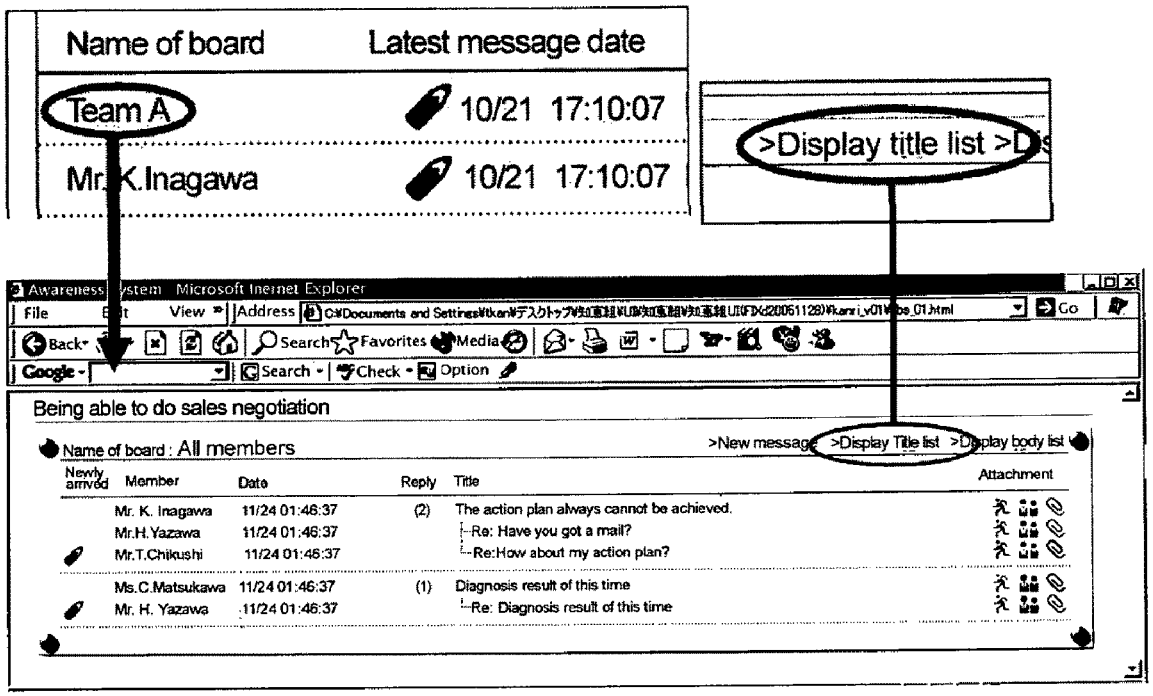
FIG. 42 is a screen showing the predetermined cooperation board.

FIG. 42 shows a screen of the cooperation board in a case where a title of "A Team" is clicked.

On the upper section of the screen, "Cooperation Board: A Team" and each of the functions of the cooperation board ">New Message>Title List View>Body List View" are displayed, and items of "Newly Arrived" showing whether the message is unread, "Member" showing the Member Name who posted a message, "Reply" showing the number of replies to a new message, "Title" showing the title of the message and the reply, and "Attachment" showing whether there is a material are displayed therebelow.

Figure 43:
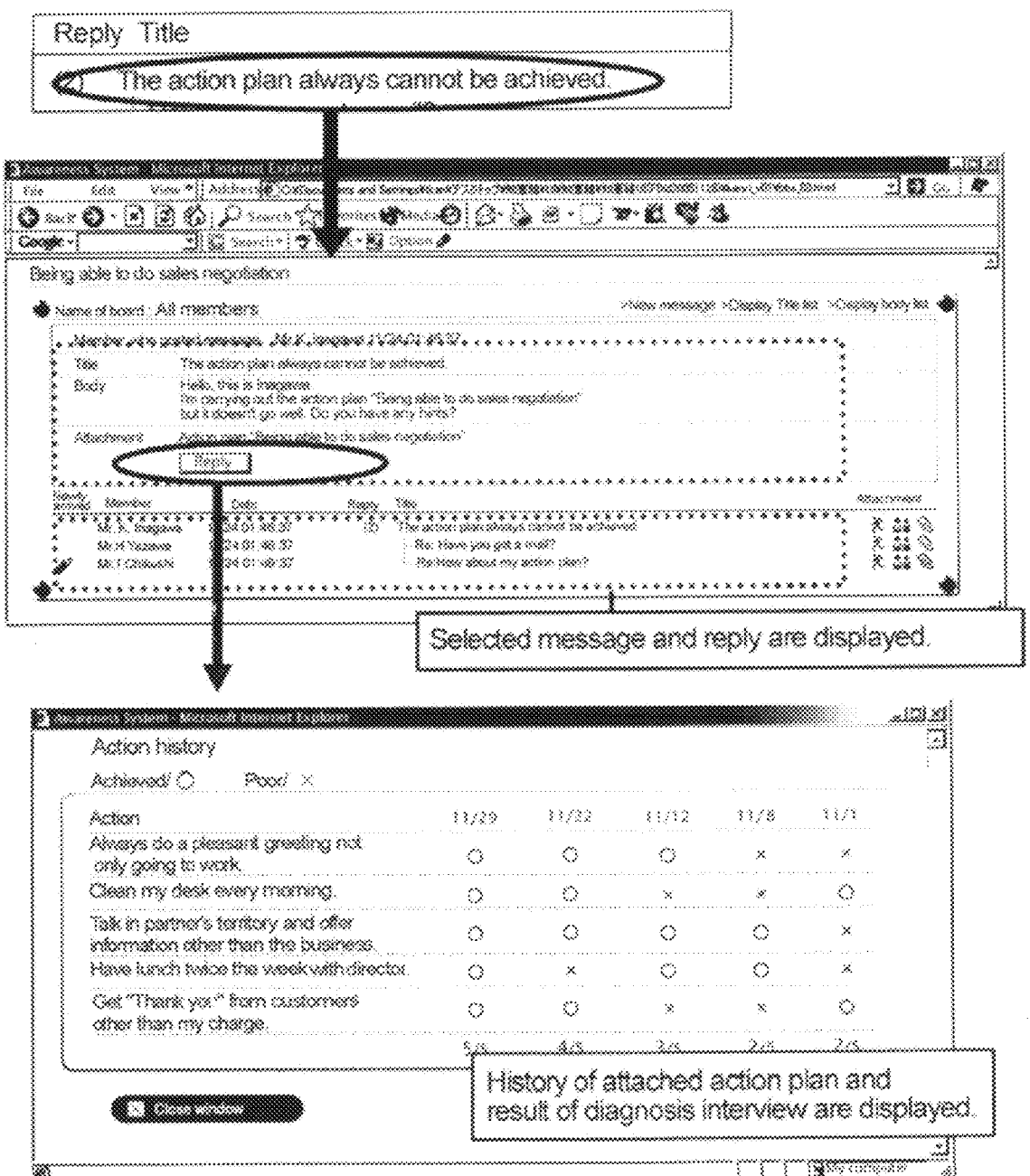
FIG. 43 is a diagram showing a message content, a reply, and an attachment link screen of the cooperation board.

Then, upon clicking the above-mentioned ">Title List View", a content of a message is displayed as shown in FIG. 43.

That is, the member name who posted the message, a date and time of the message, a title of the message, a body, and a table of contents of the attachment are shown in a field for the message in the upper section.

The above-mentioned selected message and a list of the replies thereto are displayed to be viewed in a filed in the lower section.

An item of the attachment in the field for the message is linked to a screen of a history of the action plans and the diagnosis interview results.

In the example shown by the figure, there is an indication of "Action Plan [being able to do sales negotiation]" in the item of the attachment, and by clicking this portion, the linked screen of "Action Plan History" can be opened.

Figure 44:
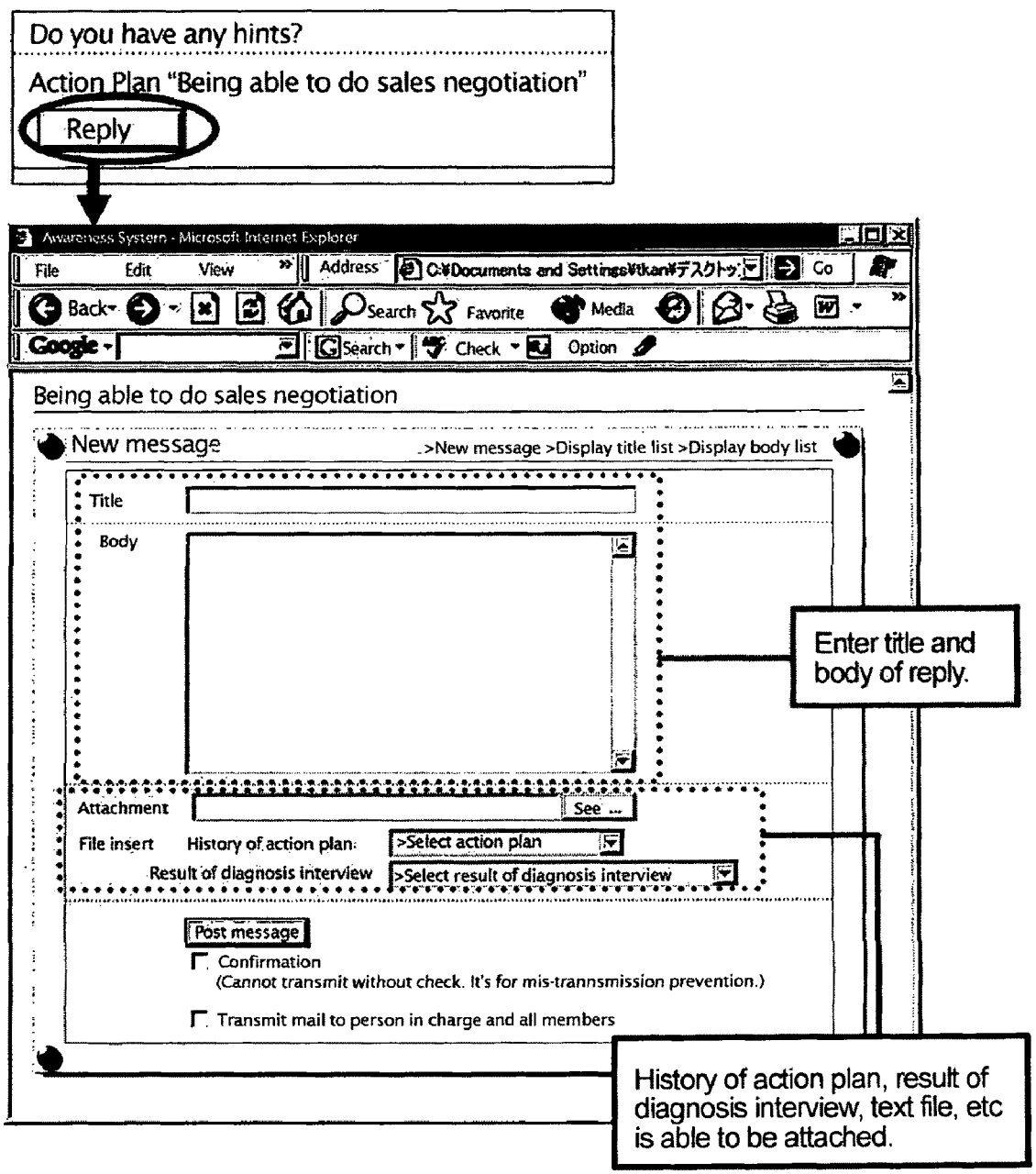
FIG. 44 is a reply generation screen of the cooperation board.

There is "Reply" button in the above-mentioned field for the message, and by clicking this, a generation screen of a reply to the message can be opened (see, FIG. 44).

In this screen, an input field for a title, an input field for a reply body, an attachment field, and a file insertion field are arranged.

The file insertion field is divided into an action plan history field and a diagnosis interview result field, and each of the screens can be linked or can be inserted as a file.

Furthermore, in the attachment field, the other text files and the like can be inserted.

Figure 45:
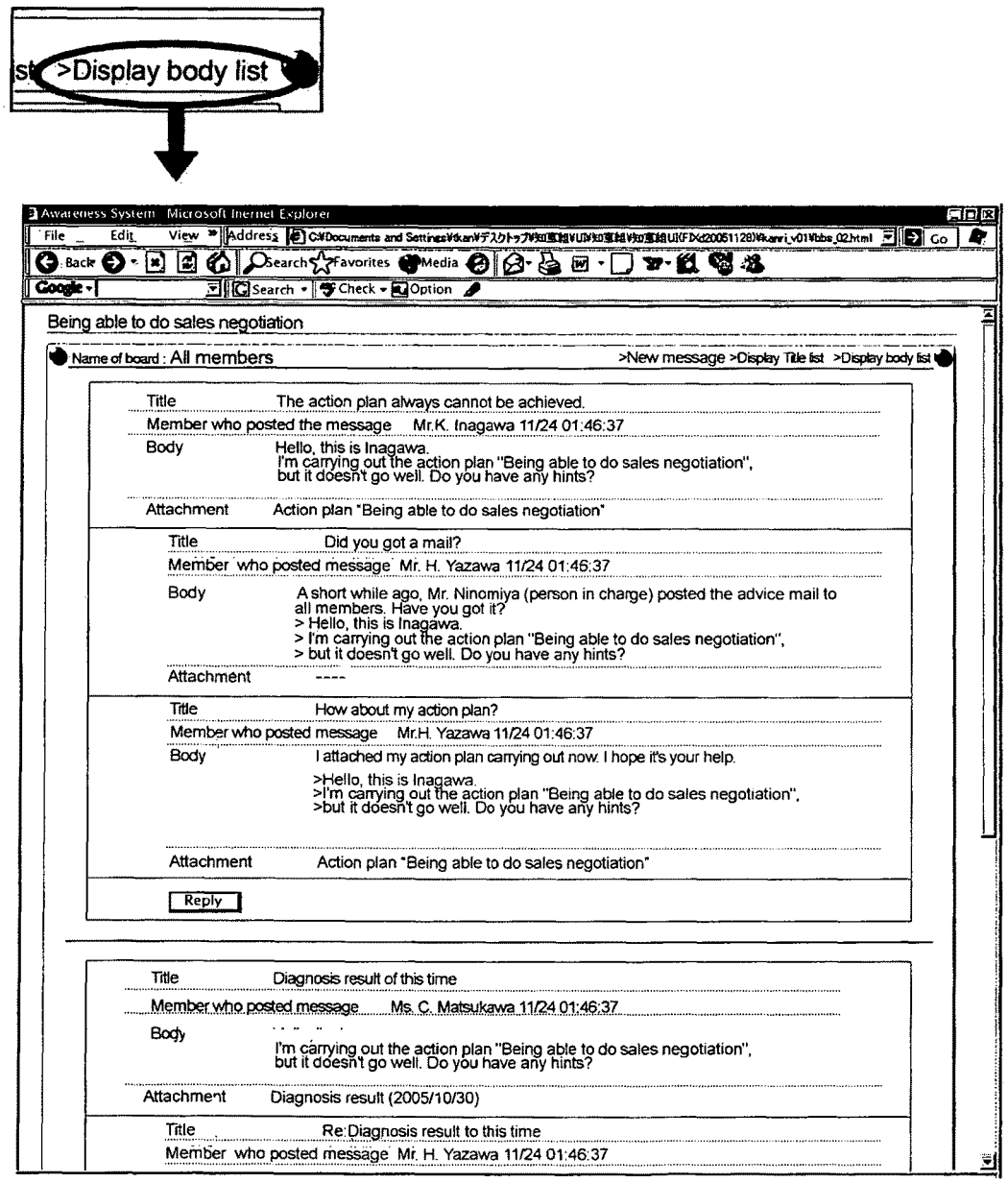
FIG. 45 is a body list view screen of the cooperation board.

Next, upon clicking ">Body List View", the bodies of all of the messages and the replies are displayed as shown in FIG. 45.

The body list view has a button of "Reply" for each of the messages, and by clicking this, the above-described reply generation screen in FIG. 44 can be opened.

Figure 46:
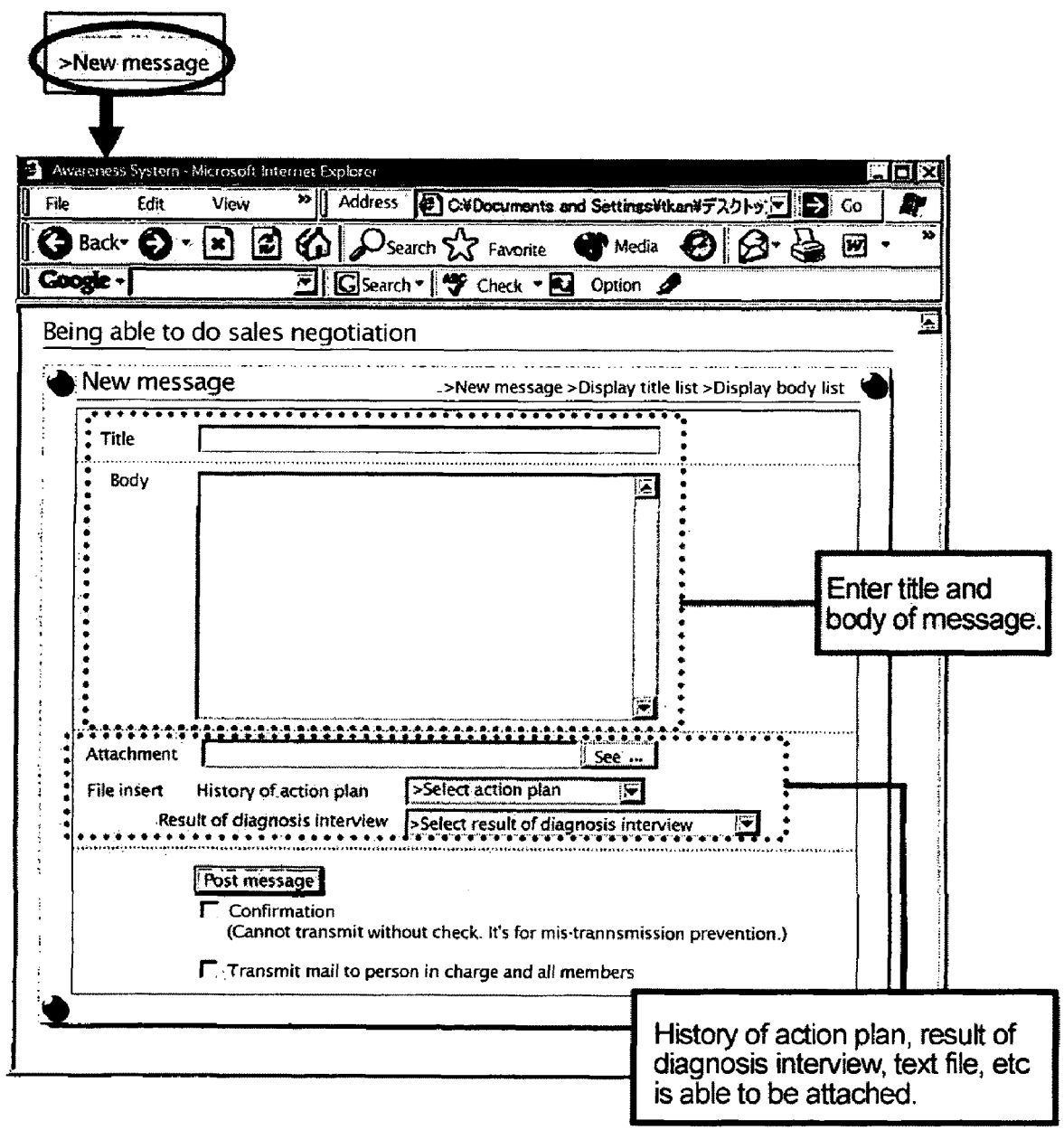
FIG. 46 is a new message generation screen of the cooperation board.

Upon clicking ">New Message", a new message generation screen as shown in FIG. 46 is displayed, so that the member can post the new message.

Pursuant to the reply generation screen in FIG. 44, this screen has the input field for the title, the input field for the reply body, the attachment field, and the file insertion field.

The attachment field and the file insertion field are the same as the reply generation screen, and a description thereabout is omitted.

Thus, discussions can be held among all or some of the members having the same goal target, and as necessary, along with the person in charge and the advisor, and the member can receive sharing of information, encouragements and coachings toward the achievement.

[Diagnostician]

The diagnostician is a person diagnoses and evaluates the goal achievement of the member, and replies to the diagnosis interview.

The diagnostician can reply to the diagnosis interview with recognition as to what kind of goal target the member has while doing the action.

[Screen for Diagnostician]

By clicking the address recited in the body of the mail from the member, the diagnostician can view the diagnosis interview sheet as shown in FIG. 40 (same as FIG. 35 (*b*)), and replies thereto.

From the above-described mail body, the diagnostician can also view a screen (see, FIG. 35 (*a*)) of the history of the behavior of the member to be confirmed.

Although the above embodiments describe a case as an example where the embodiments are carried out within the same corporation, the embodiments may be carried out among multiple related corporations and organizations.

The server may be arranged in the organization such as a corporation, or may be external ones such as ASP and rental server.

The above second embodiment shows a state completed with all the elements, but in the present invention, the elements may be combined as necessary to make up the system, except for the above-described self-checking execution means, the diagnosis execution means, the diagnosis interview generation means, the advice means, and the goal determination means as shown in FIG. 2 (*b*).

Regarding others, in short, it goes without saying that designs can be variously changed as long as the gist of the present invention is not changed.

The invention claimed is:

1. A behavior improvement system comprising:
a person-in-charge terminal including a computer installed on a side of a person in charge who administers a behavior improvement by setting a goal target of a member and makes a determination as to whether a goal is achieved;
an advisor terminal including a computer installed on a side of an advisor who is registered;
a member terminal including a computer installed on a side of each of the members;
a diagnostician terminal installed on a side of a diagnostician who answers a questionnaire of the behavior improvement of the member; and
an organization computer as a server computer arranged on a side of an organization, the organization computer connected via a computer network to the person-in-charge terminal, the advisor terminal, the member terminal, and the diagnostician terminal, the organization computer requesting the member terminal and the diagnostician terminal for a diagnosis of an action plan of the behavior improvement of the member, wherein the organization computer includes:
a recording means to which identification information identifying the member terminal is recorded;
a self-checking execution means including a function for recording to the recording means, in association with the identification information of the member terminal, a self-checking screen including a free description field allowing input of a comment of the member with respect to the action plan, a function for calling up the self-checking screen from the recording means and for sending a mail encouraging a self-check repeatedly and periodically to the member terminal corresponding to the self-checking screen, and a function for recording to the recording means, in association with the identification information of the member terminal and sorted in a time series, self-checking result data with respect to the self-checking screen inputted by the member terminal and data inputted to the free description field;

a diagnosis interview sheet setting means for recording to the recording means, in association with the identification information of the member terminal, a diagnosis interview sheet screen relating to check content of the self-checking screen and including a question for a diagnosis inputted by the person-in-charge terminal, a plurality of alternatives as a reply to the question and a point allocated to each of the alternatives, and a comment field allowing input of a comment of the diagnostician;

a diagnostician setting means for allowing, upon an input from the member terminal, selection of a plurality of addresses in association with the identification information of the member terminal, the terminals corresponding to the plurality of selected addresses as a plurality of diagnostician terminals;

a diagnosis execution means for calling up the diagnosis interview sheet screen from the recording means and for sending the diagnosis interview sheet screen to the member terminal corresponding to the diagnosis interview sheet screen and to the plurality of diagnostician terminals recorded to the recording means in association with the member terminal, and for allowing the diagnostician terminal to view the self-checking result data, which is sorted in a time series and displayed on the self-checking screen corresponding to the diagnosis interview sheet screen, and the data inputted to a free description field;

a function for storing each of reply information to the recording means in association with the identification information of the member terminal, upon an input of the reply information on the diagnosis interview sheet screen from each of the member terminal and the diagnostician terminal corresponding to the member terminal and comment data for the comment field from the diagnostician terminal;

a function for displaying a degree of a gap of replies between the member and the diagnostician by comparing a point assigned to a reply inputted by the member terminal with an average point of points assigned to replies inputted by the plurality of diagnostician terminals upon calling up the reply information from the recording means;

a function for recording to the recording means, in association with the identification information of the member terminal, a diagnosis interview result screen displaying a point inputted by each of the terminals, the degree of the gap, and the comment data of the diagnostician inputted to the comment field for each of the questions;

a diagnosis interview result generation means including a function for calling up the diagnosis interview result screen from the recording means and transmitting the diagnosis interview result screen to the member terminal corresponding to the diagnosis interview result screen;

an advice request means for, upon an input of advice request information from the member terminal, calling up from the recording means and sending to the advisor terminal the self checking result data and the comment data of the member written to the free description field recorded in association with the identification information of the member terminal, and for transmitting to the advisor terminal a mail requesting for an input of an advice; and a goal achievement recording means for recording a notification of a goal achievement in association with the identification information of the member terminal inputted from the person-in-charge terminal, wherein the advisor terminal having received the mail requesting for the input of the advice has a notification transmission means for transmitting to the member terminal a notification of an advice of a new action plan execution due to a goal non-achievement.

2. The behavior improvement system according to claim 1, wherein the diagnosis execution means has a diagnosis starting date setting means for recording to the recording means a diagnosis starting date on which the diagnosis interview sheet screen is sent to the member terminal and the diagnostician terminal corresponding to the member terminal and for sending the diagnosis interview sheet screen to the member terminal and the diagnostician terminal on the diagnosis starting date.

3. The behavior improvement system according to claim 2, wherein diagnosis starting date setting means has a diagnosis starting deadline setting means for recording to the recording means a deadline of the diagnosis starting date inputted from the person-in-charge terminal and a diagnosis starting date determination means for recoding to the recording means the diagnosis starting date that is before the deadline, inputted by the member terminal.

4. The behavior improvement system according to claim 1, wherein the organization computer has a member bulletin board function for recording to the recording means information inputted by each of the member terminals as information of a member bulletin board and for allowing each of the member terminals to view the recorded information of the member bulletin board.

5. The behavior improvement system according to claim 1, wherein the self-checking execution means has a self-checking history generation function for calling up self-checking data and input data of the free description field from the recording means, for sorting in a time series the self-checking data and the input data of the free description field, and for forming a self-checking history screen.

6. The behavior improvement system according to claim 1, wherein a starting date (a self-checking date) on which the start of the self-check of the action plan with the check sheet is notified to the member via mail, an interval for mails repeating the above-mentioned check addressed to the member, and a period for mails encouraging the self-check of the above-mentioned action plan where there is no input of the check from the member are previously registered to the organization computer.

7. A behavior improvement system comprising:

a person-in-charge terminal including a computer installed on a side of a person in charge who administers a behavior improvement by setting a goal target of a member and makes a determination as to whether a goal is achieved;

an advisor terminal including a computer installed on a side of an advisor who is registered;

a member terminal including a computer installed on a side of each of the members;

a diagnostician terminal installed on a side of a diagnostician who answers a questionnaire of the behavior improvement of the member; and an organization computer as a server computer arranged on a side of an organization, the organization computer connected via a computer network to the person-in-charge terminal, the advisor terminal, the member terminal, and the diagnostician terminal, the organization computer requesting the member terminal and the diagnostician terminal for a diagnosis of an action plan of the behavior improvement of the member, wherein the organization computer is configured to include:

a recorder to which identification information identifying the member terminal is recorded;

a self-checking executer that records to the recorder, in association with the identification information of the member terminal, a self-checking screen including a free description field allowing input of a comment of the member with respect to the action plan, and calls up the self-checking screen from the recorder and sends a mail encouraging a self-check repeatedly and periodically to the member terminal corresponding to the self-checking screen, and records to the recorder, in association with the identification information of the member terminal and sorted in a time series, self-checking result data with respect to the self-checking screen inputted by the member terminal and data inputted to the free description field;

a diagnosis interview sheet setter that records to the recorder, in association with the identification information of the member terminal, a diagnosis interview sheet screen relating to check content of the self-checking screen and including a question for a diagnosis inputted by the person-in-charge terminal, a plurality of alternatives as a reply to the question and a point allocated to each of the alternatives, and a comment field allowing input of a comment of the diagnostician;

a diagnostician setter that allows, upon an input from the member terminal, selection of a plurality of addresses in association with the identification information of the member terminal, the terminals corresponding to the plurality of selected addresses as a plurality of diagnostician terminals;

a diagnosis executer that calls up the diagnosis interview sheet screen from the recorder and sends the diagnosis interview sheet screen to the member terminal corresponding to the diagnosis interview sheet screen and to the plurality of diagnostician terminals recorded to the recorder in association with the member terminal, and allows the diagnostician terminal to view the self-checking result data, which is sorted in a time series and displayed on the self-checking screen corresponding to the diagnosis interview sheet screen, and the data inputted to a free description field;

a reply information storer that stores each of reply information to the recorder in association with the identification information of the member terminal, upon an input of the reply information on the diagnosis interview sheet screen from each of the member terminal and the diagnostician terminal corresponding to the member terminal and comment data for the comment field from the diagnostician terminal;

a degree of gap displayer that displays a degree of a gap of replies between the member and the diagnostician by comparing a point assigned to a reply inputted by the member terminal with an average point of points assigned to replies inputted by the plurality of diagnostician terminals upon calling up the reply information from the recorder;

a diagnosis interview result screen recorder that records to the recorder, in association with the identification information of the member terminal, a diagnosis interview result screen displaying a point inputted by each of the terminals, the degree of the gap, and the comment data of the diagnostician inputted to the comment field for each of the questions;

a diagnosis interview result generator that calls up the diagnosis interview result screen from the recorder and transmits the diagnosis interview result screen to the member terminal corresponding to the diagnosis interview result screen;

an advice requester that, upon an input of advice request information from the member terminal, calls up from the recorder and sends to the advisor terminal the self checking result data and the comment data of the member written to the free description field recorded in association with the identification information of the member terminal, and transmit to the advisor terminal a mail requesting for an input of an advice; and a goal achievement recorder that records a notification of a goal achievement in association with the identification information of the member terminal inputted from the person-in-charge terminal, wherein the advisor terminal having received the mail requesting the input of the advice has a notification transmitter that transmits to the member terminal a notification of an advice of a new action plan execution due to a goal non-achievement.

\* \* \* \* \*